(12) United States Patent
Ainsworth et al.

(10) Patent No.: US 9,418,349 B2
(45) Date of Patent: Aug. 16, 2016

(54) FITNESS FACILITY EQUIPMENT USAGE CONTROL SYSTEM

(71) Applicant: Precor Incorporated, Woodinville, WA (US)

(72) Inventors: Mark E. Ainsworth, Snohomish, WA (US); Robert J. Silbernagel, Sammamish, WA (US); Susan W. M. Bell, Mercer Island, WA (US); James S. Birrell, Seattle, WA (US)

(73) Assignee: Precor Incorporated, Woodinville, WA (US)

( * ) Notice: Subject to any disclaimer, the term of this patent is extended or adjusted under 35 U.S.C. 154(b) by 0 days.

(21) Appl. No.: 14/589,604

(22) Filed: Jan. 5, 2015

(65) Prior Publication Data

US 2015/0120348 A1  Apr. 30, 2015

Related U.S. Application Data

(63) Continuation of application No. 14/458,787, filed on Aug. 13, 2014, now Pat. No. 8,944,961, which is a continuation of application No. 13/789,114, filed on Mar. 7, 2013, now Pat. No. 8,882,637, which is a continuation-in-part of application No. 13/419,488, filed on Mar. 14, 2012, now Pat. No. 8,419,593, which is a continuation of application No. 12/888,669, filed on Sep. 23, 2010, now Pat. No. 8,157,706, which is a continuation-in-part of application No. 12/581,417, filed on Oct. 19, 2009, now Pat. No. 7,988,599, which is a continuation of application No. 10/765,704, filed on Jan. 26, 2004, now Pat. No. 7,621,846.

(60) Provisional application No. 60/442,934, filed on Jan. 26, 2003.

(51) Int. Cl.
A63B 24/00 (2006.01)
G06Q 10/06 (2012.01)
G06F 11/07 (2006.01)
G06Q 10/00 (2012.01)

(52) U.S. Cl.
CPC ........ *G06Q 10/0631* (2013.01); *G06F 11/0736* (2013.01); *G06F 11/0775* (2013.01); *G06F 11/0784* (2013.01); *G06Q 10/06315* (2013.01); *G06Q 10/20* (2013.01); *A63B 2225/20* (2013.01); *A63B 2225/305* (2013.01); *A63B 2225/50* (2013.01); *Y10S 482/901* (2013.01)

(58) Field of Classification Search
CPC ............... A63B 24/00; A63B 24/0062; A63B 2225/20; A63B 2225/50; G06Q 10/0631; G06Q 10/06315; G06Q 10/20; Y10S 482/901; G06F 11/0736; G06F 11/0775; G06F 11/0784
See application file for complete search history.

(56) References Cited

U.S. PATENT DOCUMENTS

| | | | |
|---|---|---|---|
| 4,720,789 A | 1/1988 | Hector et al. | |
| 4,828,257 A | 5/1989 | Dyer et al. | |
| 4,840,372 A | 6/1989 | Oglesby et al. | |
| 4,955,602 A | 9/1990 | Rastelli | |
| 4,998,725 A | 3/1991 | Watterson et al. | |
| 5,062,626 A | 11/1991 | Dalebout et al. | |
| 5,062,632 A | 11/1991 | Dalebout et al. | |
| 5,067,710 A | 11/1991 | Watterson et al. | |

(Continued)

*Primary Examiner* — Glenn Richman
(74) *Attorney, Agent, or Firm* — Terence P. O'Brien; Todd A. Rathe

(57) ABSTRACT

A system and method manage distribution of fitness equipment units based upon automatically collected usage information for the fitness equipment units.

18 Claims, 47 Drawing Sheets

(56) References Cited

U.S. PATENT DOCUMENTS

| | | |
|---|---|---|
| 5,104,120 A | 4/1992 | Watterson et al. |
| 5,149,084 A | 9/1992 | Dalebout et al. |
| 5,213,555 A | 5/1993 | Hood et al. |
| 5,383,826 A | 1/1995 | Michael |
| 5,466,200 A | 11/1995 | Ulrich et al. |
| 5,484,355 A | 1/1996 | King, II et al. |
| 5,489,249 A | 2/1996 | Brewer et al. |
| 5,512,025 A | 4/1996 | Dalebout et al. |
| 5,554,033 A | 9/1996 | Bizzi et al. |
| 5,591,104 A | 1/1997 | Andrus et al. |
| 5,645,509 A | 7/1997 | Brewer et al. |
| 5,655,997 A | 8/1997 | Greenberg et al. |
| 5,706,822 A | 1/1998 | Khavari |
| 5,777,895 A | 7/1998 | Kuroda et al. |
| 5,785,632 A | 7/1998 | Greenberg et al. |
| 5,888,172 A | 3/1999 | Andrus et al. |
| 5,890,995 A | 4/1999 | Bobick et al. |
| 5,916,063 A | 6/1999 | Alessandri |
| 5,931,763 A | 8/1999 | Alessandri |
| RE36,300 E | 9/1999 | Gonzalez |
| 6,042,519 A | 3/2000 | Shea |
| 6,053,844 A | 4/2000 | Clem |
| 6,059,692 A | 5/2000 | Hickman |
| 6,066,075 A | 5/2000 | Poulton |
| 6,152,856 A | 11/2000 | Studor et al. |
| 6,159,131 A | 12/2000 | Pfeffer |
| 6,171,218 B1 | 1/2001 | Shea |
| 6,193,631 B1 | 2/2001 | Hickman |
| 6,227,968 B1 | 5/2001 | Suzuki et al. |
| 6,244,988 B1 | 6/2001 | Delman |
| 6,312,363 B1 | 11/2001 | Watterson et al. |
| 6,330,499 B1 | 12/2001 | Chou et al. |
| 6,336,891 B1 | 1/2002 | Fedrigon et al. |
| 6,421,571 B1 | 7/2002 | Spriggs et al. |
| 6,447,424 B1 | 9/2002 | Ashby et al. |
| 6,458,060 B1 | 10/2002 | Watterson et al. |
| 6,464,618 B1 | 10/2002 | Shea |
| 6,475,115 B1 | 11/2002 | Candito et al. |
| 6,514,199 B1 | 2/2003 | Alessandri |
| 6,535,123 B2 | 3/2003 | Sandelman et al. |
| 6,554,706 B2 | 4/2003 | Kim et al. |
| 6,572,512 B2 | 6/2003 | Anderson et al. |
| 6,601,016 B1 | 7/2003 | Brown et al. |
| 6,616,578 B2 | 9/2003 | Alessandri |
| 6,626,799 B2 | 9/2003 | Watterson et al. |
| 6,634,992 B1 | 10/2003 | Ogawa |
| 6,638,198 B1 | 10/2003 | Shea |
| 6,659,916 B1 | 12/2003 | Shea |
| 6,702,719 B1 | 3/2004 | Brown et al. |
| 6,746,371 B1 | 6/2004 | Brown et al. |
| 6,827,669 B2 | 12/2004 | Cohen et al. |
| 6,863,641 B1 | 3/2005 | Brown et al. |
| 6,866,613 B1 | 3/2005 | Brown et al. |
| 6,902,513 B1 | 6/2005 | McClure |
| 6,918,858 B2 | 7/2005 | Watterson et al. |
| 6,921,351 B1 | 7/2005 | Hickman et al. |
| 6,971,973 B2 | 12/2005 | Cohen et al. |
| 6,991,586 B2 | 1/2006 | Lapcevic |
| 6,997,852 B2 | 2/2006 | Watterson et al. |
| 7,022,047 B2 * | 4/2006 | Cohen ................ G09B 7/02 482/8 |
| 7,060,006 B1 | 6/2006 | Watterson et al. |
| 7,060,008 B2 | 6/2006 | Watterson et al. |
| 7,070,539 B2 | 7/2006 | Brown et al. |
| 7,121,982 B2 | 10/2006 | Feldman |
| 7,128,693 B2 | 10/2006 | Brown et al. |
| 7,166,062 B1 | 1/2007 | Watterson et al. |
| 7,166,064 B2 | 1/2007 | Watterson et al. |
| 7,217,224 B2 | 5/2007 | Thomas |
| 7,331,226 B2 | 2/2008 | Feldman et al. |
| 7,455,622 B2 | 11/2008 | Watterson et al. |
| 7,491,153 B2 | 2/2009 | Li et al. |
| 7,507,183 B2 | 3/2009 | Anderson et al. |
| 7,521,623 B2 | 4/2009 | Bowen |
| 7,537,546 B2 | 5/2009 | Watterson et al. |
| 7,549,947 B2 | 6/2009 | Hickman et al. |
| 7,556,590 B2 | 7/2009 | Watterson et al. |
| 7,575,536 B1 | 8/2009 | Hickman |
| 7,594,873 B2 | 9/2009 | Terao et al. |
| 7,618,346 B2 | 11/2009 | Crawford et al. |
| 7,621,846 B2 | 11/2009 | Ainsworth et al. |
| 7,645,213 B2 | 1/2010 | Watterson et al. |
| 7,705,230 B2 | 4/2010 | Bowen |
| 7,713,171 B1 * | 5/2010 | Hickman ............ A63B 24/0062 482/4 |
| 7,766,794 B2 | 8/2010 | Oliver et al. |
| 7,841,966 B2 | 11/2010 | Aaron et al. |
| 7,857,731 B2 | 12/2010 | Hickman et al. |
| 7,927,253 B2 | 4/2011 | Vincent et al. |
| 7,931,563 B2 | 4/2011 | Shaw et al. |
| 7,985,164 B2 | 7/2011 | Ashby |
| 7,988,599 B2 | 8/2011 | Ainsworth et al. |
| 8,029,415 B2 | 10/2011 | Ashby et al. |
| 8,038,577 B2 | 10/2011 | McIntosh |
| 8,047,966 B2 | 11/2011 | Dorogusker et al. |
| 8,103,517 B2 | 1/2012 | Hinnebusch |
| 8,118,709 B2 | 2/2012 | McKirdy et al. |
| 8,152,693 B2 | 4/2012 | Nurmela et al. |
| 8,157,706 B2 | 4/2012 | Ainsworth et al. |
| 8,162,804 B2 | 4/2012 | Tagliabue |
| 8,419,593 B2 | 4/2013 | Ainsworth et al. |
| 8,613,689 B2 | 12/2013 | Dyer et al. |
| 8,663,068 B1 | 3/2014 | Dyer et al. |
| 8,827,870 B2 | 9/2014 | Dyer et al. |
| 8,882,637 B2 | 11/2014 | Ainsworth et al. |
| 8,944,961 B2 | 2/2015 | Ainsworth et al. |
| 9,011,291 B2 | 4/2015 | Birrell |
| 2002/0055383 A1 | 5/2002 | Onda et al. |
| 2002/0055418 A1 * | 5/2002 | Pyles ................ A63B 24/00 482/8 |
| 2002/0082142 A1 * | 6/2002 | Cannon ............ A63B 71/0697 482/1 |
| 2005/0010426 A1 * | 1/2005 | Chen ................ G06Q 10/02 482/8 |
| 2005/0075214 A1 * | 4/2005 | Brown ............... A63B 24/0006 482/8 |
| 2007/0225118 A1 | 9/2007 | Giorno et al. |
| 2007/0265139 A1 | 11/2007 | Glick |
| 2008/0051256 A1 | 2/2008 | Ashby et al. |
| 2008/0161654 A1 | 7/2008 | Teller et al. |
| 2008/0207401 A1 | 8/2008 | Harding et al. |
| 2009/0023553 A1 | 1/2009 | Shim |
| 2009/0075781 A1 | 3/2009 | Schwarzberg et al. |
| 2009/0098980 A1 | 4/2009 | Waters |
| 2009/0098981 A1 | 4/2009 | Del Giorno |
| 2009/0111656 A1 | 4/2009 | Sullivan et al. |
| 2009/0144080 A1 | 6/2009 | Gray et al. |
| 2009/0156364 A1 | 6/2009 | Simeoni |
| 2009/0219159 A1 | 9/2009 | Morgenstern |
| 2009/0233771 A1 | 9/2009 | Quartochi et al. |
| 2009/0239709 A1 | 9/2009 | Wu |
| 2009/0240113 A1 | 9/2009 | Heckerman |
| 2009/0262088 A1 | 10/2009 | Moll-Carrillo et al. |
| 2009/0298649 A1 | 12/2009 | Dyer et al. |
| 2011/0090092 A1 | 4/2011 | Birrell et al. |
| 2013/0053218 A1 | 2/2013 | Barker |
| 2013/0210578 A1 | 8/2013 | Birrell |

* cited by examiner

PURCHASE HISTORY: QUERY

MANUFACTURERS: 242
- ALL
- BRAND W
- BRAND X
- BRAND Y
- BRAND Z

CATEGORY: 244
- TREADMILLS
- BIKES
- CLIMBERS
- ELLIPTICALS
- OTHER

CLUB X REGIONS/SITES: 246
- NORTHEAST
- SOUTHEAST
- WEST COAST
- CLUBX-301
- CLUBX-201

HOUR METER: 248
- ○ GREATER THAN [ ] HOURS
- ○ ANY TIME

DISTANCE ODOMETER: 250
- ○ GREATER THAN [ 1 ] MILES
- ○ ANY DISTANCE

INSTALLATION DATES: 252
- AFTER: [MM▼]/[DD▼]/[YYYY▼]
- BEFORE: [MM▼]/[DD▼]/[YYYY▼]

WARRANTEE EXPIRATION: 254
- AFTER: [MM▼]/[DD▼]/[YYYY▼]
- BEFORE: [MM▼]/[DD▼]/[YYYY▼]

PRIMARY SORT: 256
[OLDEST INSTALLATION DATE ▼]
- OLDEST INSTALLATION DATE
- NEWEST INSTALLATION DATE
- MANUFACTURER
- CATEGORY

[ GENERATE REPORT ]

PURCHASE HISTORY: RESULTS

| | INSTALL DATE | WARRANTY EXP. DATE | MFR. | MODEL/ TYPE | SITE/ LOCATION | HOUR ODOMETER | DISTANCE ODOMETER | VIEW SERVICE REPORT |
|---|---|---|---|---|---|---|---|---|
| 1 | 08/01/1997 | 08/01/2000 | Y | 1500HR | CLUB X - 301 | 22,440 | 89,608 | 🔧 |
| 2 | 08/01/1997 | 08/01/2000 | Y | 1100 | CLUB X - 200 | 17,890 | 71,561 | 🔧 |
| 3 | 08/02/1997 | 08/02/2000 | Y | 1500HR | CLUB X - 301 | 22,471 | 89,884 | 🔧 |
| 4 | 10/07/1998 | 10/07/2001 | W | 164I | CLUB X - 301 | 6,020 | 24,084 | 🔧 |
| 5 | 10/10/1997 | 10/10/2000 | W | 164I | CLUB X - 301 | 21,078 | 84,312 | 🔧 |
| 6 | 10/10/1997 | 10/10/2000 | W | 164I | CLUB X - 302 | 19,008 | 96,032 | 🔧 |
| 7 | 10/10/1997 | 10/10/2000 | W | 164I | CLUB X - 017 | 10,972 | 43,888 | 🔧 |
| 8 | 12/01/1998 | 12/01/2001 | W | 156 | CLUB X - 086 | 5,002 | 20,008 | 🔧 |
| 9 | 12/01/1998 | 12/01/2001 | W | 156 | CLUB X - 086 | 17,520 | 68,080 | 🔧 |

Fig. 12.

UNIT SERVICE HISTORY
LOCATION: [SELECTED LOCATION]   MANUFACTURER SERIAL NO.: [TEXT]   TOTAL HOURS: _____
DATE RANGE: [SELECTED TIME SPAN]   UNIT IDENTIFIER: [TEXT]   TOTAL ODOMETER: _____

| TOTAL HOURS DOWN-TIME | MANU-FAC-TURER | PRODUCT CATEGORY | MODEL TYPE | SERIAL # | UNIT I.D. NO. | INSTAL-LATION DATE | LOCATION | OWNER I.D. NO. | SERVICER NAME | SERVICER ACCT. # |
|---|---|---|---|---|---|---|---|---|---|---|
| 6 | BRAND W | TREADMILL | 954 | PU074 | — | 12/13/02 | CLUB X-301 | 71102 | BILLY BOB | 231423423 |

WARRANTY EXPIRATION DATE

| FRAME | DISPLAY | PARTS | LABOR | MOTOR | MOTOR FAN |
|---|---|---|---|---|---|
| 12/13/02 | 12/13/02 | 12/13/02 | 12/13/02 | 12/13/02 | 12/13/02 |

VIEW/ADD SERVICE RECORD NOTES

| DATE | TIME | ERROR CODE | PM RECOMM. | ERROR DESCRIPTION | HOUR METER | ODO-METER | ALERT SET | PM STATUS | ACKNOWL | ACKNOW-LEDGED BY: |
|---|---|---|---|---|---|---|---|---|---|---|
| 7/13/03 | 20:00 | XX |  | SERVICE ISSUE DESCRIPTION | 2222:23 | 8800 | NO | – | 7/13/03 10:00 | BUCK JONES |
| 5/1/03 | 08:00 | XX | CS | SERVICE ISSUE DESCRIPTION | 900:00 | 3500 | – | COM-PLETE | 5/1/03 06:00 | BUCK JONES |
| 12/13/02 | 16:00 |  | – | INSITE INSTALLATION | 289:23 | 1152 | YES | – |  |  |
| 6/1/02 | 12:00 |  | CS | FEU INSTALLATION | 00:00 | 0 | – | POST-PONED |  |  |

PM RECOMMENDATION KEY: FD - FLIP DECK; RW = REFILL WAX; CS = CLEAN SURFACES; V = VACUUM; WD = WAX DECK.

*Fig. 16.*

PREVENTATIVE MAINTENANCE TRACKING: RESULTS
PREVENTATIVE MAINTENANCE FOR CLUBX-03 AS OF XX/XX/XXXX.

PM RECOMMENDATION KEY: FD - FLIP DECK; RW = REFILL WAX; CS = CLEAN SURFACES;
V = VACUUM; WD = WAX DECK.

| MANU-FACTURER | TYPE | MODEL | OWNER DESCRIPTION | SERIAL # | INSTALL DATE | USAGE HOURS | MILES/ STRIDES | PM RECOMM. | VIEW SERVICE REPORT |
|---|---|---|---|---|---|---|---|---|---|
| BRAND W | ELLIPTICAL | 146 | EOIx7 | 31P0057 | 01/15/02 | 5000.33 HRS | 701,120 | CS | 🔧 |
| BRAND W | ELLIPTICAL | 146 | EOIx9 | 31P0058 | 01/15/02 | 806.00 HRS | 125,736 | CS | 🔧 |
| BRAND W | ELLIPTICAL | 146 | EOIx4 | 31P0154 | 01/15/02 | 6006.34 HRS | 750,750 | CS | 🔧 |
| BRAND Y | ELLIPTICAL 1500HR | | EOIx1 | 31P0059 | 01/15/02 | 4701.64 HRS | 705,150 | CS | 🔧 |
| BRAND Y | ELLIPTICAL 1500HR | | EOIx2 | 31P0062 | 01/15/02 | 3201 HRS | 512,160 | FD, CS | 🔧 |
| BRAND W | TREADMILL | 156 | EOIx23 | 31P0117 | 01/15/02 | 3488 HRS | 10,200 | FD, CS | 🔧 |
| BRAND W | TREADMILL | 156 | EOIx15 | 31P0051 | 01/15/02 | 4004.04 HRS | 12,012 | FD, CS | 🔧 |
| BRAND W | TREADMILL | 156 | EOIx14 | 31P0070 | 01/15/02 | 5006.34 HRS | 15,018 | FD, CS | 🔧 |
| BRAND Y | TREADMILL 1500HR | | EOIx9 | 31P0062 | 01/15/02 | 3002.34 HRS | 9,006 | FD, CS | 🔧 |

Fig. 23.

AVERAGE TREADMILL WORKOUT LENGTH

NUMBER OF WORKOUTS

MINUTES: 0-10, 11-20, 21-30, 31-40, 41-50, 51-60, 61-70, 71-80, 81-90, 90+

522

MOST SELECTED TREADMILL COURSES

NUMBER OF WORKOUTS: 220, 180, 170, 168, 22, 7

COURSES: MANUAL, HILL VARIETIES, HEART RATE CONTROL, FITNESS TEST, INTERVAL GOAL

524

| MANUFACTURER | MODEL | S/N | S/W | COMMUNICATIONS ADDRESS |
|---|---|---|---|---|
| BRAND W | 156 TREADMILL | 000025 | 2.04 | IKP000025 |

525

| CLUB | MODEL | DATE | TIME | STATUS | COURSE | CALORIES | DISTANCE | MAX SPEED | MAX INCLINE | WORKOUT LENGTH |
|---|---|---|---|---|---|---|---|---|---|---|
| CLUB X-101 | TREAD 156 | 1/4/03 | 12:00:23 | START WORKOUT | HILL CLIMB | 253 | 6 MILES | 7 MPH | 5 DEGREES | 45 MIN. |
| CLUB X-101 | TREAD 156 | 1/4/03 | 3:00:53 | START WORKOUT | INTERVALS | 120 | 4 MILES | 10 MPH | 6 DEGREES | 28 MIN. |
| CLUB X-101 | TREAD 156 | 1/4/03 | 4:26:13 | START WORKOUT | HILL CLIMB | 253 | 6 MILES | 7 MPH | 2 DEGREES | 45 MIN. |

SPECIAL REPORTS: QUERY

RATHER THAN USE THE REPORTS PROVIDED, THE USER WOULD LIKE SERVICE TRACKER™ TO PROVIDE A SPECIFIC REPORT TO PERFORM ANALYSIS OR TO PROVIDE A SPECIFIC CROSS-SECTION OF DATA.

EXAMPLE 1: CLUB HQ WANTS SERVICE TRACKER TO DO AN OVERALL ANALYSIS OF PEAK TIME USAGE TO RECOMMEND A BETTER ASSORTMENT OF PRODUCTS.

EXAMPLE 2: CLUB HQ WANTS SERVICE TRACKER TO GENERATE AN END OF FISCAL YEAR REPORT TO SHOW USAGE (WEAR) ON ALL PRODUCTS PURCHASED IN 1999.

EXAMPLE 3: CLUB HQ WANTS SERVICE TRACKER TO GENERATE AN ANALYSIS TO SUPPORT A BETTER DISTRIBUTION OF CURRENT PRODUCTS AND NEW PRODUCTS BETWEEN LOCATIONS.

*Fig. 26.*

ALL UNIT STATUS
DISPLAYING RECORDS 1 THROUGH 21 OF 21 RECORDS FOUND

| MODEL | TYPE | I.D. NO. | CURRENT STATUS | CURRENT ERROR STATUS | ERROR E-MAIL SENT | LAST REPLY |
|---|---|---|---|---|---|---|
| 156 | EFX | E007 | ACTIVE | -- | -- | 10/9/2002 12:37:24 |
| 166 | TREAD | T012 | UNLINKED | -- | -- | 10/9/2002 12:37:32 |
| 146 | EFX | E010 | IDLE | -- | -- | 10/9/2002 12:37:43 |
| 156 | EFX | E101 | ACTIVE | -- | -- | 10/9/2002 12:37:32 |
| 156 | TREAD | T121 | ACTIVE | -- | -- | 10/9/2002 12:37:51 |
| 156 | TREAD | T056 | ERROR | 26 - TREAD ERROR; ERRATIC SPEED SENSOR | YES | 10/9/2002 12:36:05 |
| 134 | EFX | E037 | ACTIVE | -- | -- | 10/9/2002 12:36:34 |
| 156 | EFX | E019 | IDLE | -- | -- | 10/9/2002 12:36:45 |
| 146 | EFX | E026 | ACTIVE | -- | -- | 10/9/2002 12:36:48 |
| 134 | TREAD | T087 | ACTIVE | -- | -- | 10/9/2002 12:36:52 |

*Fig. 28.*

UNIT SERVICE HISTORY

| MODEL — 626 | S/N — 628 | S/W — 630 | I.D. NO. — 632 | COMMUNICATIONS ADDRESS — 634 |
|---|---|---|---|---|
| 156 | 31P0057 | 0.17 | E007 | 0050670F05FD |

| DATE — 636 | TIME — 638 | STATE — 640 | HOUR METER — 642 | ODOMETER — 644 | ERROR CODE — 646 | E-MAIL SENT — 648 |
|---|---|---|---|---|---|---|
| 09/5/2002 | 14:06:27 | ACTIVE | 8,000 | 567,098 STRIDES | - | - |
| 09/8/2002 | 04:16:22 | MAINTENANCE RECOMMENDED | 9,100 | 789,098 STRIDES | - | - |
| 10/5/2002 | 20:22:03 | ACTIVE | 9,500 | 1,345,504 STRIDES | - | - |

PREVENTATIVE MAINTENANCE REPORT FOR:
10/11/03

MY CLUB - LOCATION

| MODEL | TYPE | I.D.NO. | SERIAL # | INSTALL DATE | USAGE HOURS | MILES/ STRIDES | MAINT. STATUS | DATE |
|---|---|---|---|---|---|---|---|---|
| 156 | EFX | E007 | 31P0057 | 01/15/02 | 5000.33 HRS | 44684 | POSTPONED | 06/05/02 |
| 166 | TREADMILL | T012 | 31P0058 | 01/15/02 | 806.00 HRS | 7984 | POSTPONED | 06/05/02 |
| 146 | EFX | E010 | 31P0154 | 01/15/02 | 6006.34 HRS | 6558434 | COMPLETED | 06/05/02 |
| 156 | EFX | E101 | 31P0059 | 01/15/02 | 4701.64 HRS | 4268467 | COMPLETED | 06/05/02 |
| 156 | TREADMILL | T121 | 31P0062 | 01/15/02 | 77606.34 HRS | 65952 | POSTPONED | 07/15/02 |
| 156 | TREADMILL | T056 | 31P0117 | 01/15/02 | 6606.34 HRS | 56784 | COMPLETED | 07/15/02 |
| 134 | EFX | E037 | 31P0051 | 01/15/02 | 4004.04 HRS | 3058234 | COMPLETED | 07/15/02 |
| 156 | EFX | E014 | 31P0070 | 01/15/02 | 5006.34 HRS | 5098456 | COMPLETED | 07/15/02 |
| 146 | EFX | E026 | 31P0062 | 01/15/02 | 3002.34 HRS | 2048154 | COMPLETED | 07/15/02 |
| 134 | TREADMILL | T087 | 31P0042 | 01/15/02 | 2001.31 HRS | 12984 | COMPLETED | 07/15/02 |

Fig. 31.

CURRENT USAGE

| MODEL | TYPE | I.D. NO. | STATUS | CURRENT SPEED | CURRENT INCLINE | CURRENT RESISTANCE | CURRENT COURSE |
|---|---|---|---|---|---|---|---|
| 156 | EFX | E007 | ACTIVE | 104 STRIDES/MIN. | 12% GRADE | 1 | MANUAL |
| 134 | EFX | E212 | ACTIVE | 44 STRIDES/MIN. | 2% GRADE | 1 | CROSS-TRAINING |
| 154 | TREADMILL | T316 | ACTIVE | 14 MILES/HR | 8% GRADE | 3 | INTERVAL |
| 146 | EFX | E101 | ACTIVE | 124 STRIDES/MIN. | 4% GRADE | 2 | GLUTEALS |
| 146 | EFX | E010 | ACTIVE | 155 STRIDES/MIN. | 4% GRADE | 1 | GLUTEALS |
| 166 | TREADMILL | T012 | UNLINKED | – | – | – | – |
| 156 | TREADMILL | T121 | ACTIVE | 10 MILES/HR | 7% GRADE | – | GOAL |
| 146 | EFX | E026 | IDLE | – | – | – | – |
| 156 | EFX | E019 | ACTIVE | 14 STRIDES/MIN. | 0% GRADE | 3 | GLUTEALS |
| 156 | EFX | E056 | ACTIVE | 120 STRIDES/MIN. | 5% GRADE | 2 | CROSS-TRAINING |

*Fig.32.*

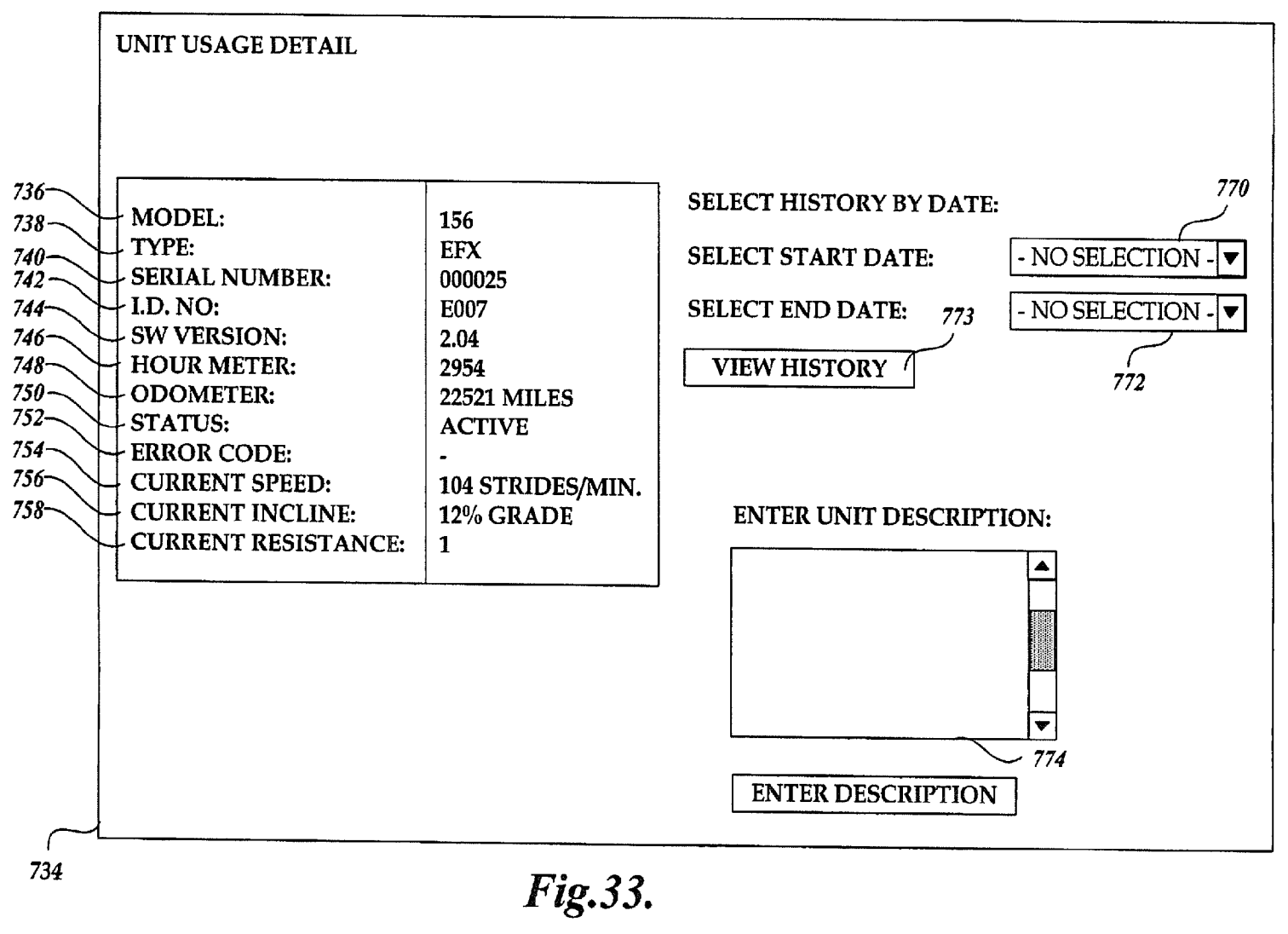

| UNIT USAGE DETAIL | | SELECT HISTORY BY DATE: | |
|---|---|---|---|
| MODEL: | 156 | SELECT START DATE: | - NO SELECTION - ▼ 770 |
| TYPE: | EFX | SELECT END DATE: 773 | - NO SELECTION - ▼ 772 |
| SERIAL NUMBER: | 000025 | VIEW HISTORY | |
| I.D. NO: | E007 | | |
| SW VERSION: | 2.04 | ENTER UNIT DESCRIPTION: | |
| HOUR METER: | 2954 | | |
| ODOMETER: | 22521 MILES | | |
| STATUS: | ACTIVE | | |
| ERROR CODE: | - | | |
| CURRENT SPEED: | 104 STRIDES/MIN. | | |
| CURRENT INCLINE: | 12% GRADE | | |
| CURRENT RESISTANCE: | 1 | ENTER DESCRIPTION | |

Fig. 33.

UNIT USAGE HISTORY

| MODEL | S/N | S/W | COMMUNICATIONS ADDRESS |
|---|---|---|---|
| 156 | 000025 | 2.04 | IKP000025 |

| DATE | TIME | STATUS | COURSE | WORKOUT CALORIES | WORKOUT DISTANCE | WORKOUT TIME |
|---|---|---|---|---|---|---|
| 10/10/2002 | 20:22:03 | START WORKOUT | MANUAL | 490 | 6021 STRIDES | 48 MIN. |
| 10/10/2002 | 14:30:00 | START WORKOUT | CROSS-COUNTRY | 350 | 4021 STRIDES | 32 MIN. |
| 10/10/2002 | 13:12:54 | START WORKOUT | WEIGHT LOSS | 650 | 7567 STRIDES | 58 MIN. |
| 10/10/2002 | 11:09:19 | START WORKOUT | MANUAL | 220 | 2001 STRIDES | 14 MIN. |
| 10/10/2002 | 10:22:03 | START WORKOUT | INTERVAL | 422 | 4921 STRIDES | 26 MIN. |
| 10/10/2002 | 08:15:03 | START WORKOUT | HILL CLIMB | 777 | 6845 STRIDES | 37 MIN. |
| 10/09/2002 | 20:22:03 | START WORKOUT | MANUAL | 490 | 6021 STRIDES | 48 MIN. |
| 10/09/2002 | 14:30:00 | START WORKOUT | CROSS-COUNTRY | 350 | 4021 STRIDES | 32 MIN. |
| 10/09/2002 | 13:12:54 | START WORKOUT | WEIGHT LOSS | 650 | 7567 STRIDES | 58 MIN. |
| 10/09/2002 | 11:09:19 | START WORKOUT | MANUAL | 220 | 2001 STRIDES | 14 MIN. |
| 10/09/2002 | 10:22:03 | START WORKOUT | INTERVAL | 422 | 4921 STRIDES | 26 MIN. |
| 10/09/2002 | 08:15:03 | START WORKOUT | HILL CLIMB | 777 | 6845 STRIDES | 37 MIN. |

*Fig. 34.*

INSTALLATION & WARRANTEE TRACKING QUERY

STEP 1 OF 6: CHOOSE LOCATION

PLEASE CHOOSE A LOCATION:

- GLOBAL
  - COMPANY A
  - COMPANY B
    - USA
      - NORTHWEST
        - WASHINGTON
          - SEATTLE METRO
            - DOWNTOWN
            - U. DISTRICT
            - NORTHGATE
            - BALLARD

[CLICK ON AN OPTION TO SEE THE NEXT LEVEL]

CANCEL    BACK    NEXT

INSTALLATION & WARRANTEE TRACKING QUERY

STEP 4 OF 6: WARRANTEE TYPE

CHOOSE A WARRANTEE TYPE

WARRANTEE TYPES:
FRAME
DISPLAY
MOTOR
CONTROLLER
PARTS
LABOR

*1042*

LOCATION: SITE 1A, LEVEL 3G
PRODUCT CATEGORY: TREADMILL

MODEL TYPE: MODEL TYPE 156

*1044*

CANCEL

BACK  NEXT

INSTALLATION & WARRANTEE TRACKING QUERY

STEP 5 OF 6: DISPLAY OPTIONS

☐ LIMIT SEARCH TO EXPIRED WARRANTIES ONLY
*1058*

DISPLAY AS:
⦿ SERIAL NUMBER — *1054*
⦿ UNIT IDENTIFIER — *1056*

LOCATION: SITE 1A, LEVEL 3G
PRODUCT CATEGORY: TREADMILL
MODEL TYPE: 156
WARRANTY TYPE: FRAME

*1060*

CANCEL      BACK    NEXT

INSTALLATION AND WARRANTY REPORT

LOCATION: [LOCATION OR SINGLE SITE SELECTION]
WARRANTY EXPIRATION TIME FRAME: [MM/DD/YY TO MM/DD/YY]
PRODUCT CATEGORY(S): [SELECTED CATEGORIES]
MODEL TYPE(S): [SELECTED MODELS]

| PRODUCT CATEGORY | MODEL TYPE | LOCATION | UNIT IDENTIFIER | UNIT INSTALL DATE | WARRANTY EXPIRATION DATES |||||||
|---|---|---|---|---|---|---|---|---|---|---|---|
| | | | | | FRAME | DISPLAY | PARTS | LABOR | MOTOR | MOTOR FAN | |
| TREADMILL | 156 | CLUB X | | 12/13/02 | 12/13/06 | 12/13/05 | 12/13/02 | 12/13/04 | 12/13/04 | 12/13/04 | |
| TREADMILL | 156 | CLUB X | | 1/14/03 | 1/15/07 | 1/15/06 | 1/15/03 | 1/15/03 | 1/15/05 | 1/15/05 | |
| TREADMILL | 156 | CLUB X | | 3/2/03 | 3/2/07 | 3/2/06 | 3/2/05 | 3/2/05 | 3/2/05 | 3/2/05 | |

| HOUR METER | ODOMETER | SERVICE HISTORY |
|---|---|---|
| 22,400 | 89,000 MILES | VIEW |
| 18,100 | 8,100 MILES | VIEW |
| 15,300 | 72,100 MILES | VIEW |

Fig. 43.

REQUEST SERVICE:

| | |
|---:|:---|
| CLUB NAME: | _____ |
| ACCOUNT NUMBER: | _____ |
| NAME OF PERSON REQUESTING SERVICE: | _____ |
| ADDRESS: | _____ |
| CITY/STATE/ZIP: | _____ |
| PHONE: | _____ |
| UNIT MODEL: | _____ |
| SERIAL NUMBER: | _____ |
| SYMPTOMS UNIT IS SHOWING: | _____ |

SERVICE HISTORY CHECKED? ○ YES ○ NO
REPEAT CALL? ○ YES ○ NO
BILLABLE: ☐
WARRANTY LABOR: ☐
WARRANTY PARTS: ☐

| | |
|---:|:---|
| CS REP: | _____ |
| TODAY'S DATE: | _____ |
| DISPATCH REP: | _____ |
| DATE DISP: | _____ |
| TIME DISP: | _____ |
| CALL NUMBER: | _____ |
| DISPATCHED TO: | _____ |

[ CANCEL ]                              [ REQUEST SERVICE ]

FITNESS FACILITY EQUIPMENT USAGE CONTROL SYSTEM

CROSS-REFERENCE TO RELATED PATENT APPLICATIONS

The present application is a continuation of U.S. patent application Ser. No. 14/458,787 filed on Aug. 13, 2014, which is a continuation of co-pending U.S. patent application Ser. No. 13/789,114 filed on Mar. 7, 2013, now U.S. Pat. No. 8,882,637, which is a continuation-in-part of U.S. patent application Ser. No. 13/419,488 filed on Mar. 14, 2012, now U.S. Pat. No. 8,419,593, which is a continuation of U.S. patent application Ser. No. 12/888,669 filed on Sep. 23, 2010, now U.S. Pat. No. 8,157,706, which is a continuation-in-part of U.S. patent application Ser. No. 12/581,417, filed on Oct. 19, 2009, now U.S. Pat. No. 7,988,599, which is a continuation of U.S. patent application Ser. No. 10/765,704 filed on Jan. 26, 2004, now U.S. Pat. No. 7,621,846, which claims priority from U.S. Provisional Application Ser. No. 60/442,934 filed on Jan. 26, 2003, the full disclosures of which are hereby incorporated by reference.

BACKGROUND

In general, fitness facilities and clubs (such as Gold's Gym, Bally's, 24-Hour Fitness, etc.) obtain service information regarding their fitness equipment units (FEUs) via one of two methods. In the older method, when an FEU becomes inoperative, a patron typically alerts a manager or other personnel at the particular fitness facility. The manager then inspects the unit and determines whether a telephone call to a service provider is warranted. If so, the provider sends a serviceperson to the facility to diagnose and repair the problem. The unit is then put back in operation. The information regarding each of these events is sometimes manually tracked by the facility and/or the service provider.

In the second method, each FEU is equipped with a display screen and various internal monitoring components. The monitoring components determine when a problem exists within the FEU. The components then either report this information in the form of an error code displayed on the unit's screen or simply registers the problem on an internal interface board. When a particular FEU becomes inoperative, the patron alerts a facility employee of the problem. The employee then goes to the unit to determine whether a telephone call to the service provider is needed. If so, the provider sends a serviceperson to the facility to diagnose and fix the problem. The FEU is then put back in operation. As above, the information regarding each of these events is sometimes manually tracked by the facility and/or the service provider.

As will be appreciated, the current situation is labor intensive, costly, time-consuming, error-prone, and inefficient. In addition, and perhaps more importantly, the current system gives patrons a negative impression of the fitness facility because the patron is aware of a broken FEU. It also makes patrons irritated in that they have to either spend time reporting a broken unit or forego reporting it and feel guilty or disgusted. Moreover, the patron may have to wait until another similar FEU is available for use. Another disadvantage to the above system is that the type and frequency of problems experienced by a particular FEU is generally lost. This information has use in determining warranty rights and responsibilities as well as making FEU replacement decisions. In currently warranty reporting, the facility manager generally relies on anecdote and unsubstantiated impressions of the performance of a particular FEU.

Thus, a need exists for a more efficient service tracking and alerting system for FEUs at fitness facilities. A more ideal system would be capable of not only tracking such problem events, but also of immediately alerting at least the facility personnel when a problem has arisen. This way, the facility personnel can immediately post an "Out of Service" sign on the machine, and the patron will not have to become involved.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 11 is a query screen for obtaining purchase history information of fitness equipment units;

FIG. 12 is a report screen corresponding to the query screen of FIG. 11;

FIG. 16 is a report screen corresponding to the query screen of FIG. 15;

FIG. 23 is a report screen corresponding to the query screen of FIG. 22;

FIG. 25 is a report screen corresponding to the query screen of FIG. 24;

FIG. 26 is a query screen to obtain special report summary information;

FIG. 28 is a report screen providing a service status of fitness equipment unit groupings;

FIG. 30 is a report screen showing the service history of a particular fitness equipment unit shown in FIG. 28;

FIG. 31 is a preventative maintenance report for a selected grouping of fitness equipment units;

FIG. 32 is a summary report for the current usage of fitness equipment units of a desired grouping;

FIG. 33 is a report screen showing detailed usage information on a particular fitness equipment unit from FIG. 32;

FIG. 34 provides a history of the usage of a particular fitness equipment unit selected from FIG. 32;

FIG. 37 is a first screen of six utilized for selecting the parameters for an installation and warranty tracking report;

FIG. 40 is the fourth screen of the query;

FIG. 41 is the fifth screen of the query;

FIG. 43 is a report screen providing installation and warranty information; and

FIG. 44 is a service request screen.

DETAILED DESCRIPTION OF THE EXAMPLE EMBODIMENTS

Figure 1:
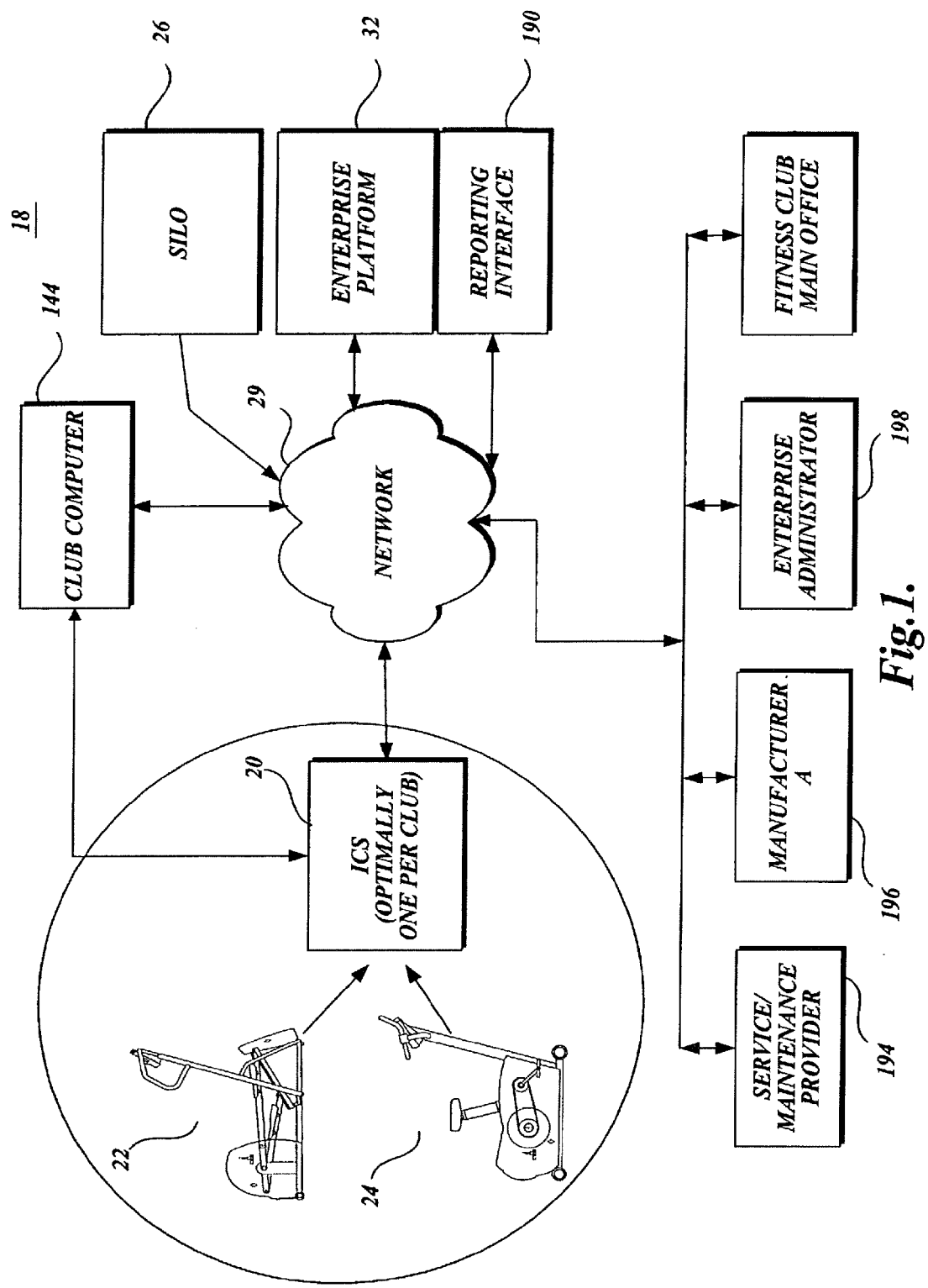
FIG. 1 is a schematic illustration of one embodiment an information tracking system, a service tracking system, a service alert messaging service, and a reporting interface, each formed in accordance with the present invention.

The present invention is a service tracking and alerting system 18 for FEUs located at fitness facilities. These fitness facilities can be commercial fitness clubs and gyms, exercise facilities at schools and universities, resorts, hotels, social clubs or companies, as well as all other locations where FEUs are used. The present invention has a number of unique aspects that may be used in combination or alone. Therefore, while the text and depictions below describe and illustrate one system having all aspects, it is to be kept in mind that portions of the system 18 may be used separately.

Referring initially to FIGS. 1-4, in general, the system 18 of the present invention includes using one or more information control servers (ICSs) 20 to collect real time service information from FEUs, for example, exercise cycle 22 and elliptical trainer 24, located at a particular fitness facility. Each ICS comprise one or more computing devices that stores this information in a temporary database 25. Periodically, the information is transmitted to an accumulated data storage unit or data silo 26 via a communications/date transmissions network 29. The accumulated data storage unit may include a permanent database 27 having a cache 28 of history service information. Upon receipt of service information from a ICS, the accumulated data storage unit incorporates the newly-received service information into the permanent database 27. The ICS then continues a new round of collecting real time service information from the FEUs. Although only one silo 26 is shown in the figures, it is to be understood that multiple silos with their corresponding ICSs can be utilized. The multi-silo arrangement may be accessed and controlled using an enterprise level platform 32.

The system 18 of the present invention is further capable of providing service alert messages to one or more users if the state of a particular FEU should warrant. The service alert message may be generated by the ICS 20, the accumulated data storage unit 26, and/or the enterprise level platform 32 depending on the criteria set for sending it. The service alert message is preferably sent via a data/communications network 29 which may be in the form of email, instant message, a voice mail message, text message via cellular phone, walkie-talkie, a pager, etc.

Figure 2:
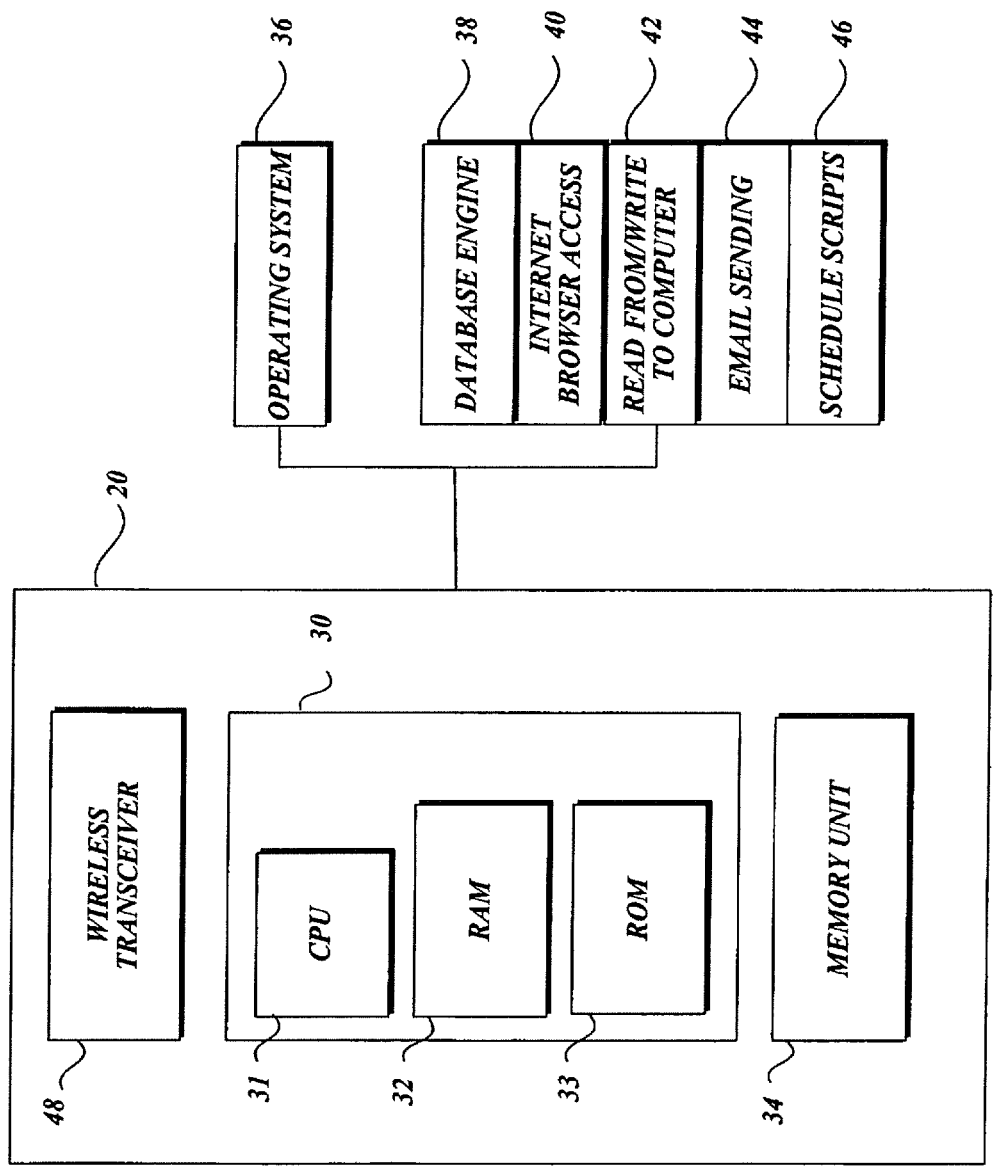
FIG. 2 is a schematic view of a portion of the system of the present invention shown in FIG. 1.
Figure 3:
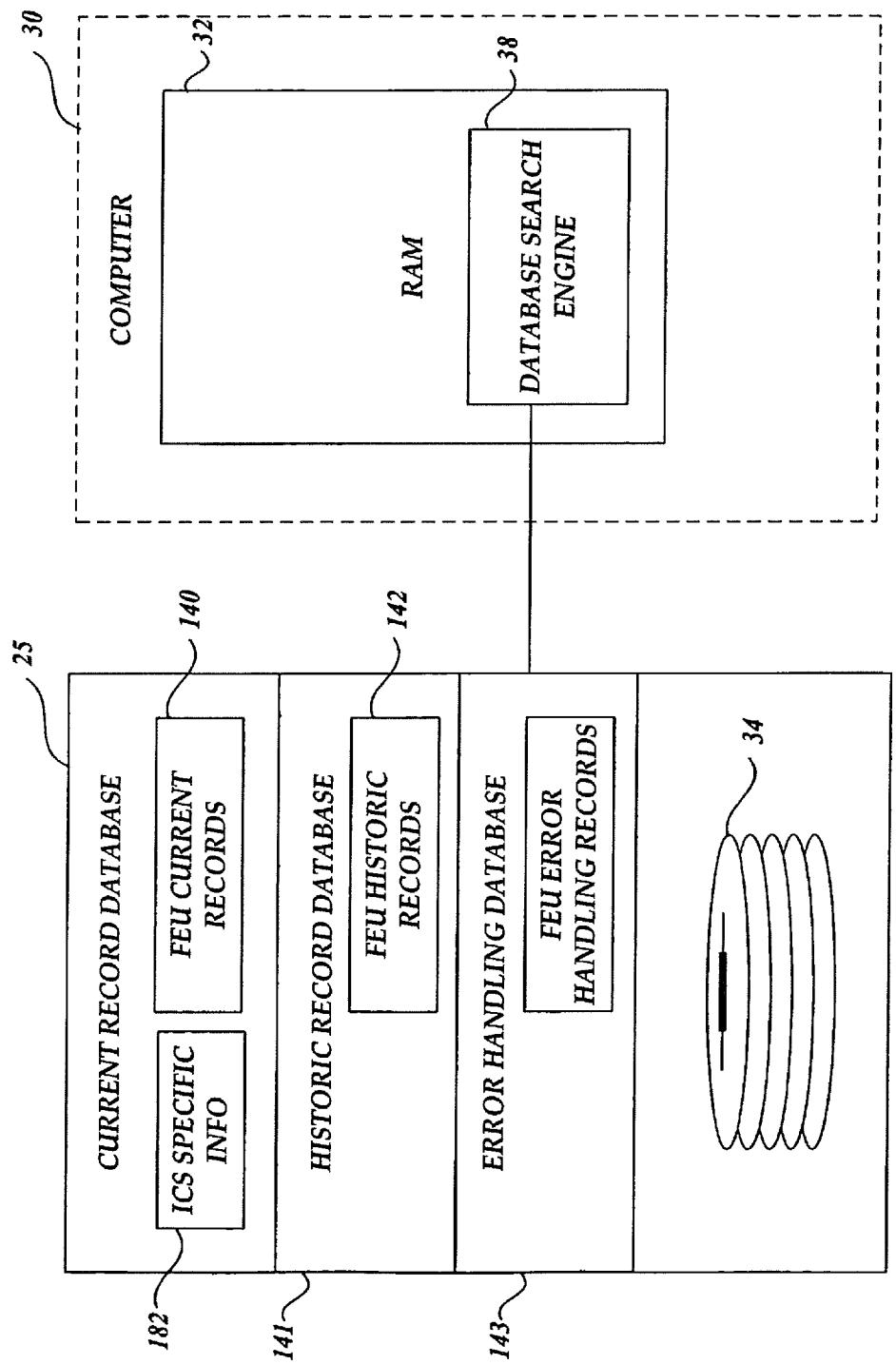
FIG. 3 is a schematic view of a portion of the system of the present invention shown in FIG. 2.

In more detail and referring to FIGS. 1-3, each ICS 20 is associated with a fitness facility. The term "ICS" as used herein is defined as a system 20 that includes a computer 30 having a CPU 31 memory (RAM 32 and ROM 33) for collecting service information from an FEU via a wireless communication link, storing the collected service information in an electronic data memory unit 34, and providing access to the collected service information. Such computers are now commonplace and thus will not be described with any detail here. One example of an ICS suitable for the present invention is the Envenergy Mediator. The system's memory unit 34 can be in the form of a removable/non-removable, volatile/non-volatile storage media. Non-limiting examples include a hard disk drive, a solid state flash disk, a magnetic drive, a tape drive, an optical disk drive, or other optical media. Removable storage media could include zip disks, flash cards, USB drives, magnetic or digital tapes, and the like. In addition to storing the collected storage information/data, the memory unit 34 is also used to store program modules, such as an operating system and application programs. Computer 30 runs programs capable of accomplishing the functions of the ICS.

In one embodiment of the present invention, the ICS may run operating system software 36, such as an object based operating system. Non-limiting examples of applicable operating systems include Microsoft Windows™ or Linux™. For applications software, the ICS may run a database engine 38 to manage and search the data in the database of the ICS. One such search engine is sold under the name Filemaker™. A plugin 40 may be used in the database engine to allow the database records to be accessed from an Internet browser. Web Companion™ is one such plugin. The applications software may also include software 42 to enable the database software to read from and write to serial ports of the ICS computer. One such software for this purpose is Trio™. Of course, other data ports of the ICS may be utilized for data input and output other than the serial port. The applications software may also include plugin 44 to enable the database software to send emails. One such software is SMTPit™. If service alert messages are sent other than via email, then other appropriate software can be utilized with the chosen database engine. In addition, the application software may include a component 46 to schedule scripts. One such plugin is sold under the trademark Events™. Of course, some of the foregoing applications' functions may be integrated together rather than constituting individual plugins for the database management software 38.

Also, other application software may be utilized with the ICS 20, other than those described above, to perform those functions described above and other functions required of the ICS pursuant to the present invention. In this regard, the ICS may utilize software that is part of the enterprise level software. One such integrated software is Envenergy Mediator. This particular software has many of the functions of the foregoing plugins already integrated therein. Also, with this software, significant records are not maintained on the ICS; rather, the data collected by the ICS is periodically transferred to the silo 26 and thereafter the data in the ICS is purged.

Alternatively, the ICS could be software applications that are loadable onto an existing personal computer or other computer and capable of accomplishing these functions. In one embodiment, the ICS is a dedicated computer residing at the facility of the FEUs and including a centralized memory 34 for storing collected service information.

By being "associated" with a fitness facility, the ICS may be located at the facility itself, or it may be located off-site from the facility. This may depend in part on the communication link used between the FEUs and the ICS. Also, depending on the number of ICSs at a particular facility, it may be necessary to utilize more than one ICS at a facility or club.

The ICS includes the ability to poll the FEUs at their facility, either sequentially or simultaneously, and to make such information accessible to one or more users. By way of background, current FEUs may have the ability to internally track various types of service information and data, for example, e.g., odometer reading, current status, error history, etc. Such machines typically include a two-way communications port following the "Communication Protocols and Standards for Exercise Equipment", or CSAFE port, for short. The CSAFE port is an industry standard that is shaped somewhat similarly to a telephone jack. In one embodiment of the present invention, each FEU includes an radio frequency transceiver connected to the CSAFE port and also to a transceiver 48 connected to a communications port of the ICS. An example of such a transceiver is the AeroComm RF transceiver model No. AC5124C, manufactured by AeroComm, Lenexa, Kans., USA. Alternatively, other wireless protocols or even a power line transceiver may be used in lieu of the RF-based transceivers.

Figure 5:
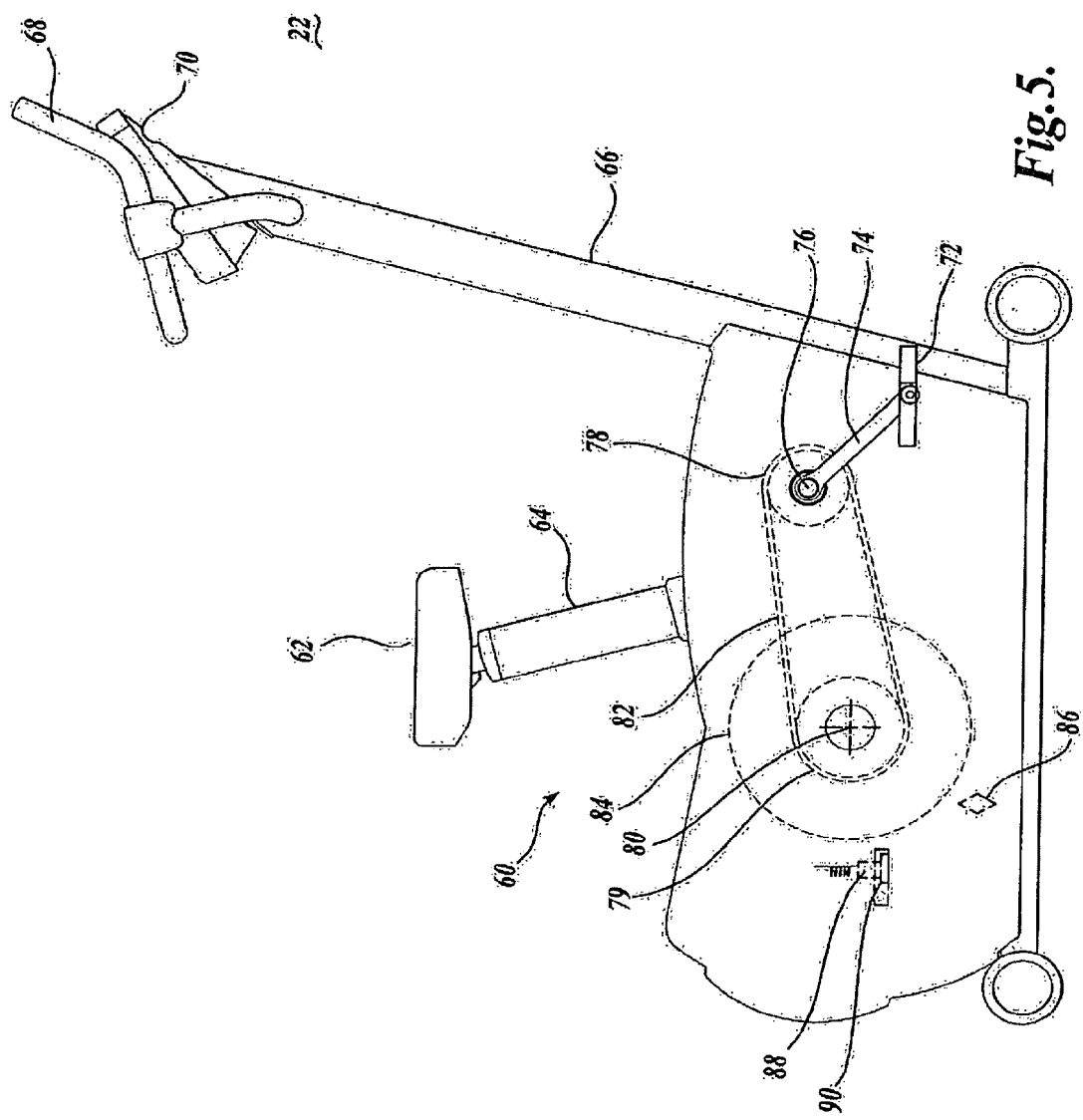
FIG. 5 is a side elevational view of a fitness equipment unit that may be monitored through the system of the present invention.
Figure 6:
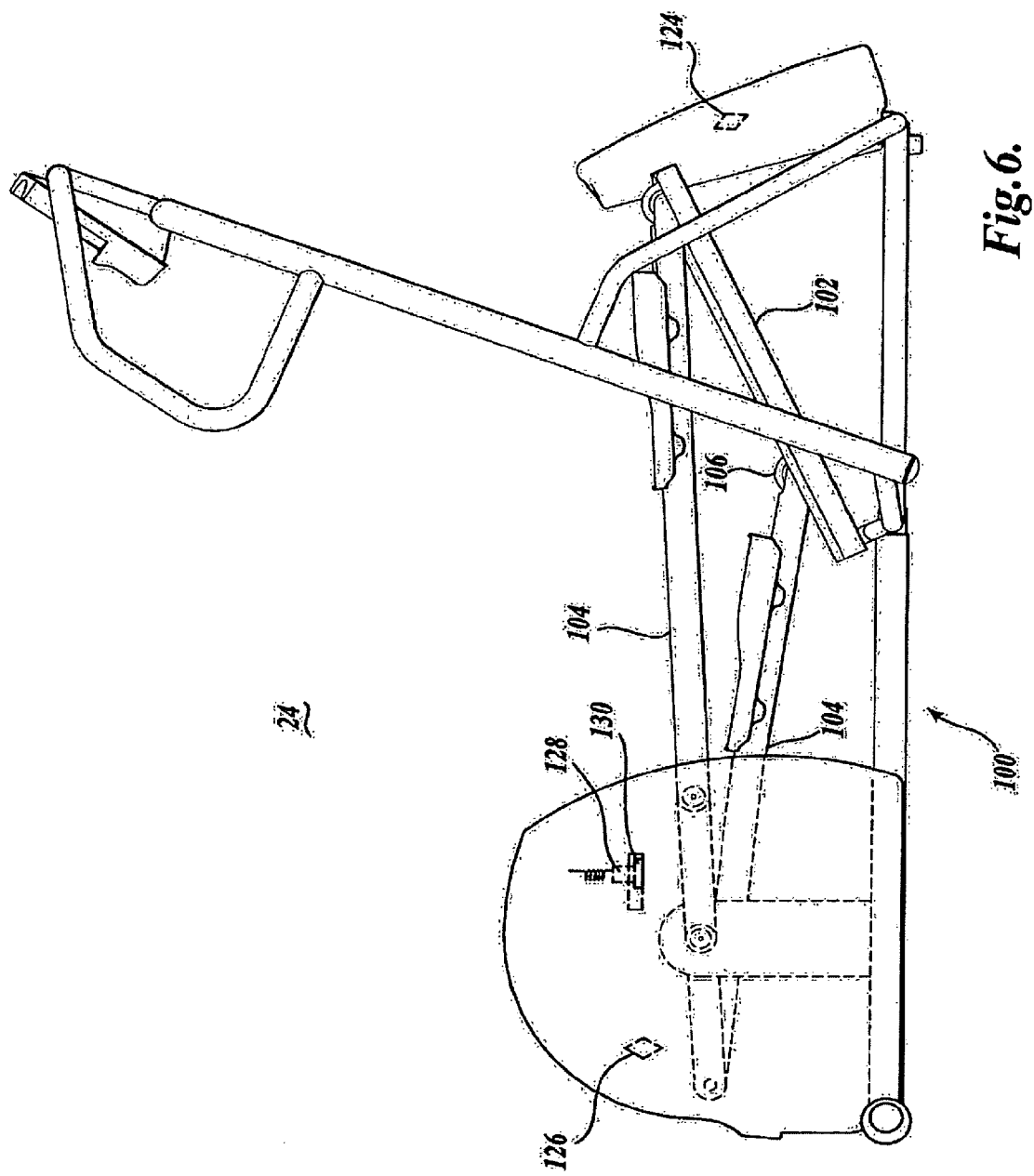
FIG. 6 is another fitness equipment unit that may be monitored through the system of the present invention.

As shown primarily in FIGS. 5 and 6, the present invention may be utilized in conjunction with an FEU in the form of an exercise cycle 22 having a frame 60, a seat 62 mounted on the upper end of a seat post 64. The frame also includes a forward post 66 for supporting handlebars 68 and control/display panel 70 at the upper end of the post 64. The exercise cycle 22 also includes pedals 72 mounted on the outer ends of cranks 74 coupled to a crankshaft 76. A drive sheave 78 is splined, keyed, or otherwise coupled to the crankshaft 76 and trained to a drive sheave 79 splined or keyed to a drive shaft 80 by belt 82. A flywheel 84 is also coupled to the drive shaft 80. Resistance to the rotation of the flywheel 84 may be applied by an eddy current brake or other type of brake, not shown. Sensors, such as sensor 86, as well as other sensors, may be utilized to measure numerous operational parameters of the exercise cycle 22, including the speed of rotation of the flywheel 84, the number of revolutions of the flywheel 84 or crank 74, the resistance load imposed on the flywheel by the braking system, the length of time of a current workout. As shown in FIG. 5, the exercise cycle 22 also includes a radio frequency transceiver 88 connected to a CSAFE port 90.

The present invention may also be utilized in conjunction with other types of exercise equipment, for instance an elliptical trainer 24 as illustrated in FIG. 6. This apparatus includes a floor mounted frame 100 on which is mounted an elevatable front ramp 102 for supporting the forward ends of foot links 104 through rollers 106 axled to the front end of the foot links. The rear end of the foot links 82 are coupled to the outer ends of crank arms 108 sending outwardly from a crank shaft 110 journaled in an upright support structure 112. A flywheel 114 is keyed, splined or otherwise coupled to the crank shaft 92. Foot support plates 116 are mounted on the upper side of the foot links 104 for supporting the user's feet. A forward post structure 118 extends upwardly and forwardly from the frame 100 to support at its upper end a handlebar assembly 120 and a display/control panel 122.

Sensors 124 and 126 sense, among other operating parameters, the angle of the ramp 102, the rotational speed of the flywheel 114, the resistance being applied to a flywheel by a braking system, not shown, the number of revolutions of the flywheel, the time duration of the exercise session, as well as other parameters. As in the cycle 22, the elliptical trainer 24 also includes a radio frequency transceiver 128 that is wired to or otherwise connected to a CSAFE port 130.

According to the present invention, in one embodiment, ICS 20 is used to sequentially poll each FEU regarding one of a multitude of service information data types. See FIG. 7. The ICS may include a master transceiver 48 (e.g., using an AeroComm radio) that sends a query including an FEU identification number. Each FEU receives the query from the master transceiver, determines whether it is the FEU of interest, and responds with the answer if so, see FIG. 7. In another embodiment, software is used on an existing computer to simultaneously poll multiple FEUs at a fitness facility via radio frequency transmissions.

Each ICS has driver software to enable the ICS to communicate with the radio frequency transceiver, as well as driver software to receive the CSAFE format data from the FEU and convert such data to a desired format for storing in the ICS, and/or transmitting onto the silo 26 and/or enterprise platform 32.

The database 34 has one service information record 140 for each FEU for each time polled, see FIG. 3. Each such record 140 can include such information as:

--- a communication address used by the ICS to communicate with a specific FEU;
a FEU identification number as assigned by FEU owner;
manufacturer Model name/number and serial number of the FEU;
text that uniquely describes the FEU;
current state of the FEU, including:
"ready"--when FEU is idle;
"on-line"--FEU is in use, typically by a user, but perhaps by a service or maintenance person running the FEU's diagnostics;
"error"--FEU has detected a hardware error and thus has made itself unavailable for use;
"no response" to last poll (a true or false value);
time since the last response;
software version;
current odometer reading;
current hour meter reading;
current speed (for example, pedaling speed, flywheel speed, or treadmill belt speed);
sum for average speed;
maximum speed;
current incline of treadmill, elliptical cross-trainer or other applicable FEU;
sum for average incline;
maximum incline;

-continued current resistance level;
sum for average resistance;
maximum resistance;
current user power;
sum for average user power;
maximum user power;
count for all of the foregoing averages;
current user heart rate;
current or last used course;
current or last user weight and age;
current or last user workout time, distance, and calories expended; and
current or last user average and maximum heart rates, and time spent in the heart rate zone.

A new record 140 is created each time an FEU changes state.

The ICS 20 may maintain a history database 141 showing the usage of the FEUs being monitored, see FIG. 3. For each FEU, the history database 141 contains one record 142, each of which may contain the following information:

communications address;
FEU identification number as assigned by FEU owner;
manufacturer's Model number/name, and manufacturer's serial number for unit;
text that uniquely describes the FEU;
the event which changed the state of the FEU, i.e., "ready" to "off-line", "off-line" to "ready", "off-line" to "error", etc.;
date and time;
odometer reading;
hour meter reading;
average and maximum speed, for example pedaling speed or treadmill belt speed or flywheel rotational speed;
average and maximum incline (if applicable);
average and maximum resistance (if applicable);
average and maximum user power;
course;
weight and age of user;
workout time, distance traveled and calories expended;
average and maximum heart rate of exerciser, and time spent in the heart rate zone; and
error code.

Figure 7:
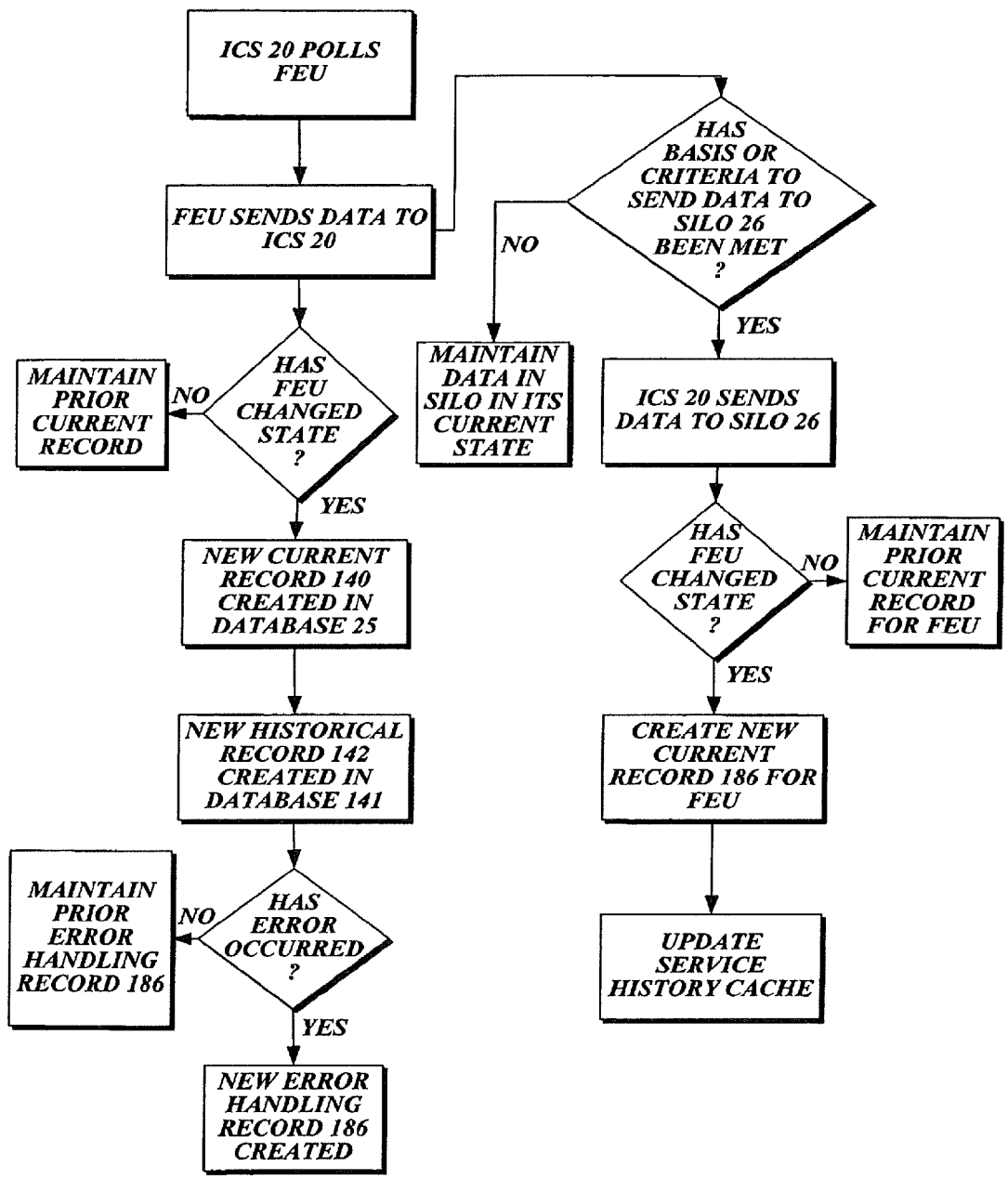
FIG. 7 is a flow diagram illustrating service records created and maintained by the system of the present invention and the updating thereof.

When the ICS 20 detects a state change from "ready" to "off-line" (for example, in use), the history database for the FEU is updated with a new record 142 containing the data entries listed above, see FIG. 7. Also, when a unit is in the "off-line" state, the ICS updates all the fields for the current record 140 for that particular FEU in the FEU's current record database.

The ICS 20 may also include an errors database 143 containing information on the current and previous errors for all of the FEUs at a particular location, see FIG. 3. The information in this dataset may include the FEU's communications address, the FEU I.D. number, the manufacturer's name, model and serial number, the error code, the error code text, the date and time of record creation, the date and time of the most recent occurrence of this error code, the number of occurrences counter, whether or not an error code was sent, and if so, the time and date of sending, the time and date of the error code acknowledgement, whether or not service has been performed for this error code, and the time and date of the service activity.

Figure 4:
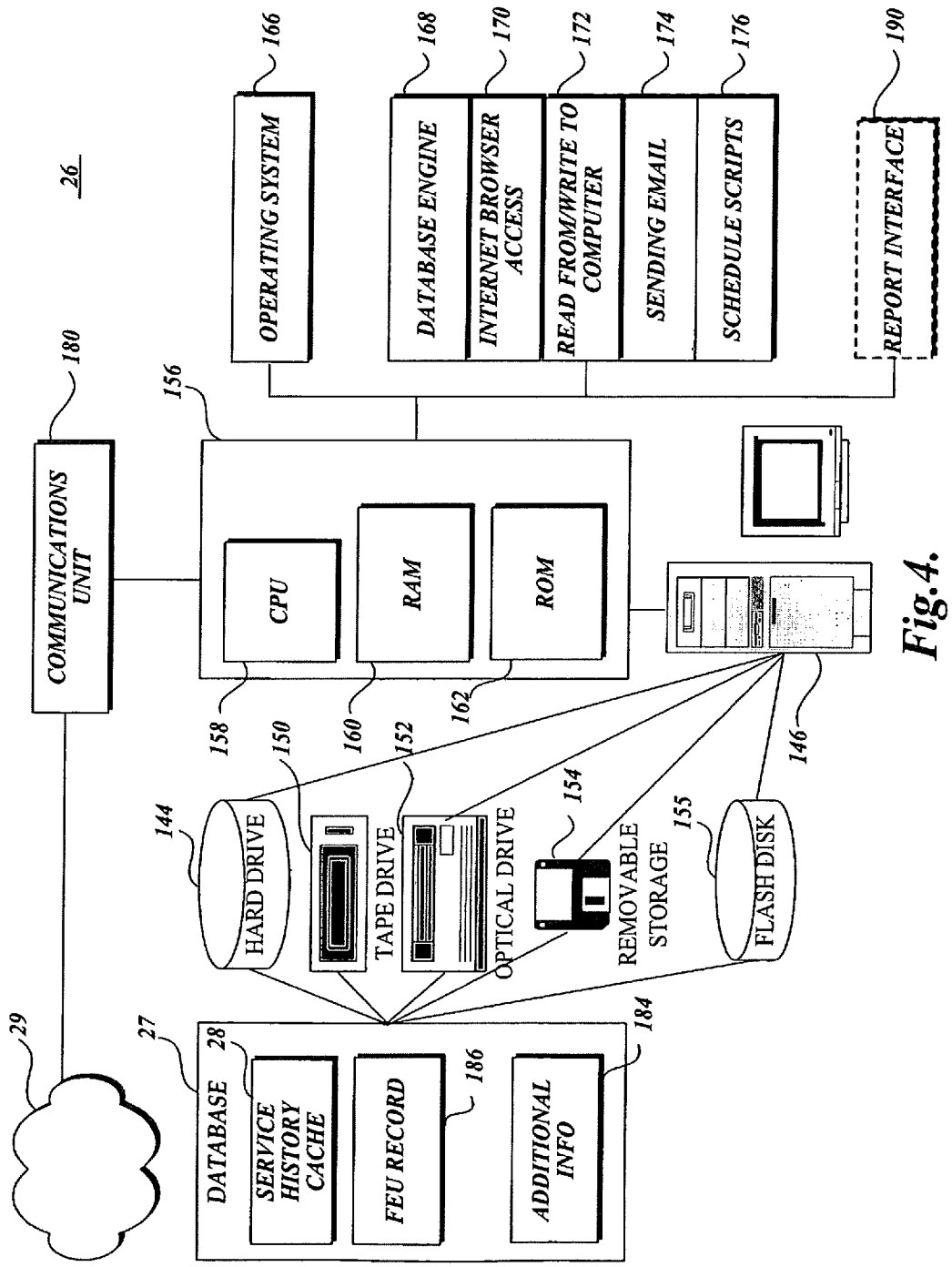
FIG. 4 is a schematic view of another portion of the system of the present invention shown in FIG. 1.

Referring to FIGS. 1 and 4, each ICS 20 is in communication (e.g., TCP/IP protocol connections) with the accumulated data storage unit 26 and optionally with other club computers, for example, a computer 144, see FIG. 1. The ICS 20 may be linked to the on-site club computer 144 via direct connection or local area network rather than through the network 29. In one embodiment, the accumulated data storage unit 26 is a Web-based server 146 connected to the Internet or other network 29 and having a large data storage unit that may be in the form of a hard drive 144, a tape drive 150, an optical drive 152, a removable memory medium 154, a solid state flash disk, or other type of memory device. The server 146 also includes a computing system 156 to operate the data storage unit. The computing system 156 includes a CPU 158, RAM memory 160, ROM memory 162, and other standard components that are utilized in servers, such as server 146. The server may also include an associated monitor 164, as well as input devices, such as a keyboard, pointing device, track balls, microphones, touch screens, joy sticks, and the like, not shown. Typically these input devices are connected to the computing system 156 by a serial port, a parallel port, USB port, fire wire port, SCCSI port, or the like.

The server 146 is operated under operating system and applications software, as would typically be the case. The operating system software 166 may be an object-based software or other type of software. As with the case of ICS 20, the server 146 may operate various types of application software, including a database engine 168 to organize and control the database 27 and also to obtain information from and organize information in the database when so instructed by the user, as discussed more fully below. To this end, the server 146 may also include an Internet browser access software 170, software to read from and write to the computer 172, software 174 to send e-mails or other types of communications from the server, and software 176 to schedule scripts. As with the ICSs, the software of the server 146 may be part of the overall enterprise level software, and thus integrated with the enterprise platform.

The present invention contemplates that system 18 would consist of a number of silos 26 with corresponding ICSs 20. These multiple silo systems are managed by the enterprise level platform 32, FIG. 1. This platform may communicate with the silos 26 as well as with the ICSs 20 and system users via network 29, which may be a wide area network, i.e., the Internet, a local area network, dial-up system, etc. The enterprise platform 32 may include its own hardware and software. One example of enterprise level software may include Envenergy Mediator. Numerous types of server hardware could be used for the enterprise platform.

As noted above, each ICS 20 periodically sends the contents of its temporary database 25 to the accumulated data storage unit 26 for permanent storage in permanent database 27. The connection between the ICS and the accumulated data storage unit 26 is via the network 29 which may be "a connection via the Internet", which could be wireless (i.e. 802.11), or by network cable, dial-up modem, satellite, etc. This allows the ICS 20 to reuse its memory for storing more new real time service information from FEUs. To this end, the server 146 includes a communications unit 180 as well as applicable hardware and software, to enable the server to communicate over the network 29 with the ICSs, also with users, as discussed more fully below.

In addition, the service information stored in the accumulated data storage unit 26 has a multitude of uses, many of which are described in detail below. The transfer of real time service information to the accumulated data storage 26 unit can be done on predefined time basis, or when a certain criteria is met (such as the ICS memory is close to being full), or according to whatever other basis is desired.

The service information collected by the ICS 20 and the accumulated data storage unit 26 preferably includes service information from all types of FEUs of a particular club or facility, including those FEUs from different manufacturers. As discussed below, the present invention can provide the club owner with a great amount of useful information. Further, it is possible to form a single accumulated data storage unit that is industry wide. Thus, ICSs from different fitness clubs could transmit service information to a single accumulated data storage unit. All manufacturers could have access to the accumulated data storage unit and would be required to use a unique access method in order to gain access to data on the FEUs that they manufactured.

The ICS 20 and accumulated data storage unit 26 each store some information that is the same, and may also store information that is unique to one or the other. For example, the ICS system memory 34 may also store associated notes regarding a particular event, e.g., patron comments, the manager on duty at the time of an event, use counters to alert management of the need for more machines, as well as other specific information 182, etc. By way of another example, the accumulated data storage database 27 may also store facility locations, manager phone numbers, time in existence, and other specific information 184, etc.

In one embodiment of the present invention, the permanent database 27 contain, for each FEU, one record 186 per event. Types of information may include those listed above concerning the information stored in the harvesting memory 34, for example: FEU identification number, state, date and time, odometer value, hour meter value, speeds, incline, resistance, power use, course, workout performance, error code, etc.

Figure 8:
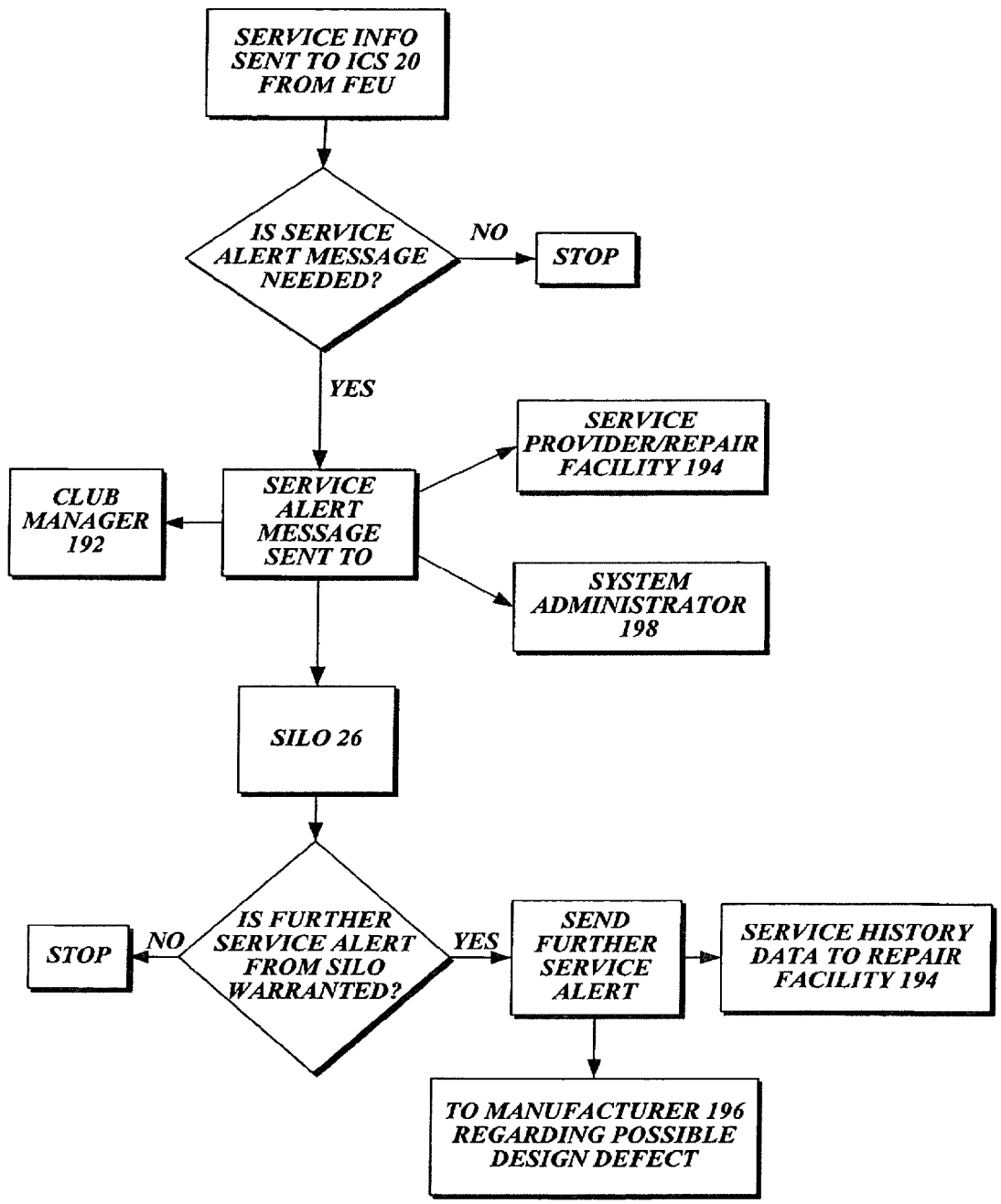
FIG. 8 is a flow diagram pertaining to the sending of service alert messages.

In accordance with further aspects of this invention and referring to FIG. 8, the system is further capable of providing a service alert message to one or more users if the state of a particular FEU should warrant. Typical FEU states are:

"ready"--this means that the FEU is idle;
"off-line"--this means that the FEU is in use, either by a user or being serviced by service or maintenance personnel;
"idle";
"active";
"no response"--meaning the FEU does not respond to polling by the ICS. The lack of a response by the FEU may be due to one of three possibilities:
  the FEU is self-powered and is currently not being used;
  the FEU (and its wireless transmitter) has been moved out of range of the ICS's radio;
  the communication channel between the ICS and FEU is disabled, possibly intermittently;
"error"--this means that the FEU has detected a hardware error and thus has made itself unavailable for use.

The ICS 20 captures the service information and makes a determination as to whether a service alert message is needed, see FIG. 8. The criteria used may be permanently predefined, or may be modifiable according to the needs of the facility. For example, one facility may decide that service information pertaining to power-off do not warrant a service alert message.

The service alert message may be generated by the ICS 20, by the accumulated data storage unit 26, and/or by the enterprise platform 32, depending on the criteria set for sending the message, see FIG. 8. For example, if an FEU experiences a burned out motor, the ICS may send: (1) a service alert message to the facility manager apprising him or her of the situation, (2) a service alert message to a repair facility requesting a new motor, and (3) a service alert message to the accumulated data storage unit 26 which then determines if a trend exists and, if so, sends a service alert message to the manufacturer regarding a potential design defect in their motors and another service alert message to the repair facility with history service data.

As an alternative to the foregoing procedure, the ICS 20 may send an error code to the enterprise platform, and the service alert is then generated by the enterprise platform based on the rules and criteria that have been established. In this alternative, the data storage unit 26 also would not itself send service alerts or messages to manufacturers or others; rather, such alerts and messages would also be sent by the enterprise platform.

In one embodiment, a service alert message is generated only for an error status. The message may include a complete solution to the error including identification of which unit has failed, error type, other relevant data from the equipment (e.g., odometer reading), and (low priority) technical support information with step-by-step instruction on how to connect and suggested parts needed. In addition, service alert messages may be generated and sent to club managers when preventive maintenance is needed.

Figure 10:
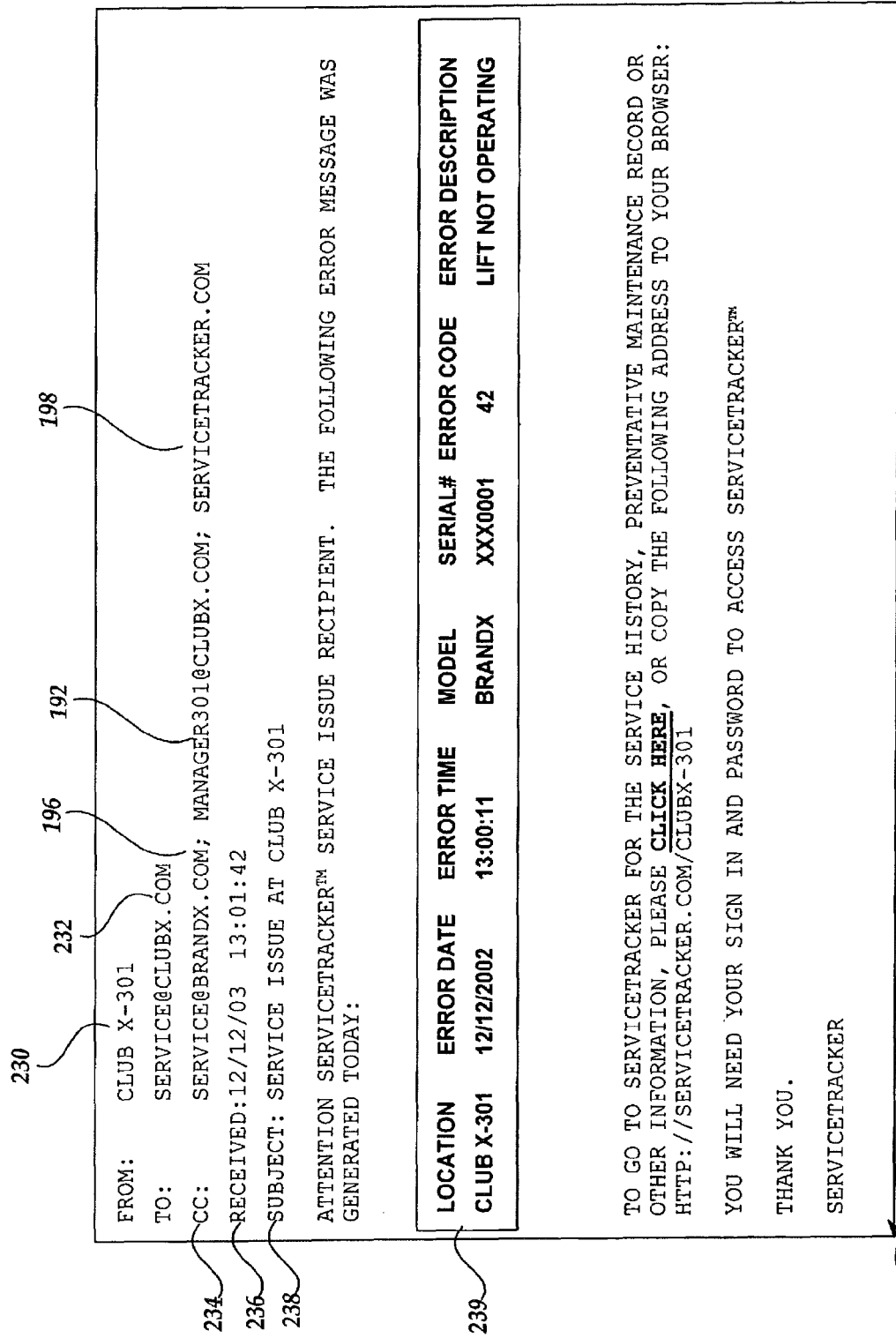
FIG. 10 is an example of a service alert.

As will be appreciated by a reading of the above, there are numerous configurations possible regarding service alert messages. Particularly desirable aspects include the use of a wireless communication of the service alert message (e.g., email, SMTP/IP, voice mail, pager, text message, satellite communication, cellular connection, etc.), the ability to send the alert message to one or more recipients, and the ability for the message to be sent automatically and in electronic form. FIG. 10 illustrates one embodiment of an example service alert message.

In accordance with yet other aspects of this invention and initially referring to FIGS. 1 and 4, the system 18 further includes a reporting interface 190 accessed via the enterprise platform 32. The interface 190 allows a user to view both real time and history service information of FEUs by accessing the accumulated data storage unit 26 and/or one or more ICSs 20. In reporting interface aspect, the ability to query multiple aspects simultaneously and the ability to manage the information is accomplished at different levels.

In one embodiment, log-on access to the interface 190 is provided by a Web-based (preferably, access-controlled) system linking the user via the enterprise platform to an accumulated data storage unit 26. Real time data may be obtained from a ICS 20 through network 29 (e.g., Internet, intranet), accessed by direct dial-up account, cellular phone line, cable modem, satellite modem, etc. Alternatively, in systems having ICSs that continuously send their real time data to the accumulated data storage unit 26, the secondary link to the ICS(s) may be unnecessary.

Figure 8A:
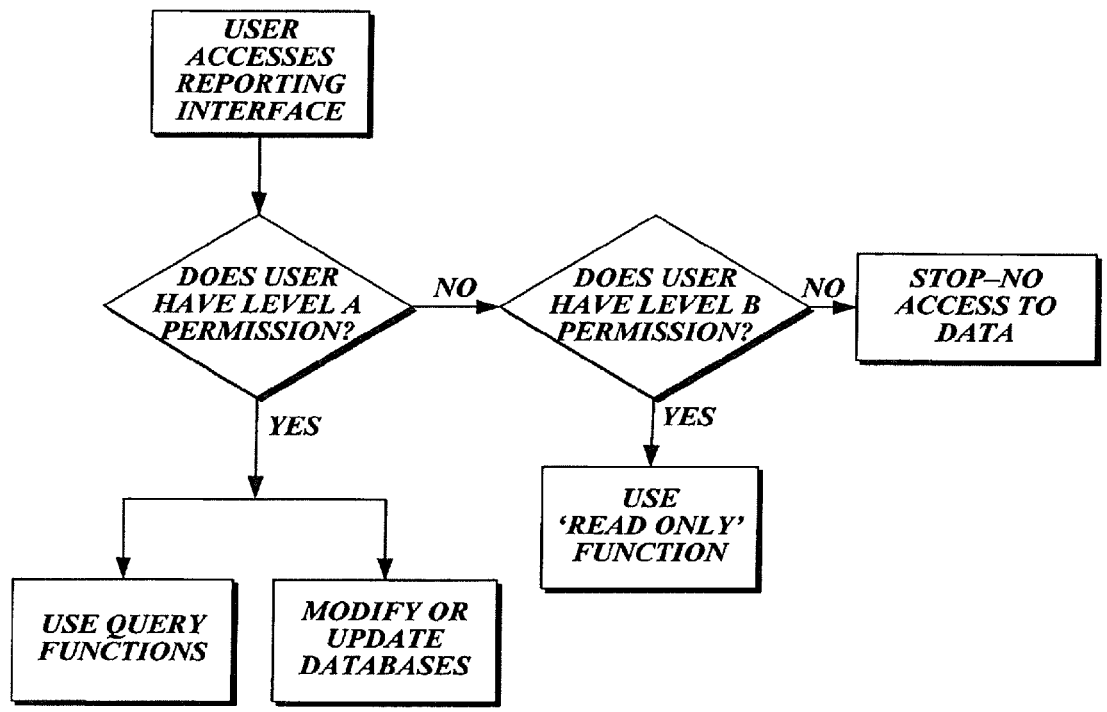
FIG. 8A is a flow diagram pertaining to accessing an interface for obtaining service information and reports through the present invention.

In one embodiment, the user can request and review service information data only and cannot make any changes, see FIG. 8A. In another embodiment, one or more users with a higher access level have the ability to modify the data presented. For example, a repair shop may have the authority to update the status of a particular problem from "In-Work" to "Completed". Similarly, a manufacturer may have the authority to designate a particular problem as having an associated recall issue. A multitude of configurations are possible.

In general, the user obtains information from the reporting interface by selecting one of a number of different topics as described below with respect to FIG. 19. In one embodiment, multiple buckets or types of information are selectably displayed on a first menu screen 202. A menu system leads the user through various levels of inquiry, with the final step preferably being the selection of a report or search button. In general, the amount and type of service information available will depend on the amount and type of service information coming from a particular FEU. In addition, the user can request service information for a particular location, a particular region, a particular club, a particular customer, a particular type of machine, etc.

The interface includes multiple pages of information, with numerous opportunities for the user to select the desired information and put it in a desired format. FIGS. 9-35 illustrate one embodiment of such an interface. Other arrangements are possible. The results of the information request can be displayed on the user's computer screen, on the user's PDA or other device. In one embodiment, the listing of FEU current status is done in a color-coded manner, with a red light, green light, etc., shown beside each entry, see, for example, FIGS. 12, 14, 23, 28, 31 and 32 and the associated discussion below. The color may indicate the status of a particular service alert associated with a particular FEU. The graphic reports and charts may be similarly color coded as well. As will be appreciated, the service information may be presented in various ways, depending on the application at hand.

Figure 9:
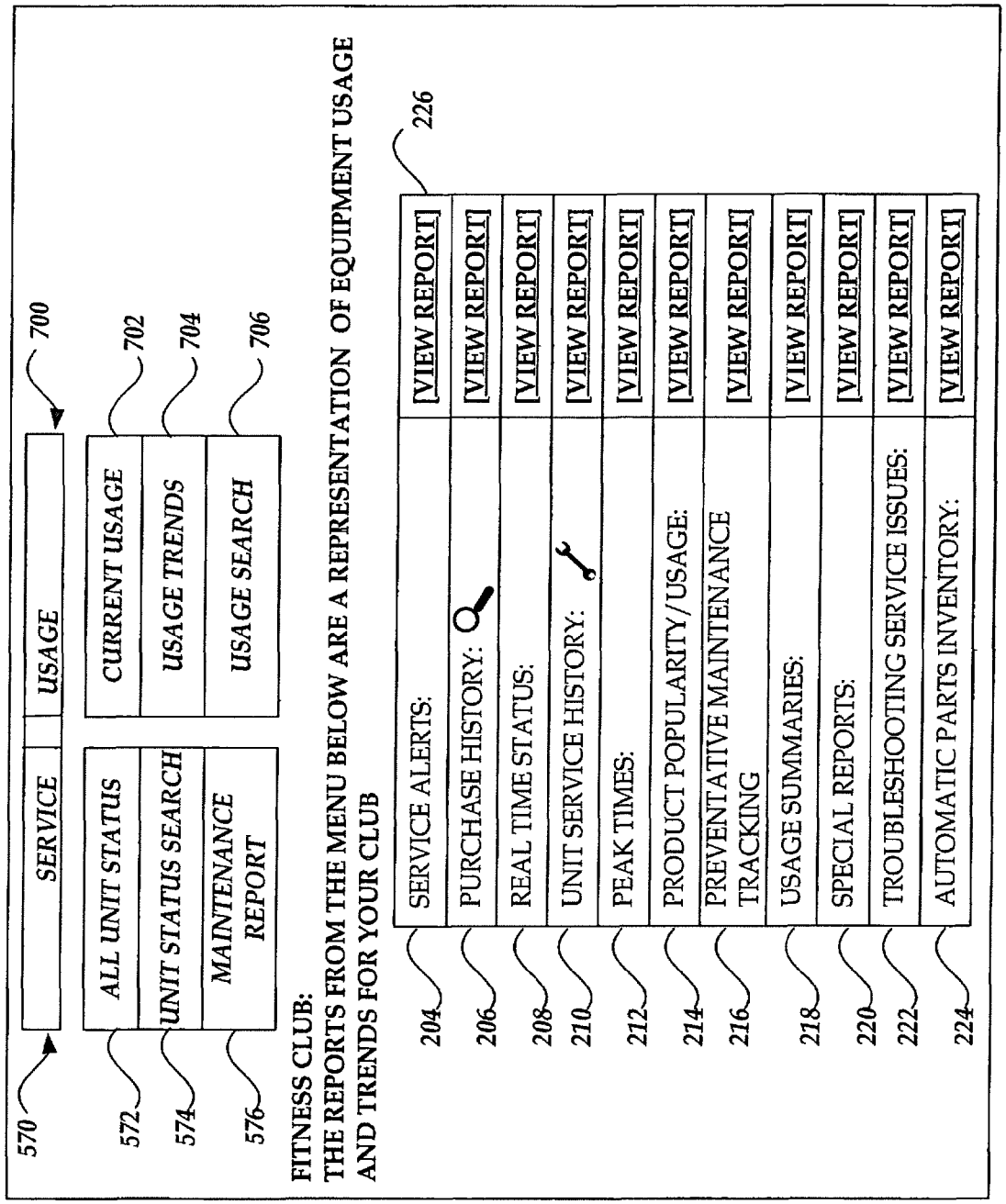
FIG. 9 is a menu screen of information and reports that are available through the present invention.

Describing the reporting interface 190 in more detail, FIG. 9 illustrates one exemplary embodiment of the first menu screen 202 of the reporting interface 190 in the menu screen 200. The following informational categories may be selected: Service Alerts 204, Purchase History 206, Real-Time Status 208, Service History 210, Peak Times 212, Product Popularity Usage 214, Preventative Maintenance Tracking 216, Unit Work History Summaries 218, Special Reports 220, Trouble Shooting Service Issues 222, Automatic Parts Inventory 224. Any of the foregoing informational categories can be selected by the user by selecting the "View Report" button or box 226 adjacent each of the foregoing categories.

If the Service Alert category 204 is selected, as discussed above, the present invention generates a service alert message 229 to applicable recipients when an FEU is in need of service. The recipients may include the club/facility manager or other responsible personnel 192, a service provider or technician 194, customer support personnel of the FEU's manufacturer 196, as well as the system administrator 198. FIG. 10 is an example of a service notice that would be generated by the present invention. As shown in FIG. 10, the notice includes various information including the facility 230, at which the FEU is located, as well as main recipients 236 (e.g., service provider 194) of the service alert 232, as well as cc recipients 234 (e.g., the club manager 194 and FEU manufacturer 196). The service report also indicates the time and date 236 that the report was received by the recipient(s) as well as the subject 238 of the service alert. Thereafter, the service alert reporting information 239 is set forth, including the location of the FEU in question, the date in which the "error code" occurred for the FEU, the time in which the error code occurred, the manufacturer and Model number of the FEU in question, the serial number of the FEU in question, the error code applicable to the FEU, and an error description. In the example of the service alert message 229 shown in FIG. 10, the described error is that the lift is not operating. The service alert also advises the recipient that the service history of the FEU in question, as well as preventative maintenance record and other information, is available. In the example shown in FIG. 10, the fictitious name of the entity operating the service alert system 18 of the present invention has been named "Service Tracker." Also, the Service Alert message 229 can provide other or additional information to some or all of the recipients. Examples include recommended parts needed or procedures to follow to repair the FEU or otherwise perform the required service on the FEU.

As described above, a service alert may be automatically generated by a change in state of the FEU when a service matter arises. As also noted above, a service alert can be sent via a network 29 using numerous different types of communication access modes. The service alerts of the present invention can decrease the down time of the FEU by facilitating quick, unobtrusive service by relaying pertinent information to the service provider before he/she arrives at the site of the FEU. This can not only result in cost savings to the club/facility owner/operator, but can also decrease the negative impression for customers/members of the club/facility.

A second inquiry that a user can select from the menu screen 202 of the reporting interface 190 is the Purchase History category 206 which leads one to a purchase history query interface screen 240. This screen may be utilized to create reports showing the installation date, usage, and service history of FEUs. This information is of significant use to club/facility owners and operators, for instance when deciding to replace units. The query can select multiple parameters, including the manufacturer 242 of the FEUs, and the type 244 of FEU, whether treadmill, exercise cycle, climber, elliptical machine, or other type. The query can also be based on a particular facility location or a region of the country 246. Further selectable parameters include the hour usage 248 of the FEU or the mileage 250 on the FEU's odometer. The installation date 252 of the FEU is also a selectable parameter as well as the warranty expiration date 254 of the FEU or portion or components of the FEU. At the purchase history interface screen 240, it is also possible to select primary and secondary sort criteria (not shown), for instance by manufacturer, product type, installation dates, etc., at the primary sort submenu 256.

An example of a resulting report screen 258 based on the parameters selected in the query screen 240 is shown in FIG. 12. In the purchase history report 258, the information is provided in columnar form, although other formats may be selected. The columns in the report 258 include the date of installation of the FEU 260, the warranty expiration date of the FEU 262, the name of the manufacturer of the FEU 264, the Model and equipment type of the FEU 266, the location of the FEU 268, the hour meter reading of the FEU 270, the distance odometer reading of the FEU 272, and a view service report option icon 274. The primary sort category used in the report 258 was the date of installation. Of course, if another primary sort criteria is selected, the information shown in FIG. 12 would be arranged differently. Also, in report 258 is a first column 276 consisting of colored balls or other icons for each FEU, which allows for the color-coding of the data presented in report 258. For example, a green, yellow, red, or other color code may be used to indicate the remaining useful life of the FEU or other criteria.

From column 274 of report 258, the user can, for a specific FEU, obtain a service history report, which is described below relative to FIGS. 15 and 16.

Figure 13:
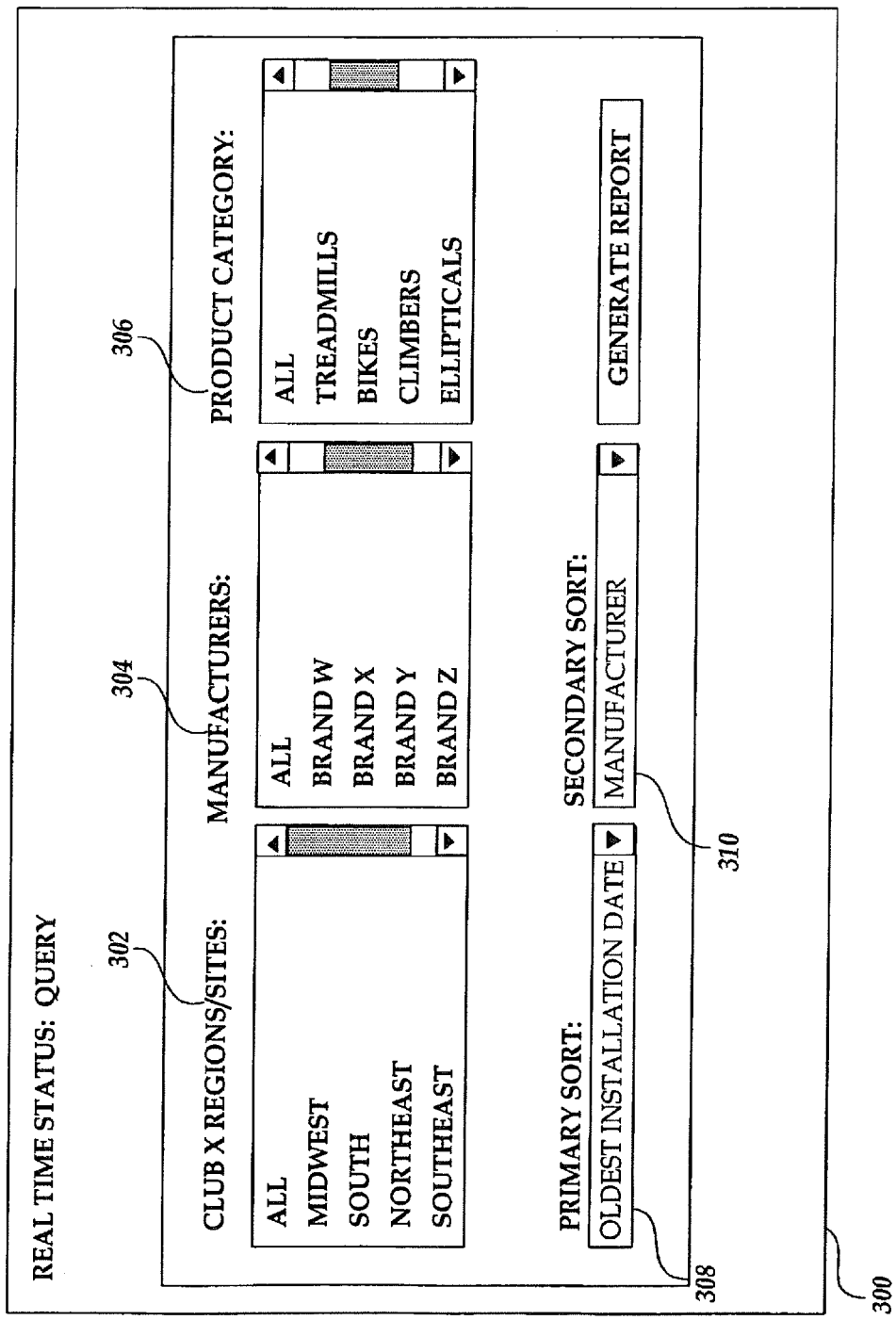
FIG. 13 is a query screen to obtain current service status of fitness equipment units.

A third category of information shown in FIG. 9 that can be selected by the user is the Real-Time Status 208 of the FEU. Selection of this category leads the user to a query screen 300, shown in FIG. 13, consisting of criteria that may be selected relative to the Real-Time Status report being requested which pertains to providing an understanding of the current service and usage status of any FEU at any location. As shown in FIG. 13, the report criteria that may be selected includes a particular club location or region of the country 302, the manufacturer of the FEU 304, and the product category of the FEU 306. In addition, the report can be sorted by at least primary and secondary criteria 308 and 310. Such criteria may include, for example, the manufacturer of the FEU, the category of the FEU, the installation date of the FEU, etc. Once the criteria for the query is selected, a report 312 is generated, as shown in FIG. 14.

Figure 14:
FIG. 14 is a report screen corresponding to the query screen of FIG. 13.

The information in FIG. 14 is arranged in columnar form with one line per FEU. As would be expected, the arrangement of such information is based on primary and secondary sort criteria selected in screen 300. The columns of report 312 may include the following information: the manufacturer 314, the FEU Model 316, the FEU product category 318, the manufacturer's serial number of the FEU 320, the error status of the FEU 322, and the date that a service alert was sent 324. The last column of report 312 shows an icon 325 to allow the user to select the service history for a particular FEU. Also, in the first column 328 a color-coded icon 329 may be utilized to provide a color representation of the current status of the FEU. For example, colors may be used to represent whether or not an error status is currently in effect. Also, a print icon 236 is provided to allow the recipient to print the report. As would be expected, each of the query and report screens used with the invention can have a print icon for convenient printing of the screen being accessed.

Figure 15:
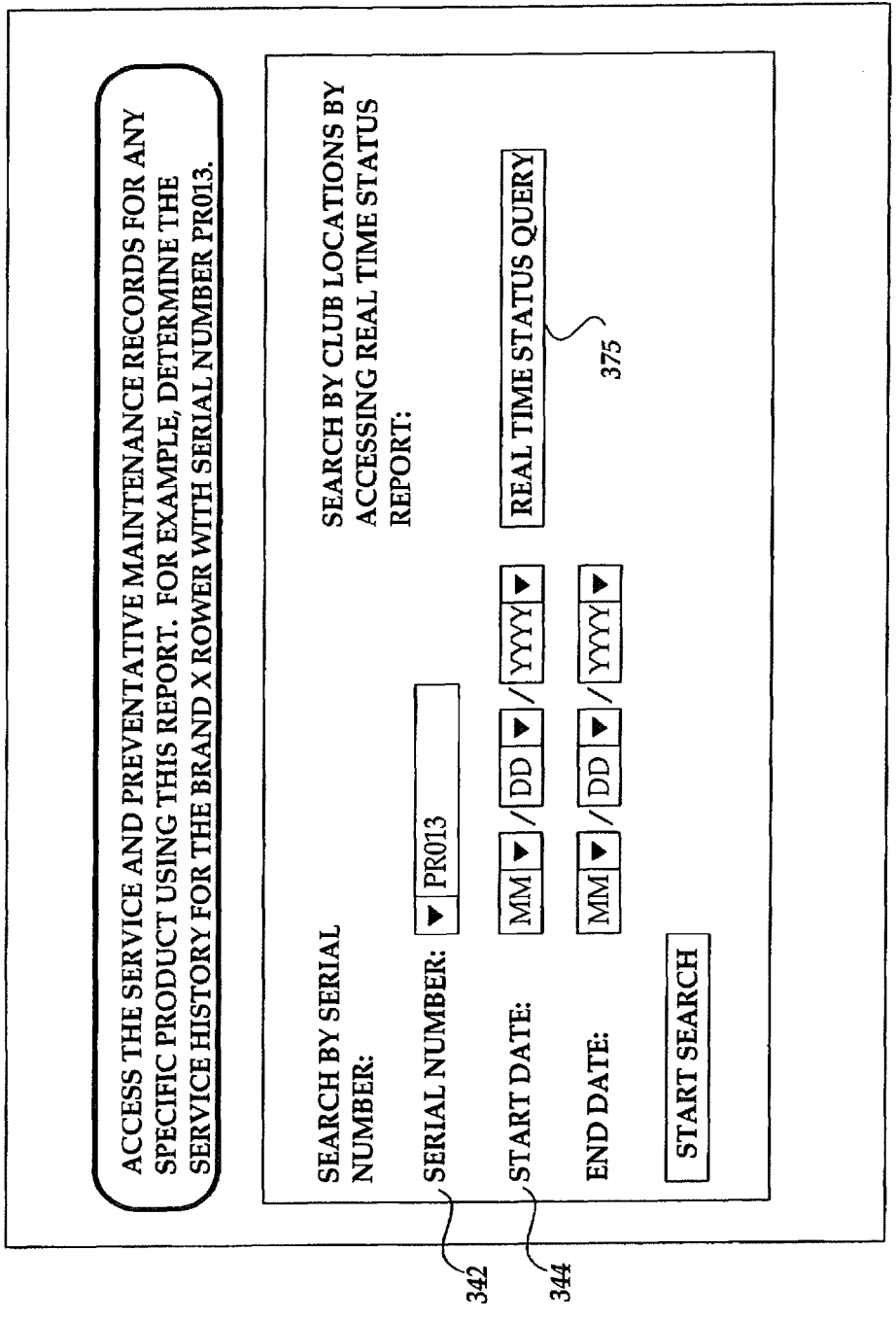
FIG. 15 is a query screen to obtain service and preventative maintenance records for fitness equipment units.
Figure 17:
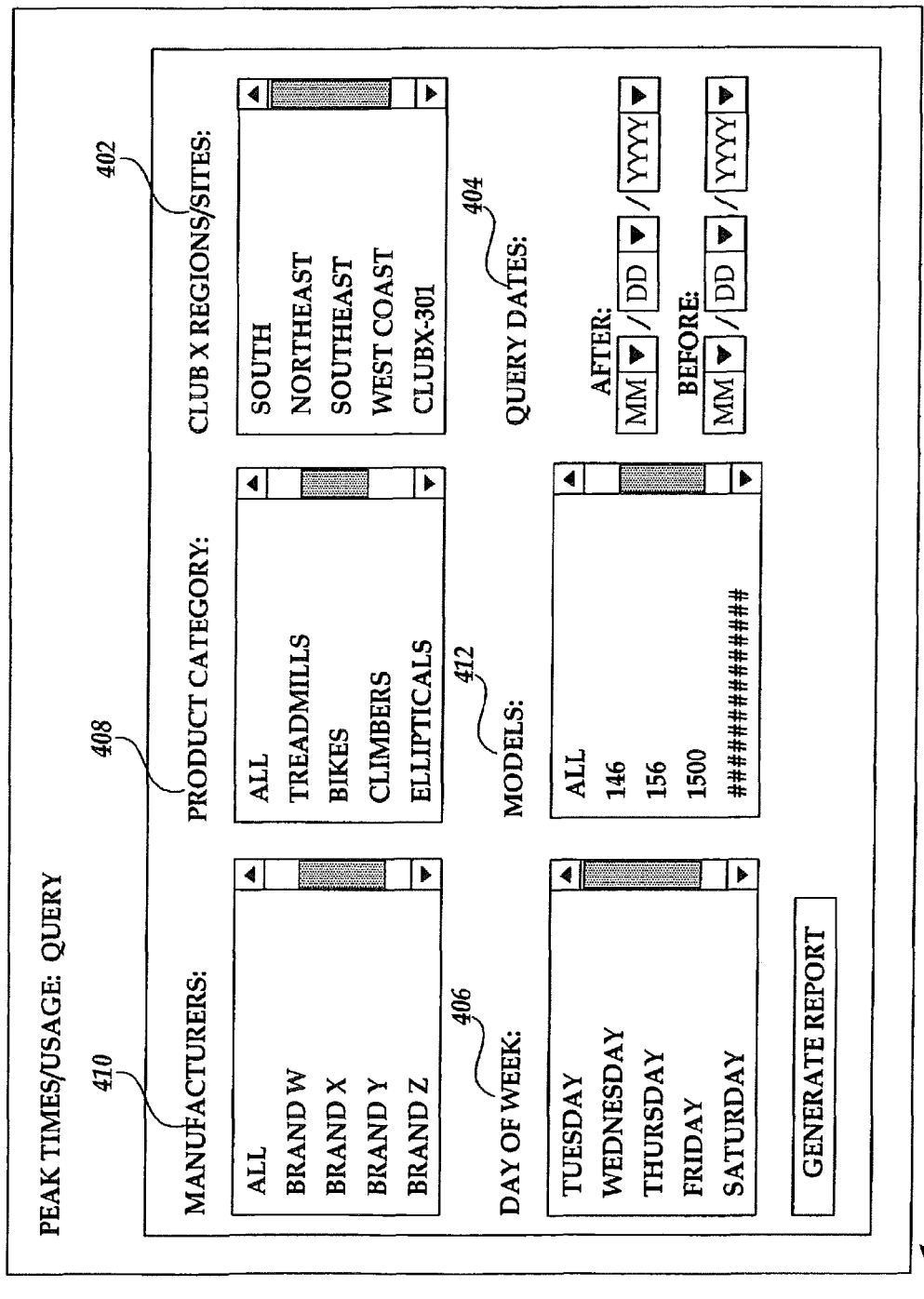
FIG. 17 is a query screen for obtaining information pertaining to the usage of fitness equipment units during a particular day or days.
Figure 18:
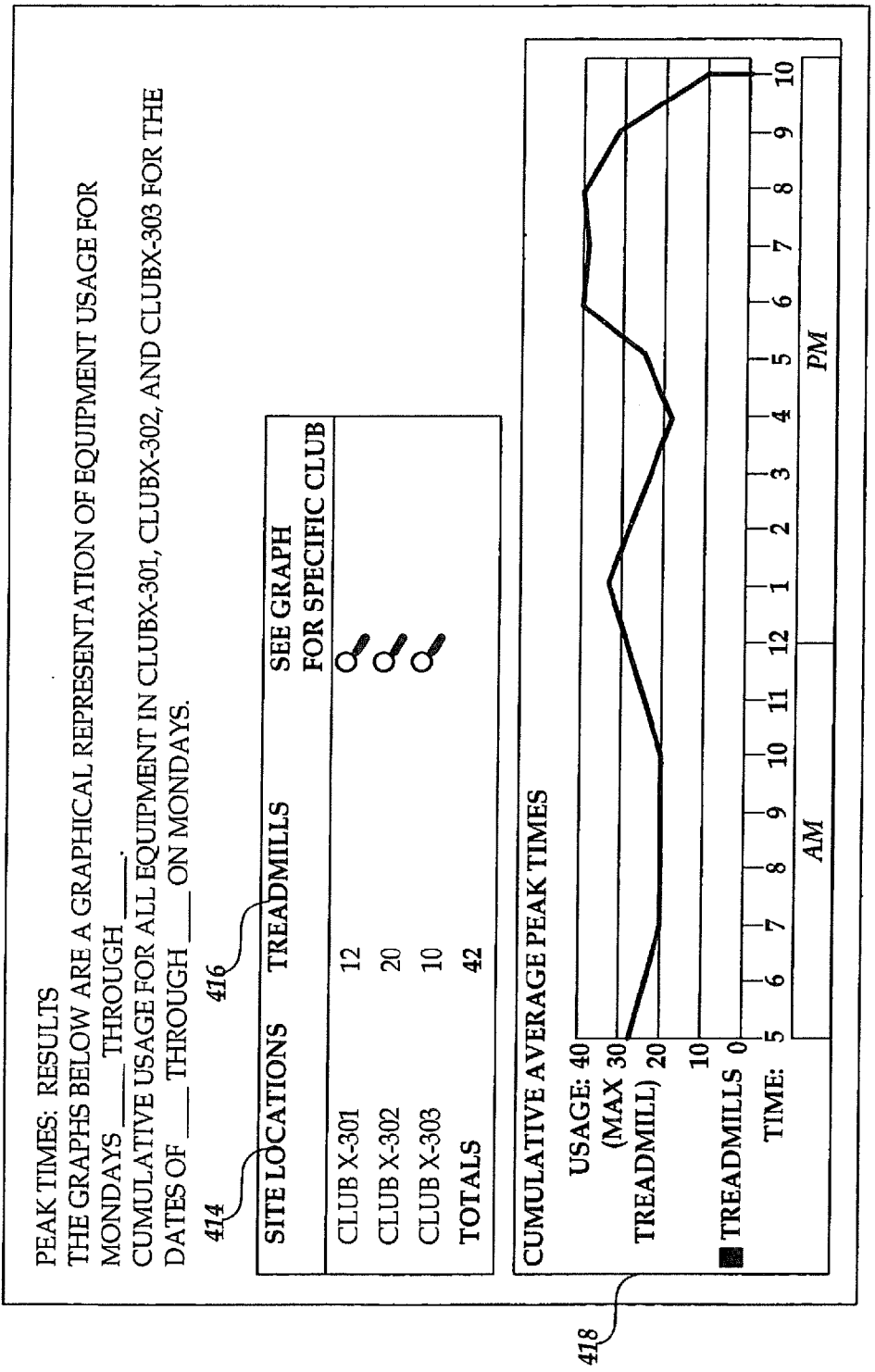
FIGS. 18 and 19 are report screens corresponding to the query screen of FIG. 17.

Referring to FIG. 9, in the menu screen 202, it is possible to select the Unit Service History option 210 of an FEU which leads the user to screen 340, shown in FIG. 15. The screen 340 contains criteria for the desired report. Of course, other criteria could be used in this query screen as well as the other query screens described herein. In screen 340, the user enters the serial number of the FEU 342 and the time period of the desired report. When these selections are made, the report can be generated in the format shown in screen 346, FIG. 16. If the serial number of the FEU is unknown, means can be provided to obtain that information, such as by accessing the Real Time Status report query screen 300 via the link button/box 345 in screen 340. The service history of the selected unit is displayed in screen 346, FIG. 16.

In the upper portion of the report screen 346, shown in FIG. 16, information concerning the selected FEU is set forth, including the total downtime of the unit 347, manufacturer 348, the product category 349, Model or type of product 350 of the FEU, the serial number 352, the date 354 that the FEU was installed, the location of the FEU 356, the owner's I.D. number 358 of the FEU, the name of the person that services the FEU 358, and the service account number 359. The service record of the FEU is set forth in the lower part of the screen 346 in columnar form, with the columns including the date 360 and the time of the date 362 that the service record was generated, the applicable error code 364, the service recommendation 366, the description of the error/service performed 368, the hour meter reading 370, the odometer reading 372, whether a service alert was sent 374, the preventative maintenance ("PM") status 375, when the receipt of the service error was acknowledged 376, and by whom 377. The screen 346 also includes a PM recommendation key 378 corresponding to the recommendations set forth in column 366.

The service history report shown in screen 346 at the upper portion thereof identifies the query selections from FIG. 15, including the location 380, the date range 381, the manufacturer serial number 382, the unit ID number 383. In addition, the total hours 285 and the total odometer reading 386 are provided.

Further, in screen 346, warranty expiration dates are provided for not only different portions of the FEU, but also for parts 387 and labor 388. The portions of the FEU for which expiration dates are set forth include the frame 390, the display unit 391, the motor 392, and the motor fan 393. As apparent, a significant amount of information is provided in screen 346 concerning the service history of the particular unit FEU selected. Of course, the screen 346 need not provide all of the foregoing information if not required or desired by the user. Also, some of the foregoing information could be provided in other screens instead of the unit service history screen. This is true of all of the report screens illustrated and discussed herein.

It will be appreciated that the service history information enables the user to determine what maintenance has been performed in and out of warranty, and the cost of the maintenance that has been completed in and out of warranty. Also, this information helps the user make purchasing decisions in terms of replacing or buying new FEUs.

From the user interface menu screen 202, the user can also select the Peak Times option 212 leading to query screen 400 which provides information concerning usage of FEUs during the hours of a day. The parameters that can be selected for this inquiry, as shown in screen 400, include, for example, the sites or locations of the FEUs 402, whether at all locations, in different regions of the country, or at specific locations. It is possible to select more than one of these locations for this particular inquiry or more than one of the other parameters available in this or other query screens described herein. Such other parameters include the time period 404 of the inquiry, the days of the week 406 of the inquiry, so that the report can be selected for a particular day of the week or days of the week. The selectable parameters also include product categories 408, for example, treadmills, cycles, climbers, ellipticals, or all of the above, as well as manufacturers of the FEUs 410 and particular models 412 from such manufacturers.

Figure 19:
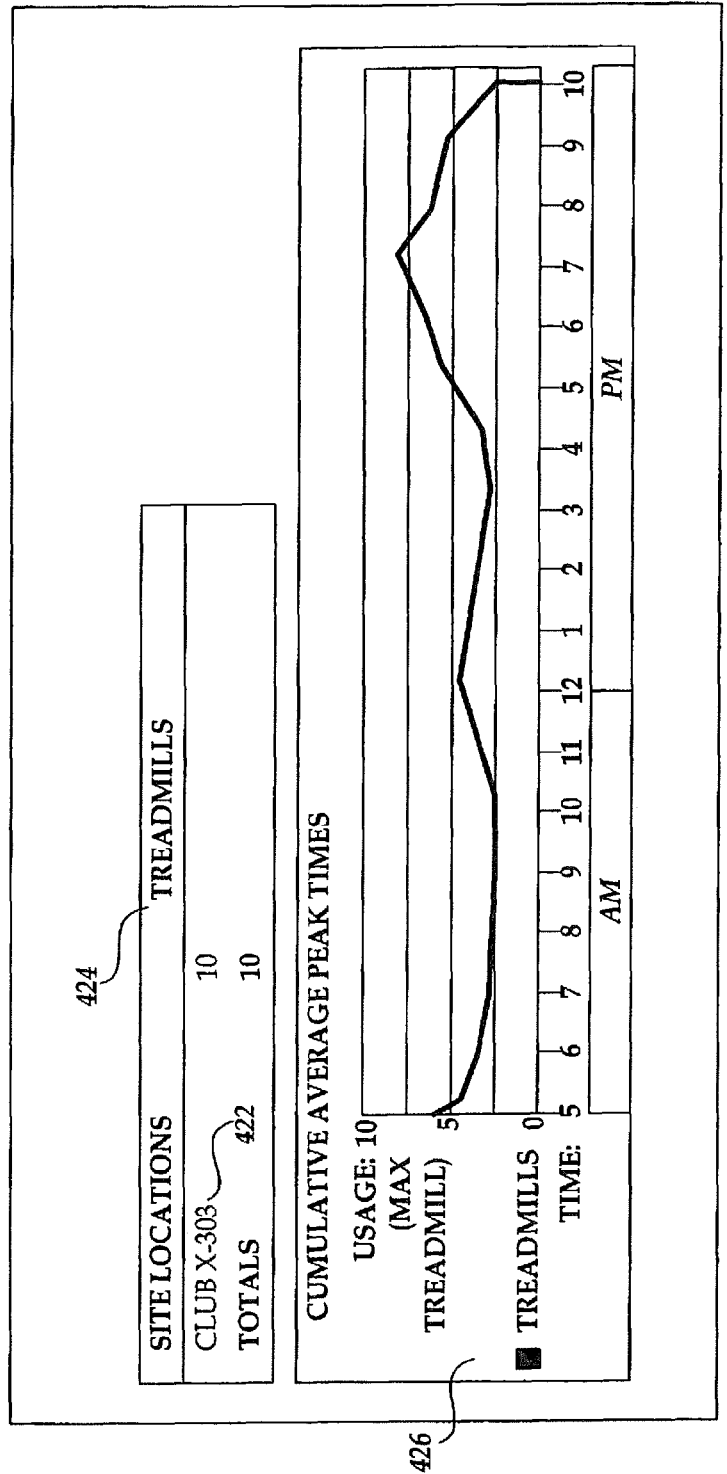
Figure 20:
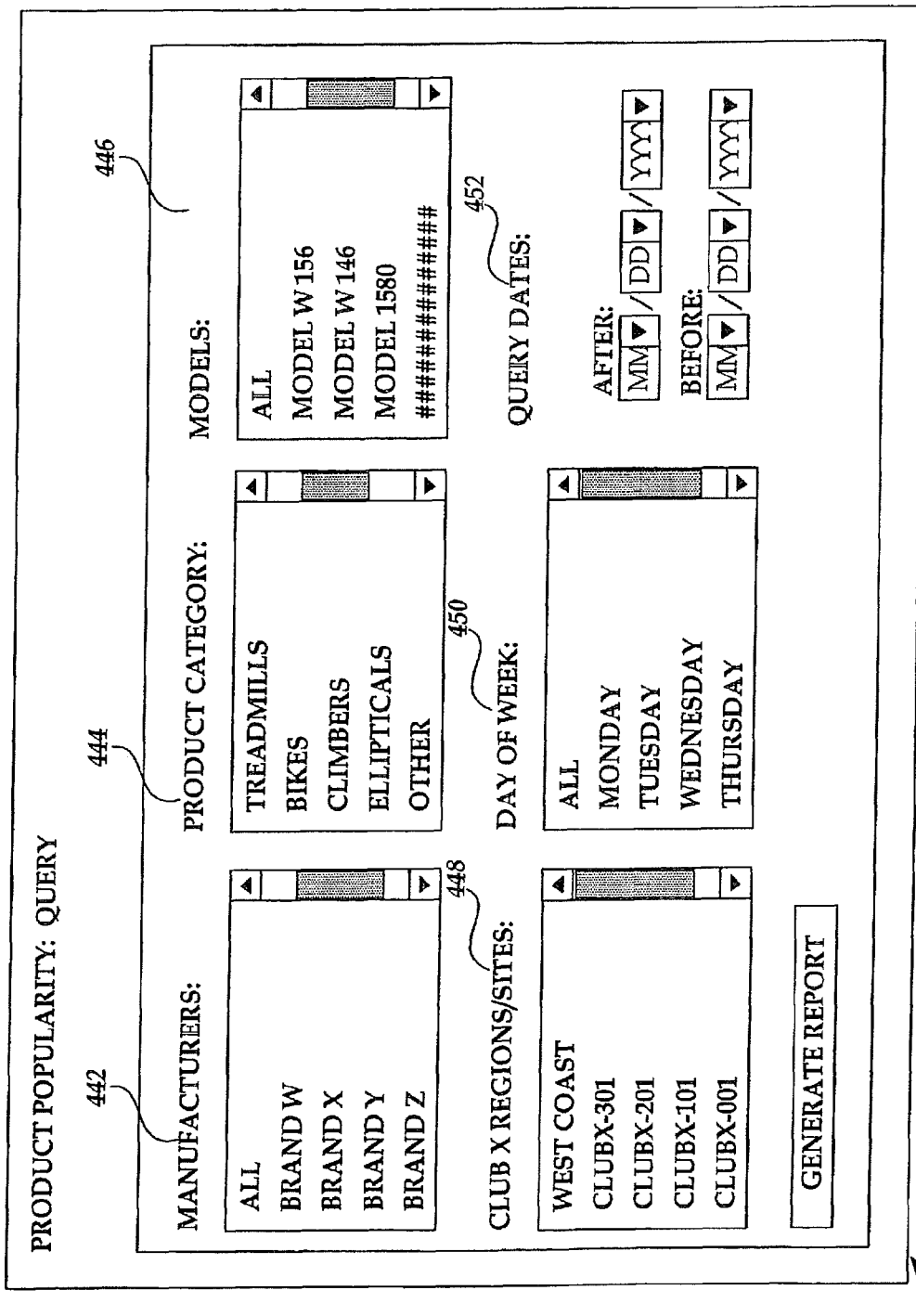
FIG. 20 is a query screen to obtain information concerning the popularity of fitness equipment units based on usage levels of customers.

The resulting report is provided in tabular and graphical format, for example, in report screen 413, as shown in FIG. 19. The tabular information includes the locations selected for the inquiry 414 and the total pieces of equipment types 416 for a selected site. Below the tabular information, a line or other type of graph 418 is provided that shows the usage during the hours of the day on a horizontal axis and the units in use in the vertical axis. From the upper portion of report screen 413 it is possible to select a graph for each of the particular locations shown in column 414. In this regard, graph 426, shown in FIG. 19, pertains to one particular site location 422 (Club X-303) with the total number of FEUs (treadmills) 424 located thereat. The usage of these FEUs is graphed over the hours of the day as shown in Graph 426. Although the report depicted in FIG. 19 pertains to treadmills at three specific club facility locations, many other, different parameters could have been selected. Moreover, different product groups could have been selected, for instance, one specific treadmill (FEU), all treadmills of a specific model, all treadmills from a particular manufacturer, all treadmills from all manufacturers, all cardio equipment at a particular site or group of sites, etc. This information allows the user to determine when during a day or week that a specific product or group of products are being used, as well as how often members/users are required to wait to use a specific product group. As apparent, this information is useful in making FEU purchase decisions.

From the interface menu screen 202, another selection is Product Popularity or Usage 214, which analyzes the percent of available hours that a selected product group has been used. As discussed above with respect to the Peak Time analysis, from the Product Popularity or Usage analysis, product groups can be defined as one or more products, for example one specific FEU, all FEUs of a particular model, all FEUs in a particular product category, for instance treadmills, all FEUs in a product category from a particular manufacturer, an FEU of a product category from all manufacturers, all cardio FEUs at a particular site or group of sites, etc. As shown in query screen 440 of FIG. 20, the selectable parameters for this analysis can include FEU manufacturers 442, product categories 444, FEU Models 446, the locations or regions in which the FEUs are located 448, the day(s) of the week for the analysis 450, and the duration of the analysis 452. The result of the analysis is set forth in FIG. 21 in both tabular and graphical format.

Figure 21:
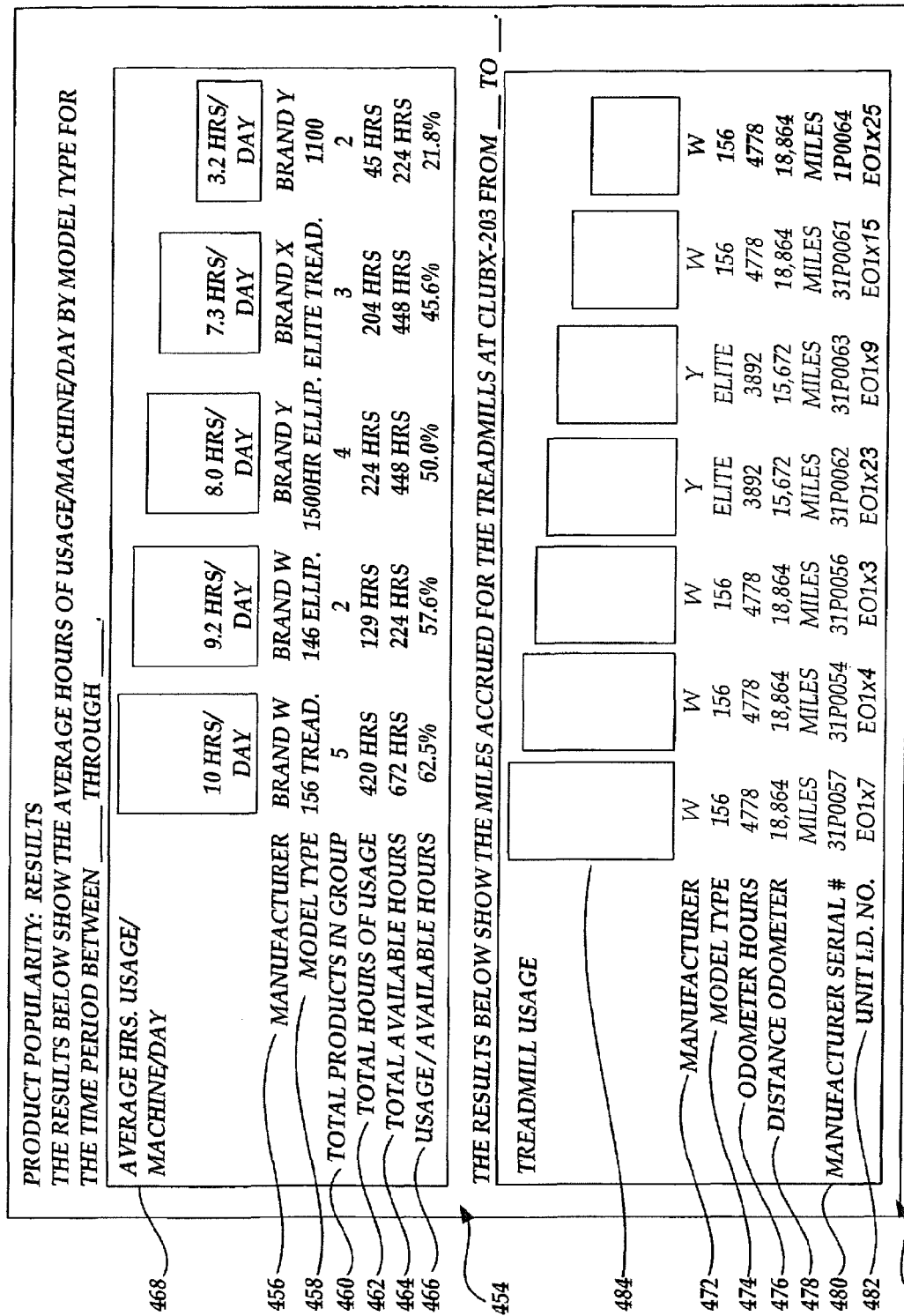
FIG. 21 is a report screen corresponding to the query screen of FIG. 20.
Figure 22:
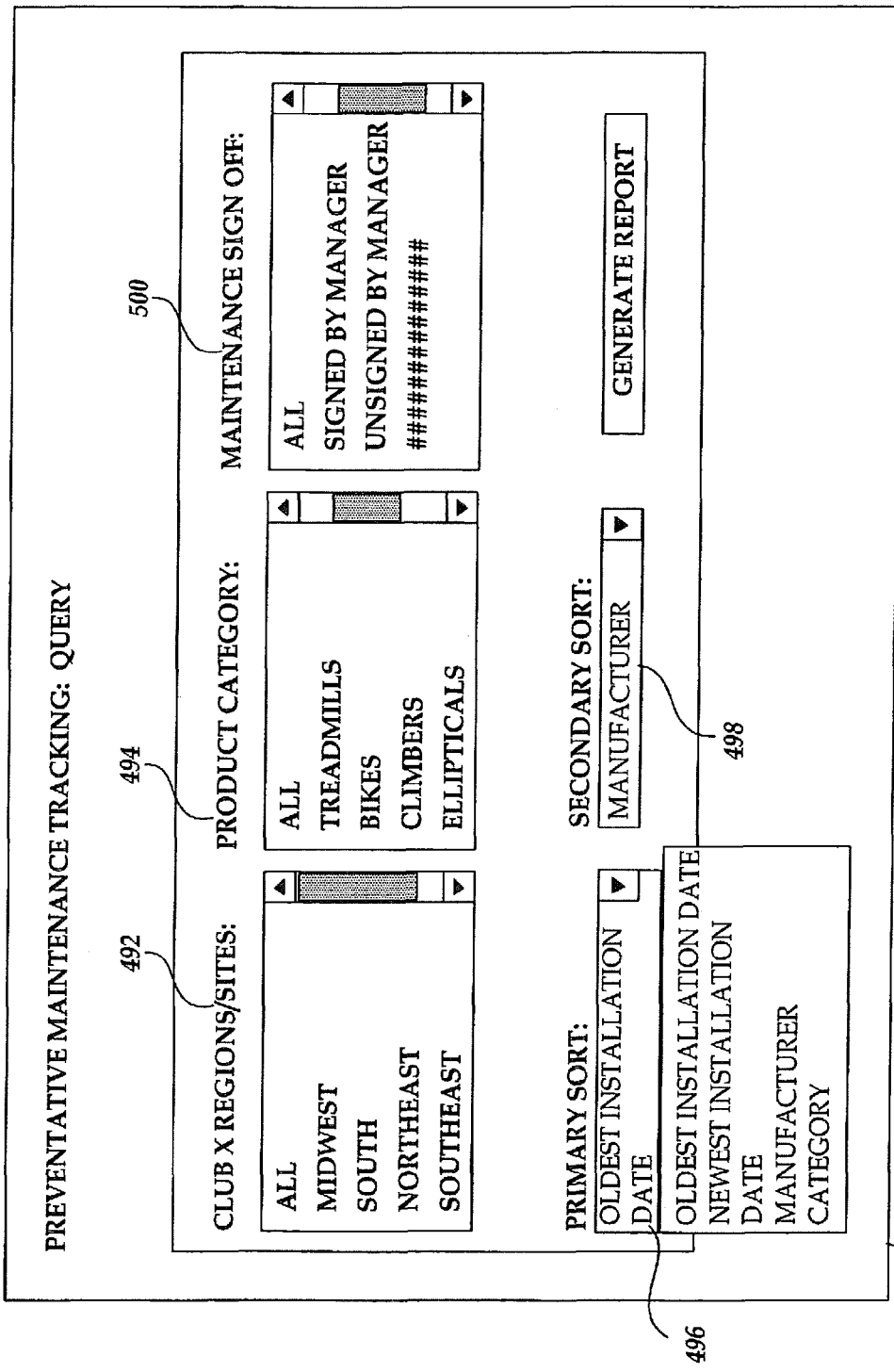
FIG. 22 is a query screen to obtain information concerning preventative maintenance tracking of fitness equipment units.
Figure 24:
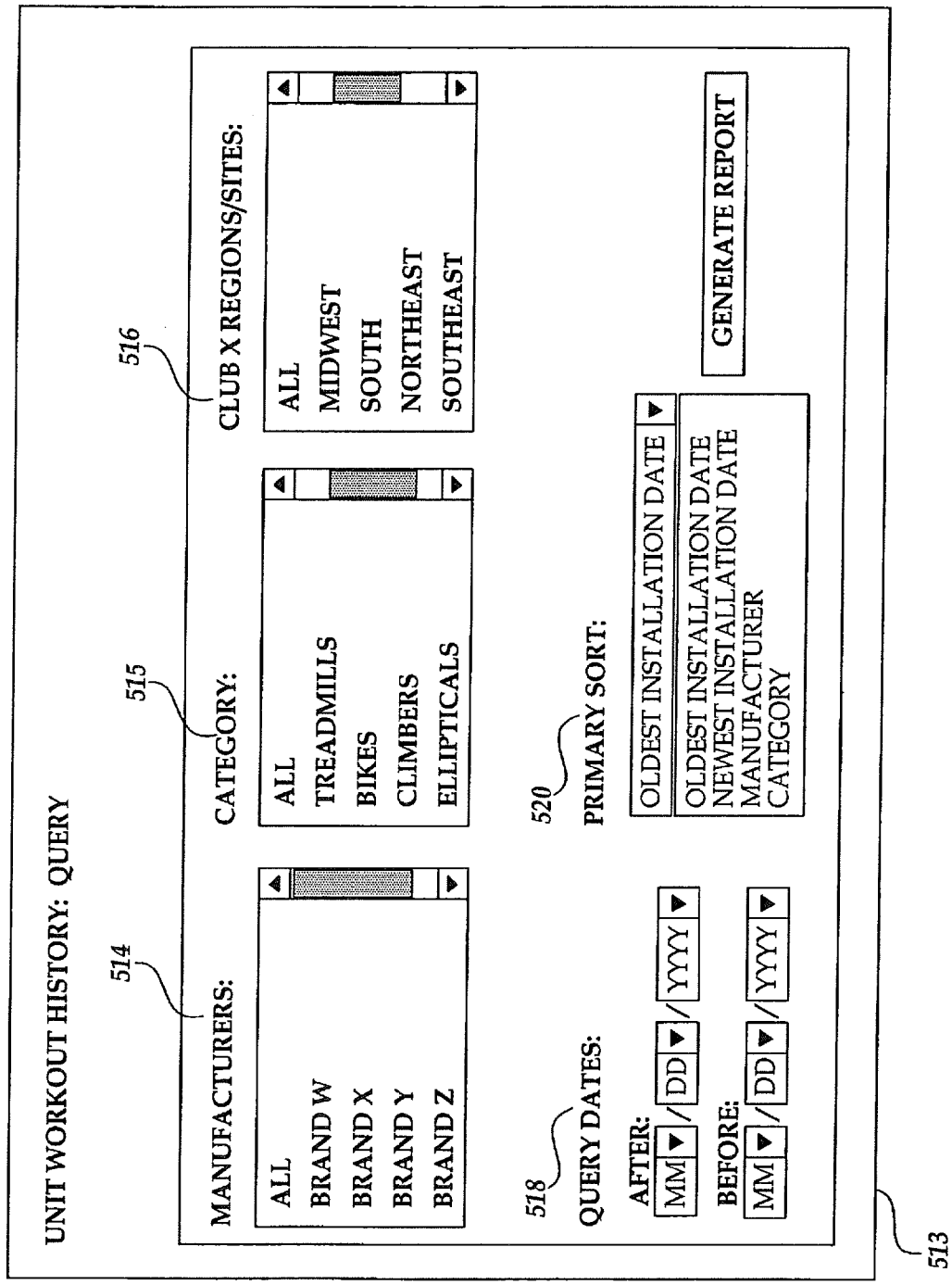
FIG. 24 is a query screen pertaining to summaries of usage of fitness equipment units by manufacturer, type of equipment, location, etc.

As illustrated in the upper screen 454, the analysis illustrated in FIG. 21 pertains to usage of treadmills at a particular location "Club X-302" during a specific time period. In the upper portion 454 of FIG. 21 the treadmills are grouped by manufacturer 456 and then subgrouped by Model 458. The information provided also includes the total equipment units 460, the total hours of usage 462, the total available hours 464, and the percentage of total hours used 466. Also, a bar graph illustrates the average number of hours that a particular product group was used per day.

The lower portion 470 of FIG. 21 provides information on a specific FEU basis. The information that is provided in tabular form includes the manufacturer 472, the model 474, the hour meter reading 476, the odometer reading 478, the serial number of the FEU 480, and the product description 482. A bar graph 484 graphically illustrates the miles accrued for a particular FEU at a particular location through a specified time period. The graph can be of another parameter of the specific FEU, for example, hour meter reading.

Of course, the tabular and graphical information provided in FIG. 21 would depend on the product groups selected for analysis. For example, the present analysis could be carried out on the basis of product categories for all manufacturers at the location(s) selected or by product category for each different manufacturer at the location(s) selected. Also, it can be appreciated that the foregoing information provided would be important in making purchasing decisions by the club/facility owner/manager. This information would also be valuable to equipment makers in showing how their equipment is viewed by actual users vis-vis comparable equipment by the manufacturers.

Figure 9A:
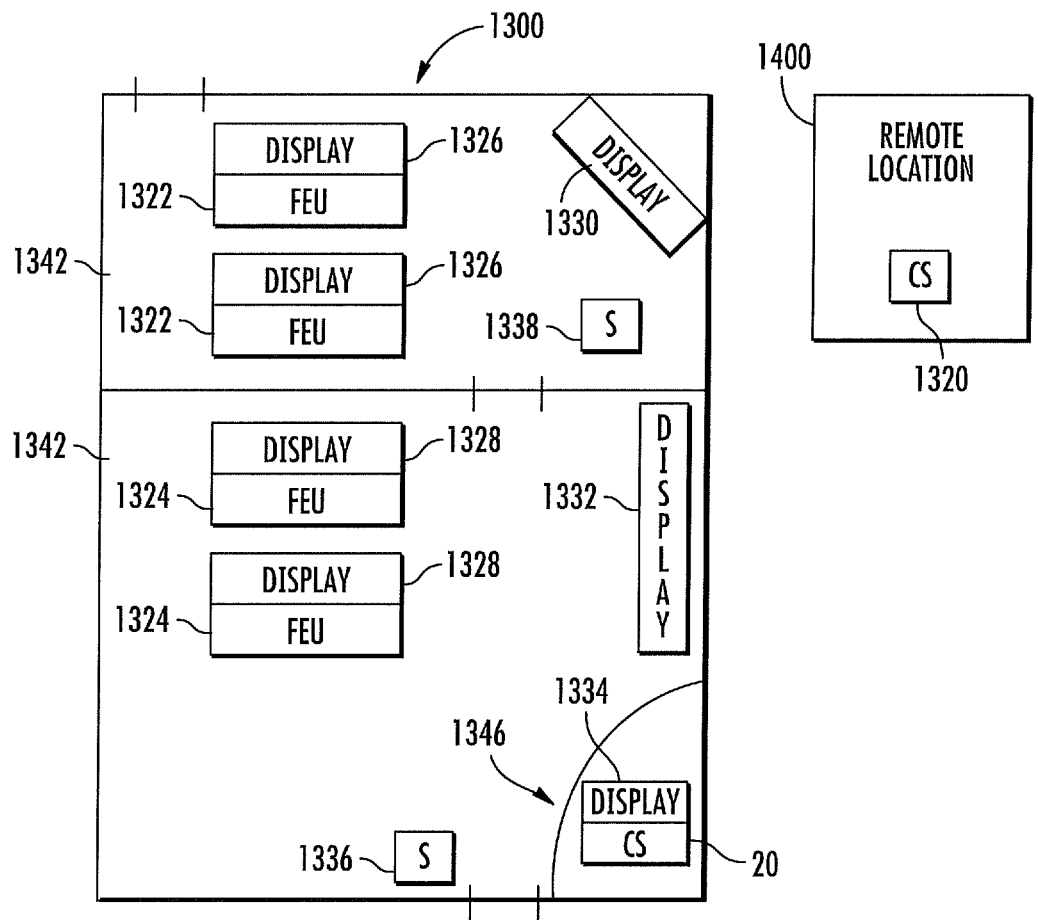
FIG. 9A is a schematic illustration of a fitness facility including a facility equipment usage control system according to an example embodiment FIG. 9B schematically illustrates fitness equipment unit distribution management system 1400 according to an example embodiment.

In addition to or as an alternative to providing reports regarding the popularity or usage of individual FEUs or types of FEUs, ICSs 20 may facilitate the control of the usage of one or more of FEUs. FIG. 9A schematically illustrates a fitness facility 1300 including multiple FEUs 1322, 1324, displays 1326, 1328, 1330, 1332 and 1334, usage sensors 1336, 1338 and ICS 20. FEUs 1322 comprise a first type of FEU while FEUs 1324 comprise a second type of FEU different than the first type of FEU. For example, in one embodiment, each FEU 1322 may comprise an exercise cycle (such as the exercise cycle 22 shown and described above) while FEU 1324 may comprise an elliptical trainer (such as the elliptical trainer 24 shown and described above). In other embodiments, FEU 1322 and FEU 1324 may comprise other types of FEUs.

Each of FEUs 1322, 1324 is in communication with ICS 20, in either a wired or wireless fashion. Each of FEUs 1322 and 1324 includes one or more fitness equipment usage sensors which sense or detect the usage of the particular FEU. This usage of the each particular FEU is communicated to ICS 20. In one embodiment, the information may comprise real-time status information indicating whether at a particular moment a FEU is being utilized. In another embodiment, the usage information may include the amount of time that a FEU is being used as well as the time of day, time of week or exact period of time that the particular FEU is being utilized. In one embodiment, each particular FEU 1322, 1324 can communicate usage information directly to ICS 20. In another embodiment, such usage information may be communicated or transmitted to one or more intermediate electronic or human recipients which then pass along the usage information to ICS 20.

In the example illustrated, FEUs 1322 are in different rooms of fitness facility 1300, rooms 1342, 1344. In other embodiments, FEU 1322, 1324 may be in the same general area or the same room of fitness facility 1300. Although fitness facility 1300 is illustrated as including two FEUs 1322 and two FEU 1324 are purposes of this description, in other embodiments, fitness facility 1300 may include a single room or greater than two rooms, may include a single or a greater than two FEU 3022 or FEU 1324, and may include greater than two different types of FEUs, wherein each of the FEUs is a communication with ICS 20.

Displays 1326, 1328, 1330, 1332 and 1334 comprise monitors, televisions, screens, light emitting diode panels or other churches configured to provide graphics and/or text for viewing by persons. Displays 1326 are associated with FEUs 1322. In particular, displays 1326 are viewable by a person operating or using the associated FEU 1322. Likewise, displays 1328 are associated with FEUs 1324, line person to view the associate despite 1324 while the person is operating or using the associated FEU 1324.

Displays 1330 and 1332 are not associated with any particular FEU. Displays 1330 and 1332 are remote from FEUs 1322 and 1324 in that displays 1330 and 1332 are provided for viewing by persons in surrounding areas of fitness facility 1300. In the example illustrated, display 1330 is for general viewing by persons within room 1342 while display 1332 is provided for general viewing by persons or room 1342. Displays 1330 and 1332 are in communication with ICS 20 such that ICS 20 may control what is being displayed by each of displays 1330 and 1332.

Display 1334 is associated with ICS 20 display 1334 may be provided at a counter or check-in location 1346 for fitness facility 1300. In another embodiment, display 1334 may be provided to a manager of fitness facility 1300. Display 1334 displays management information for fitness facility 1300.

Fitness facility usage sensor 1336 comprises a mechanism configured to sense or detect the overall usage of fitness facility 1300. In one embodiment, sensor 1336 may comprise one or more sensors configured to detect a person entering facility 1300. In one embodiment, sensor 1336 may comprise a turnstile. In another embodiment, sensor 1336 may comprise one or more cameras and associates detection and counting software to detect the number of individuals in fitness facility 1300. In yet another embodiment, sensor 1336 may comprise a scanner or other card reader configured to read membership cards as persons or members enter facility 1302 further detect members or individuals leaving facility 1300. Sensor 1336 communicates the usage information to ICS 20.

Sensor 1338 is similar to sensor 1336 except that sensor 13 senses or detects the number of persons entering and leaving a particular region or room of fitness facility 1300. In this manner, sensor 1338 may detect the usage of a particular region or room of fitness silly 1300. In some embodiments where a particular type of FEUs or a particular subset of different types of FEUs or in a particular region or room, sensor 1338 may detect the usage of the particular type of FEUs or the particular subset of different types of FEUs. For example, a room or particular region of facility 1300 may be dedicated to cycling exercisers. By monitoring the number of individuals entering and leaving the room, sensor 1338 may detect the general usage of the cycling exercisers. In another embodiment, a room may be dedicated to both treadmills and stair steppers, wherein sensor 1338 identifies the usage of such treadmills and stair steppers by monitoring individuals entering and leaving the dedicated room. Sensor 1338 communicates the usage information to ICS 20.

ICS 20 facilitates the control of the usage of FEUs 1322 and 1324. ICS 20 is remote from each of FEUs 1322 and 1324 in that ICS 20 is not provided as a part of or incorporated in FEUs 1322, 1324. ICS 20 receives or gathers usage information from each of FEUs 1332, 1334 and from sensors 1336, 1338. ICS 20 receives usage information which provides the time period during which usage took place or further correlates real-time usage information (a momentary status of whether or not a FEU is being used at the moment) received or gathered to the time period (the hour, day, and/or month) at which such usage occurred (i.e., the time that the real time usage information was received).

Based upon the received or gathered usage information from one or more of FEUs 1322, FEUs 1324 or sensors 1336, 1338, ICS 20 calculates or determines a maximum available individual workout time setting for each of the FEUs 1322, 1334. Upon receiving a maximum available individual workout time setting from ICS 20, each FEU 1322, 1324 applies the setting such that the particular FEU is limited to a maximum available time for each person. In other words, each maximum available individual workout time setting causes the individual FEUs 1322, 1324 to limit a person's workout or exercise session on the particular FEU to a maximum amount of time. By controlling or setting the maximum available individual workout time for each FEU 1322, 1324 based upon usage information, ICS 20 is better able to even out usage of FEUs 1322, 1324 or is better able to ensure that more persons or individuals may have the opportunity to use a desired FEU 1322, 1324.

In one embodiment, ICS 20 may set maximum available individual workout times for individual FEUs 1322, 1324 based upon usage information pertaining to the usage of the overall fitness facility 1300 as received from sensors 1336 and 1338. In one embodiment, ICS 20 may set such maximum workout times based upon historical usage information. For example, if historical usage information indicates that a large number of individuals use fitness facility 1300 at particular hours of the day, on a particular days of the week or days of the month, ICS 20 may reduce the maximum available individual workout time setting for one or more of FEUs 1322, 1324 during those particular hours of the day or particular day of the week or days of the month. As a result, more persons may be provided with an opportunity to use FEUs 1332, 1344 and wait times may be reduced.

In another embodiment, ICS 20 may set maximum workout times based upon real time usage information for facility 1300. For example, if a particular moment in time ICS 20 receives real-time usage information indicating that there are a large number of persons using fitness facility 1300 (as indicated by sensors 1336, 1338, ICS 20 may transmit reduced maximum available individual workout time settings to FEUs 1322, 1324 once the person presently using particular FEUs 1322, 1324 has finished his or her workout such that the next person has a workout time that is limited to allow a greater number of persons to use FEUs 1322, 1324 or to reduce wait times. By way of a more particular example, if at 5:05 PM ICS 20 receives usage information indicating that the number of persons using fitness facility 1308 exceeds a predefined threshold, ICS 20 may generate such reduced individual maximum workout time settings. ICS 20 may transmit different maximum available workout time settings when different thresholds are surpassed.

In another embodiment, ICS 20 may set maximum available individual workout times for individual FEUs 1322, 1324 based upon usage information pertaining to the usage of the FEUs 1322, 1324 themselves as received from the usage sensors or detectors associated with FEUs 1322, 1324. In one embodiment, ICS 20 may determine and transmit individual maximum workout time settings for individual FEUs 1322, 1324 based upon historical usage information for the individual FEUs 1322, 1324. For example, if historical usage information for a particular FEU 1322 indicates a high level of usage during particular hours of the day and/or days of the week, ICS 20 may establish and transmit a lower maximum available individual workout time for the particular FEU 1322 at such hours of the day or days of the week.

Alternatively, ICS 20 may determine and transmit individual maximum workout time settings for individual FEUs 1322, 1324 based upon historical usage information for groups of a same type of FEU. For example, if historical usage information for all FEUs 1322 indicates a high level of usage for all of the particular type of FEUs 1322 during particular hours of the day and/or days of the week, ICS 20 may determine and transmit individual maximum workout time settings for each of the group of individual FEUs 1322 during the particular hours of the day or days of the week having high usage.

In still another embodiment, ICS 20 may determine transmit individual maximum workout time settings for individual FEUs 1322, 1324 based upon historical usage information for all of FEUs 1322, 1324. For example, if historical usage information from all of FEUs 1322, 1324 indicates a high level of usage of all of FEUs 1322, 1324 during particular are the day and/or particular days a week, ICS 20 may determine transmit lower maximum individual workout time settings for such high usage hours.

In some embodiments, ICS 20 may determine and transmit individual maximum workout time settings for individual FEUs 1322, 1324 based upon real time usage information received from usage sensors or detectors associated with FEUs 1322, 1324. For example, if ICS 20 receives or gathers usage information indicating that at a particular moment in time FEUs 1322 are in high usage (little down time between different users or persons using each FEU 1322 or the review or no FEUs 32 being available for use), ICS 20 may calculate and transmit a lower maximum individual workout time setting to FEU 1322 such that the next user of each FEU 1322 will have a lower maximum available time to use the FEU 1322.

In another embodiment, ICS 20 may determine and transmit individual maximum workout time settings for FEU 1322, 1324 based upon real-time usage information received from usage sensors or detectors associated with multiple types of FEUs. For example, if ICS 20 receives or gathers usage information from FEUs 1322 and 1324 indicating that FEUs 1322 and 1324 have a high degree of usage, may calculate and transmit a lower maximum individual workout time setting to one or more of FEUs 1322, 1324 such that the next user of each FEU 1322, 1324 will have a lower maximum available time to use the FEU 1322, 1324.

Each of the above methods by which ICS 20 may determine transmit maximum available individual workout time settings for one or more of FEUs 1322, 1324 may be available the manager or fitness trainers of fitness facility 1300. In one embodiment, such usage sensors associated with FEUs 1322, 1324 and sensors 1336, 1338 as well as ICS 20 may allow a manager, director, or a person in charge of fitness facility 1300 to change one or more of the above modes of operation. In some embodiments, ICS 20 may also allow the person in charge of fitness facility 1300 to select a different threshold levels of usage and the corresponding different maximum available individual workout time settings or times using an input, such as a keyboard, into communication with ICS 20. In other embodiments, such thresholds and setting values make outdated using one or more algorithms to achieve various objectives such as reduced weight time, maximum number of users and the like. In some embodiments, different users may be provided with different maximum available individual workout time settings or times. For example, premium members may be provided with a greater maximum available individual workout time setting as compared to non-premium members. In some embodiments, persons may be required to input a member identification or use a member identification card when attempting to use a particular FEU, wherein the enhanced maximum available individual workout time may be indicated or provided.

In addition to transmitting the maximum available individual workout time settings and times to FEUs 1322, 1324, ICS 20 may also transmit such time values to display 1326, 1328. As a result, a person attempting to use a particular FEU 1322, 1324 is notified of the maximum time available for use of the particular FEU 1322, 1324 at that moment in time. In the example illustrated, ICS 20 further transmits the maximum available individual workout times for multiple FEUs 1322 and multiple FEUs 1324 to displays 1330 and 1332. Display 1330 and 1332 allow persons in fitness facility 1300 to view which of FEUs 1322, 1324 or which types of FEUs may have reduced maximum available individual workout times or larger maximum available individual workout times. Displays 1330 and 1332 enable persons to better decide which of FEUs 1322, 1324 he or she should use.

In other embodiments, in lieu of comprising monitors or display panels mounted within fitness facility 1300, displays 1330, 1332 may alternatively comprise portable displays. For example, in one embodiment, ICS 20 may transmit data identifying the maximum available individual workout times for different FEUs at a particular moment in time or for particular future periods of time to such portable displays. Examples such portable displays include personal data assistants (PDAs), cell phones, digital music players and other portable electronic display devices. In one embodiment, ICS 20 may alternatively or additionally present data identifying the maximum available individual workout times for different FEUs at a particular moment in time or for particular future periods of time on a network site or Internet website which may be accessed by person using facility 1300 or planning to use fitness facility 1300.

As further shown by FIG. 9A, usage information from FEUs 1322, 1324 and from sensors 1336, 1338 may alternatively or additionally be communicated or transmitted to an additional or alternative ICS 1320 at a remote location or remote facility 1400. In such an embodiment, ICS 1320 may constitute a centralized control hub receiving usage information from multiple different fitness facilities. ICS 1320 may determine transmit maximum available individual workout times or time settings for the FEUs at the different fitness facilities.

Preventative Maintenance (PM) tracking 216 is another possible selection from the interface menu 202 shown in FIG. 9. When this option is selected, the user is led to query screen 490 shown in FIG. 22. As in many of the other reports, the PM tracking report can be organized by product groups. To this end, the query screen criteria includes the site of geographic region for the report 492, the product category 494, a primary sort option 496, for example, product category, manufacturer, installation date of the FEU, as well as a secondary sort criteria 498. A further selectable criteria is whether the preventative maintenance suggestion has been signed off by the responsible personnel 500.

The report results are tabulated in screen 501, shown in FIG. 23, in matrix format. The columns of information, include the manufacturer 502, the equipment type 503, the Model number/designation 504, the owner I.D. number or designation 505, the serial number of the FEU 506, the installation date 507 of the FEU, the hour meter reading 508, the mileage or stride number reading 509, the recommended PM to be carried out 510, and an icon 511 to view the service report for the FEU. Also provided is a first column of colored indicia 512, with the colors selected to indicate the urgency of the preventative maintenance or whether or not the preventative maintenance has been carried out. Screen 501 also includes a key 524 for the PM column 510.

It will be appreciated that the information provided in FIG. 23 can make the carrying out of preventative maintenance operations more efficient by saving time and costs while improving the accuracy and compliance of the preventative maintenance. This information also provides a fast and efficient manner of collecting hour meter and odometer readings on FEUs.

From the menu screen 202 of the report interface, the Unit Workout History 218 may be selected by the user. These summaries provide how products or product groups are utilized in the clubs and gyms, for example the workout courses used, lengths of the workouts, the speeds and resistance levels that are being used. This information can be helpful to the club/facility owner/manager as well as manufacturers to determine how better to offer training, instruction, and appropriate equipment to members/customers. When the Unit Workout History option 218 is selected, the user is led to a query screen 513, shown in FIG. 24, which may be similar to the query screen in many of the other reports/options described herein. The information sought can be categorized by product group. To this end, screen 513 may include the following selectable criteria: manufacturers of the FEUs 514, product category 515, club location or region 516, query dates 518, and/or primary sort options 520. Of course, a secondary sort option could also be provided, not shown.

The information for the Unit Workout History report may be provided in graphical and/or tabular format, shown in FIG. 25, which illustrates information pertaining to usage of a particular treadmill at Club X-101. The graphical information includes a first bar graph 522 showing the number of workouts of particular durations. As shown in the graph, most of the workouts are from 11 to 20 minutes. A second bar graph 524 shows which of the treadmill workout courses were selected most often. As shown in the graph, the manual course was most popular. The tabular information 526 provides specific information on the usage of a particular FEU. In this regard, the FEU is identified in box 525 in terms of the manufacturer, the model designation, the manufacturer's serial number, the S/W and the communications address. The usage information tabulated includes the location 528 and the Model type of the FEU 530, the date of the workout 532, the time that the workout started 534, the course selected for the workout 536, the calories expended by the exerciser 538, the distance covered during the workout 540, the maximum speed (in miles per hour) attained during the workout 542, the maximum incline 544 of the treadmill during the workout, and the length of the workout 546. As will be appreciated, this provides very valuable, detailed information to owners and managers of clubs and facilities, as well as to equipment manufacturers.

A further selection available from the menu screen 202 of the report interface of FIG. 9 is a Special Reports feature 220. When this selection is made, screen 560 appears as shown in FIG. 26. Such reports are for requests not fulfilled by existing report formats and if the user would prefer that Service Tracker™, the fictitious administrator of System 18, create the report for the user. The user provides Service Tracker™ with a particular issue or question to be answered, an analysis to be formed, data to be gathered, etc. Thereafter, Service Tracker™ will carry out the request by the user and provide the report via tabular and/or graphical output. Example 1, designated as 562, of a particular type of report may be an overall analysis of peak time usage of FEUs to recommend a better assortment of products to the user. Another possibility would be Example 2, designated as 564 consisting of an End of Fiscal Year Report showing usage (wear) on all products purchased in a particular year. Another possibility would be Example 3, designated as 566, requesting an analysis to support a better distribution of current products and new products between or among specific locations. As will be appreciated, a very wide variety of special reports are possible through the Special Reports request.

Figure 9B:
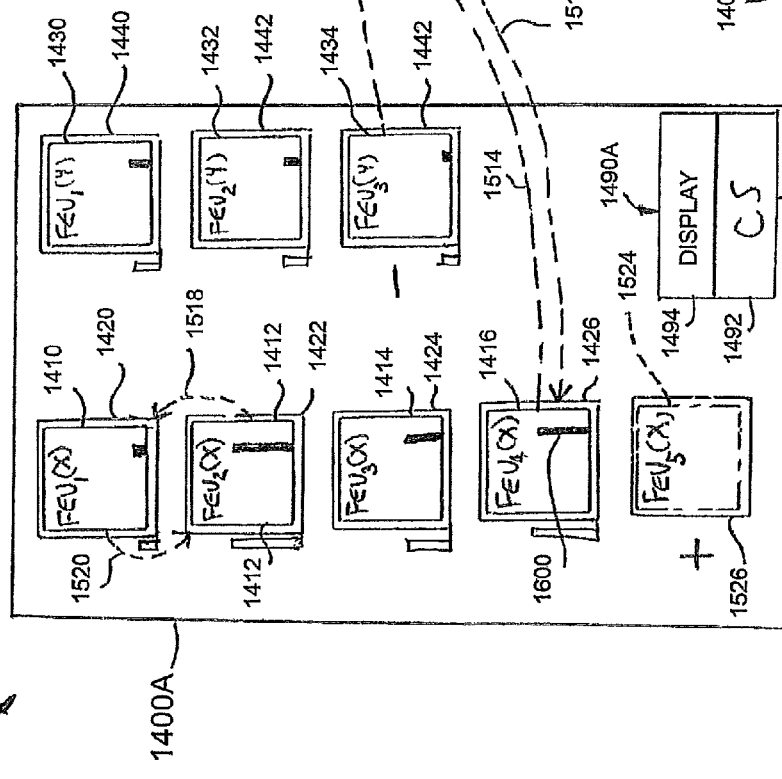

FIG. 9B illustrates one example of such an analysis to support a better distribution of FEUs. In particular, FIG. 9B schematically illustrates fitness equipment unit distribution management system 1400 according to an example embodiment. Fitness equipment unit distribution management system automatically collects usage information from fitness equipment units and provides a report, display or other output of recommended or suggested changes to the current distribution of fitness equipment units based upon the collected usage information. The suggested changes to the current distribution of fitness equipment units may be (1) such that the useful life of such fitness equipment units is prolonged, (2) such that those units that are used most frequently or used for prolonged times have less wear to therefore provide more persons exercising with greater reliability and satisfaction and/or (3) such that the time at which a fitness equipment unit needs to be replaced may be delayed. As shown by FIG. 9B, system 1400 comprises fitness facilities 1400A (FFA) and 1400B (FFB) (collectively referred to as fitness facilities 1400) and central computing device 1404.

Fitness facilities 1400 comprise buildings, rooms or other locations that are remote from, or separate to, one another and that contain health and exercise equipment or fitness equipment units. Fitness facilities 1400 may also include different areas or regions of a single larger facility. Fitness facilities 14 may be owned, operated or managed by the same entity. The output provided by computing device 1404 facilitates management of the distribution of equipment or fitness equipment units at facilities 400 by the entity that owns, operates or manages both facilities 1400.

In the example illustrated, fitness facility 1400A comprises two "types" of fitness equipment units denoted by "X" and "Y". For purposes of this disclosure, the term "type" refers to a general type or category of exercise equipment. Examples of such different categories of exercise equipment include elliptical machines, stair steppers, treadmills, stationary bikes, adaptive motion trainers or machines and the like. Each category or "type" may include different machines from different manufacturers, different machines of different brands or different machines having different features. For example, in one embodiment, "X" may denote elliptical machines while "Y" denotes treadmills. Although fitness facilities 1400 illustrated as including two such "types" of fitness equipment units for ease of illustration and discussion, fitness facilities 1400 may include additional types as well the additional numbers of types of fitness equipment units.

FIG. 9B schematically illustrates each of fitness facilities 1400 in solid lines prior to implementation of distribution changes as recommended by computing device 1404. Those changes recommended by computing device 1404 based upon collected usage information are illustrated in FIG. 9B in broken lines. As shown by FIG. 9B, prior to implementation of any distribution changes, fitness facility 1400A includes fitness equipment units 1410 (FEU1(X)), 1412(FEU2(X)), 1414 (FEU3(X)) and 1416 (FEU4(X)) of type X at locations 1420, 1422, 1424 and 1426, respectively. Fitness facility 1400A includes fitness equipment units 1430(FEU1(Y)), 1432(FEU2(Y)) and 1434 (FEU3(Y)), of type Y at locations 1440, 1442 and 1444, respectively. Prior to implementation of any distribution changes, fitness facility 1400B includes fitness equipment units 1450 (FEU6(X)), 1452(FEU7(X)) and 1454 (FEU8(X)) of type X at locations 1460, 1462 and 1464, respectively. Fitness facility 1400B includes fitness equipment units 1470(FEU4(Y)) and 1472(FEU5(Y)) of type Y at locations 1480 and 1482, respectively.

In the example illustrated, a current cumulative usage state (reflecting the age or total wear) of each fitness equipment unit is schematically illustrated with a solid vertical bar, the higher or taller the solid bar, the higher or larger the extent of usage of the particular fitness equipment unit. Such usage may be measured using any one a variety of different metrics, for example, total hours of usage, total miles as reflected by an odometer, total number of separate exercise sessions by users, and/or combinations thereof. The depicted bars are for illustrative purposes only to indicate a state of the machines or fitness equipment units. Any fitness equipment units illustrated without any bars constitute fitness equipment units that are new or substantially new.

In the example illustrated, the usage trend at each location is schematically illustrated with a hollow vertical bar. The usage trend or rate constitutes the extent that a particular fitness equipment unit at a particular location is used during a predefined period of time. For example, if a first fitness equipment unit at a first location is used 80 hours for a month and a second fitness equipment unit at a second location is used 50 hours during the same month, the higher usage rate or trend of the first fitness query unit at the first location would be represented by a taller hollow bar as compared to the smaller hollow bar representing the usage rate at the second location. In some instances, the usage state of a fitness equipment unit may not correspond to the usage rate at a particular location. For example, an older machine having a high usage state may be located at a location having a low usage rate. Those fitness equipment units which are all installed when new will have usage states corresponding to the usage rates at locations in which such units were installed.

As further shown by FIG. 9B, fitness facilities 1400A and 1400B include computing devices 1490A and 1490B, respectively. Computing devices 1490A and 1490B (collectively referred to as computing devices 1490) each comprise a controller or control server 1492 and a display 1494. Control server 1492 comprises one or more processing units in communication with each of fitness equipment units in the associative fitness facility so as to be capable of automatically collecting usage information from each of the fitness equipment units. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, control server 1492 may be embodied as part of one or more application-specific integrated circuits (ASICs). Unless otherwise specifically noted, the controller is not limited to any specific combination of hardware circuitry and software, nor to any particular source for the instructions executed by the processing unit.

According to one embodiment, control server 1492 of fitness facility 1400A communicates with each of the fitness equipment units of facility 1400A in a wired or wireless fashion. Likewise, control server 1492 of fitness facility 1400B communicates with each of fitness equipment units of facility 1400B in a wired or wireless fashion. Following instructions or a computer readable program contained in an associated persistent storage device or memory (or an integrated circuit) associated with control server 1492, control server 1492 automatically collects usage information from each of the associative fitness equipment units on a periodic basis. For example, control server 1492 may directly access and/or directly receive signals representing use of the associative fitness equipment unit. Control server 1482 may directly access or directly receive signals from an odometer (identify miles or distance usage) or clock (identifying time are hourly usage). In another embodiment, control server 1492 may collect or access such usage information from a memory or other storage device associated with the fitness equipment unit itself. Because such data collection is performed automatically on a periodic basis, no user or manager intervention is required. In other embodiments, the collection of data may be done in response to a command by a person or trigger event. Such usage information may additionally include a warranty expiration date for the fitness equipment unit.

The usage information collected may include both the usage state of each fitness equipment unit, the usage rate at each of the locations at which the fitness equipment units are located or installed, the number of separate usage sessions of each fitness equipment unit or combinations thereof. Such usage information may additionally include the date of installation and warranty expiration date or dates for each fitness equipment unit. In one embodiment, the usage rate for a fitness equipment unit may be calculated based upon the usage state and the date of installation data for the fitness equipment unit.

Each display 1494 comprises a device configured to present output from server 1492 on a panel, screen or monitor. In some embodiments, display 1494 may be omitted. In yet other embodiments where computing device 1404 itself directly communicates with each of the fitness equipment units at each of the fitness facilities 1400, computing devices 1490 may be omitted.

Computing device 1404 comprises a controller or control server 1496 and output device 1498. Control server 1496 comprises one or more processing units in communication with control service 1492 of each of a plurality of fitness facilities such as fitness facilities 1400. In one embodiment, control server 1496 is remote from fitness facilities 1400 and communicates with fitness facilities 1400 across the Internet 1497 or other computer network. In one embodiment, control server 1496 communicates in a wired or wireless fashion.

Control server 1496 is configured to operate according to operating instructions (software, code or computer readable program) contained in a memory or other persistent storage device (integrated circuit, flash memory) associated with control server 1496. In accordance with such instructions, control server 1496 automatically collects, gathers, retrieves or requests usage information regarding each of the fitness equipment units at fitness facilities 1400. In the example illustrated in which each fitness facility 1400 has its own computing device 1490, controls server 1496 obtains such usage information from computing devices 1490. In other embodiments where one or more of fitness facilities do not include a dedicated computing device 1490, control server 1496 may communicate directly with individual fitness equipment units to directly obtain such usage information from the fitness equipment units in the fitness facility that does not include a local computing device 1490.

In accordance with the instructions, control server 1496 additionally analyzes the usage information to formulate or generate a suggested or recommended distribution change for the fitness equipment units at an individual fitness facility or amongst multiple fitness facilities. In one embodiment, such distribution changes generated by control server 1496 take into account the locations in the fitness facility or facilities that are experiencing the higher levels of usage. For example, elliptical exercise machines next to a particular window, the locker room or a snack bar may experience greater levels of usage as compared to elliptical exercise machines and other locations in a fitness facility. In one embodiment, the distribution changes may result in newer or less used fitness equipment units, such as elliptical exercise machines, being relocated to those locations experiencing higher use to better ensure reliability and user satisfaction at the higher use location or locations in the fitness facility.

In one embodiment, the distribution change generated by control server 1496 is such that usage of fitness equipment units is more uniform (less varied) amongst the fitness equipment units. In one embodiment, the distribution chains are such that the usage of fitness equipment units with usage greater than an average usage of it is clearly units at a particular fitness facility or amongst multiple fitness facilities is reduced. In one embodiment, the distribution change additionally takes into account the age of the individual fitness equipment units and/or the expiration dates of warranties associated with the fitness equipment units to either maximize use of fitness equipment units covered under warranty or to delay the date at which fitness equipment units must be replaced, potentially resulting in larger numbers of particular types of fitness equipment units being replaced at one time to facilitate volume purchase or leasing discounts as well as to reduce installation and set up interruptions. Once the distribution change has been generated by control server 1496, control server 1496 outputs the distribution change using output device 1498.

Output device 1498 comprises one or more device configured to present or make available the output of distribution changes to the person or entity owning, operating or managing fitness facilities 1400. In the example illustrated, output device 1498 includes multiple modes for providing such output of distribution change. In a first mode, output device 1498 includes a display, such as a monitor, screen or panel directly connected to control server 1496, wherein the output may be presented on the display. In a second mode, output device 1498 additionally comprises a printing device configured to print a hard copy version of the output of distribution changes. In a third mode, output device 1498 comprises a communication interface configured to communicate electronic data or electronic files representing the output of distribution changes to a remote location via a local area network, the Internet or the like, whereby the owner/operator/manager may access information on a website, at a management facility, on a personal data assistant, on a cell phone or the like. In some embodiments, output device 1498 may include less than all of the above modes.

According to one embodiment, computing device 1404 is additionally configured to implement the distribution changes recommended in the output. In particular, computing device 1404 is configured to receive authorization input from the owner/operator/manager, to verify the owner/operator/manager's credentials, to receive selections from the owner/operator/manager regarding the carrying out of all or portions of the recommended distribution changes and to transfer such distribution change instructions to those individuals responsible for carrying out such distribution changes. For example, in one embodiment, the owner/operator/manager, upon receiving output on website, may be provided with the opportunity to check, highlight, click on or otherwise select one or more of the recommended distribution changes (relocation of fitness equipment units, switching of fitness equipment unit locations, purchase of new fitness equipment units to change the composition of fitness equipment unit types). In one embodiment, this opportunity may presented only after the identity and credentials of the owner/operator/manager has been verified.

Upon receiving such selections, control server 1496 automatically forwards appropriate instructions to those individuals for carrying out the distribution changes. For example, control server 1496 may electronically forward instructions to a facility manager or person at the facility responsible for fitness equipment unit maintenance or set up, instructing the manager a person to relocate or move one or more fitness equipment units. Control server 1496 may also electronically forward purchase orders or requests to those retailers or other fitness equipment unit suppliers. As a result, in some embodiments, control server 1496 not only recommends or suggest distribution changes based upon the automatic collection of usage data but also facilitates implementation of such distribution changes.

FIG. 9B illustrates one example of output 1500 provided by control server 1496 based upon or using usage information from fitness equipment units of fitness facilities 1400. As noted above, such output 1500 may be present are communicated using output device 1498 in one of various modes. The distribution changes included in output 1500 are further schematically illustrated as implemented fitness facilities 1400 in broken lines.

Output 1500 includes distribution changes 1502, 1504, 1506, 1508 and 1510. One of distribution changes 1502 recommended by control server 1496 based upon such collected usage information is to switch the locations of fitness equipment units 1416 and 1454 between fitness facilities 1400A and 1400B. This distribution change 1502 is further illustrated by broken line arrows 1512, 1514. As indicated by the usage bars on the fitness equipment units, fitness facility 1400A is experiencing a large usage of fitness equipment units of the type X. The example distribution change 1502 relieves some of the usage pressure in fitness facility 1400 by moving fitness equipment unit 1416 which has a high usage state 1600 to fitness facility 1400B while moving fitness equipment unit 1454 which has a relatively low cumulative usage state 1602 to fitness facility 1400A. As a result, the collective reliability of the fitness equipment units of type X at facility 1400A where the total usage rate is greater is enhanced.

Distribution change 1504 switches the locations of fitness equipment units 1410 and 1412. This change is further indicated by a broken line arrows 1518, 1520. This change results in the fitness equipment unit 1412 having a high usage state at a high usage rate location 1422 being moved to a low usage rate location 1420 and further results in fitness equipment unit 1410 having a low usage state at a low usage rate location 1420 being moved to a high usage rate location 1422. As a result, a newer are less used fitness equipment unit is offered at a location at a higher usage rate, reducing likelihood of reliability issues at the most preferred or higher use location in fitness facility 1400A.

Distribution change 1506 further addresses the high cumulative usage rate of the fitness equipment units of type X at facility 1400A by adding a new fitness equipment unit 1524 at a new location 1526, increasing capacity or availability for fitness equipment units of type X at facility 1400A.

Distribution change 1508 adds a new fitness equipment unit 1528 at a new location 1529 in facility 1400B. As a result, additional usage capacity is provided to facility 1400B to relieve the high usage rates existing at locations 1482 and 1484.

Distribution change 1510 relocate fitness equipment unit 1434 from fitness 1400A to a new location 1530 at fitness facility 1400B. As a result, the excess capacity of low usage state of unit 1434 at the low usage rate of location 1442 is transferred to fitness facility 1400B to address the larger usage demand at facility 1400B.

Figure 27:
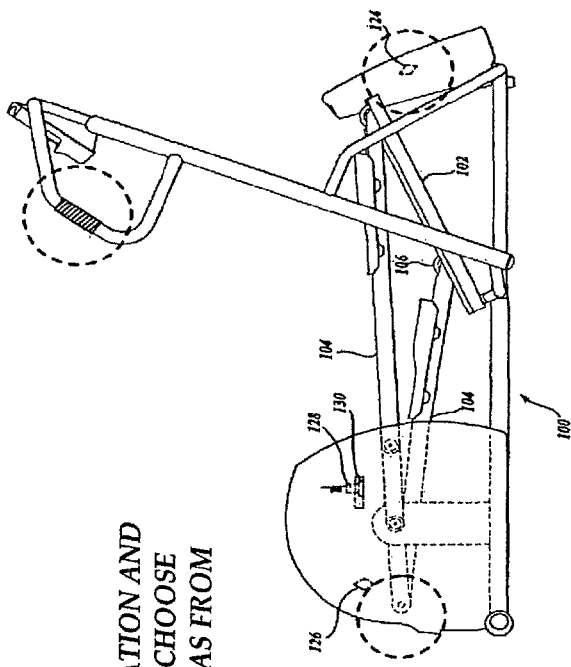
FIG. 27 is a screen for obtaining troubleshooting service information on fitness equipment units.

Trouble Shooting Service Issues 222 comprise a further inquiry that can be made through the menu screen 202 of the report interface 190. This selection helps a user obtain more information concerning a service alert. When a service alert is received, the user can select the Model type and the error code, and thereby receive a list of common trouble shooting ideas. The user can also see the parts required to repair the FEU so as to be able to order the parts more easily. To this end, the user is provided with views of the product and is given instructions from the manufacturer's user manual. For example, as shown in FIG. 27, a depiction of the FEU can be provided to the user. From the depiction, the user can choose a specific area of the FEU (for example, those areas that are circled in FIG. 27) to obtain not only more information, but also a diagram of the parts composing that portion of the FEU together with the applicable part numbers.

A further available selection from the menu screen 202 is the Automatic Parts Inventory 224. In this option, when an error code indicates that replacement of a part is necessary, Service Tracker™ tells the manufacturer that a particular part is required. The manufacturer's internal system can automatically send or offer to send the part to the location predesignated by the customer, whether to a warehouse, a third party service provider warehouse, club location, etc. As will be apparent, this particular option can speed the repair of the affected FEU.

The user interface screen 202 also allows the user to obtain specific current status and maintenance reports for all FEUs owned by the user through the service menu 570, as shown in FIG. 9. The service menu 570 has various selections, including an All Unit Service Status 572, a Specific Unit Service Status 574, and a Current Maintenance Report selection 576.

When the All Units Service Status 572 is selected, a report is displayed for the service status of all units owned by the user, shown in screen 577 of FIG. 28. The information may be arranged in matrix format with the information provided in columns, including the Model designation of the FEU 578, the type of FEU 580, the FEU identification number as assigned by the owner 582, the current service status of the FEU 584, the current error status 586, whether or not an error alert has been sent 588, and the date and time of the last reply received from the FEU 590. Also, in a first column 592, color coded icons can be provided for a desired parameter to be displayed. For example, perhaps the color red can be displayed if the current error is shown in column 586, perhaps green if the current status of the unit is active, and yellow if the current status of the unit is idle, and thus, ready for use.

Figure 29:
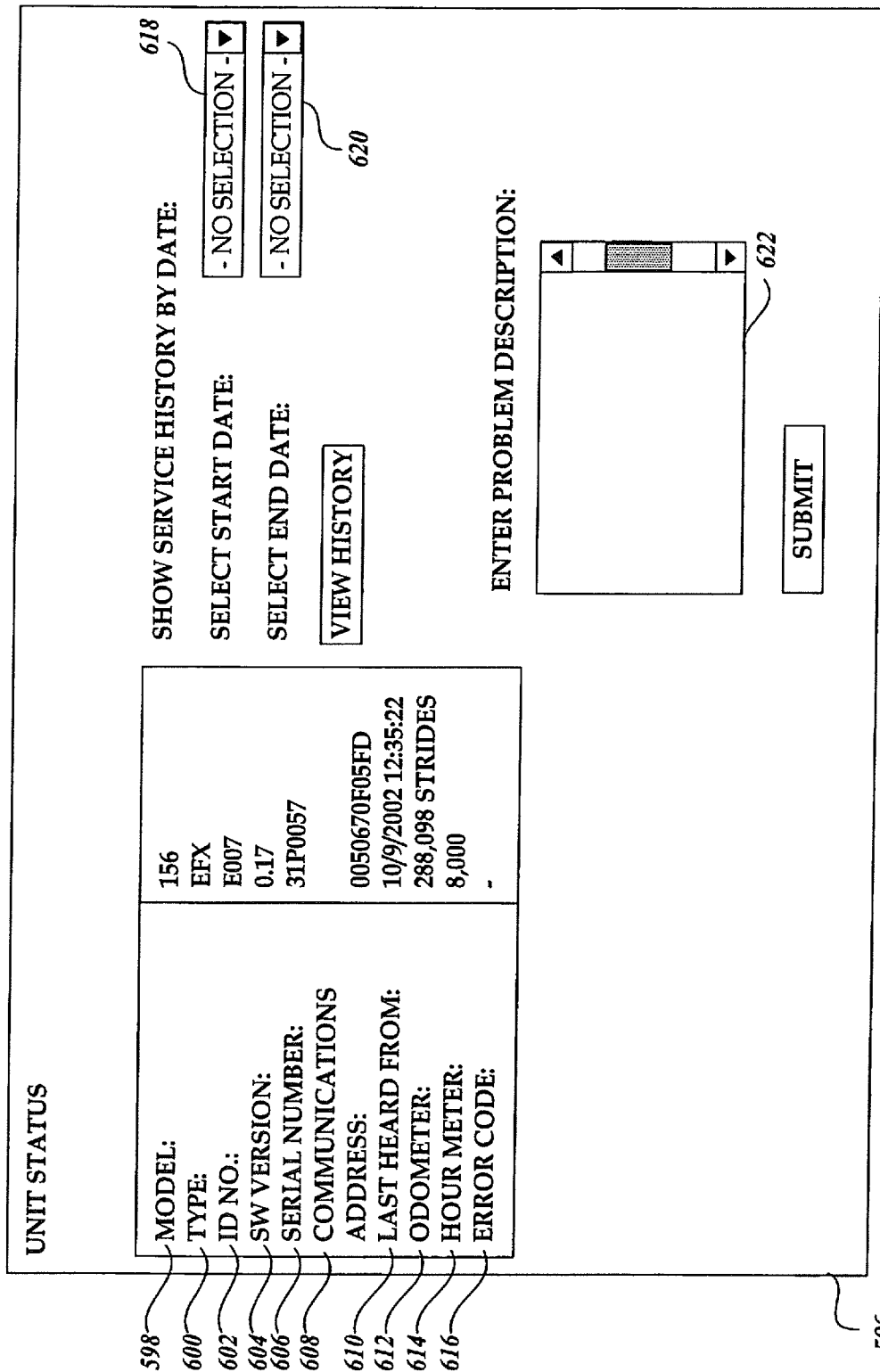
FIG. 29 is a report screen particular to an individual fitness equipment unit shown in FIG. 28.

Further information is provided in the screen 596 for a particular unit, see FIG. 29. Information on a particular unit can be obtained by simply selecting one of the product I.D. numbers 582 shown in FIG. 28. The further information as shown in screen 596 includes the Model designation of the FEU 598, the type of FEU 600, the owner I.D. number or designation of the FEU 602, the S/W version 604 the manufacturer's serial number 606, the communication address 608, the last service report/alert date and time 610, the odometer reading 612, the hour meter reading 614, and the current error code 616. From screen 596, it is possible to obtain the service history of the FEU throughout its entire life or during a particular time period, by selecting a start date 618 and an ending date 620 and then selecting the "View History" box 621. Also, it is possible for the user to enter a description of a problem that is occurring with an FEU in textbox 622.

The service history record of the FEU may be provided, as shown in screen 624, FIG. 30. In the first or upper portion of the Service History record, identification information can be provided, including the Model designation 626, the manufacturer's serial number 628, the S/W 630, the identification number of the FEU as provided by the owner 632, and the communications address for the FEU 634. This information should be the same as in screen 596. Screen 624 also sets forth in tabular format the service history of the selected FEU, including the date of service 636, the time 638 of service on the particular date, the state of the unit at that time 640, the hour meter reading 642, the odometer reading 644, the then current error codes 646, and whether or not a service alert was sent 648. As apparent, the foregoing provides a convenient way for the club/facility owner/manager to ascertain the current service status of all units owned as well as the service history of any particular FEU.

Through selection of the Unit Status Search 574 in menu 570, the foregoing information can be obtained for a particular FEU owned by the user, by navigating through applicable selection options in a standard manner.

From menu 570, the user can also obtain a current preventative maintenance report for any or all of the user's units at a particular location or at all locations and as of a particular date. Screen 660 sets forth a preventative maintenance report for all of the user's FEUs in tabular form, see FIG. 31. The information provided in each column includes the Model designation 662, the type of FEU 664, the identification number 666, the manufacturer's serial number 668, the installation date of the FEU 670, the hour meter reading 672, the miles/strides odometer reading 674, the maintenance status 676, and the date of the maintenance status 678. Screen 660 also includes the location of the FEU 680 as well as the date of the report 682. As will be appreciated, the foregoing provides a convenient manner in which the user can ascertain the preventative maintenance status of each of its FEUs. Moreover, the user can select a particular FEU to obtain its preventative maintenance history in much the same way that the service status history for a particular unit was described above and illustrated in FIGS. 29 and 30.

The interface screen 202 in FIG. 9 also includes a menu 700 that allows the user to conveniently access usage information pertaining to its FEUs. Available options include Current Usage information 702, Usage Trend information 704, usage information, Usage Search, for a specific FEU 706.

If the Current Usage option 702 is selected, the information about the current usage of the user's FEUs is provided in tabular format, for example see screen 712, shown in FIG. 32. The columns of information provided include the manufacturer's Model designation of the FEU 714, the type of FEU 716, the identification number of the FEU 718, the current usage status of the FEU 720, the current speed of the FEU 722, the current incline of the FEU 724, the current resistance level of the FEU 726, and the current course being utilized 728. Also, as a first column 730, a color designation can be provided to perhaps designate the usage status of the FEU with different colors for various status states.

It is possible to obtain the usage history of a particular FEU by selecting that particular FEU in FIG. 32, which leads the user to screen 734, as shown in FIG. 33. This selection screen is similar to screen 596 shown in FIG. 29. In this regard, screen 738 includes much of the same information for a particular unit as set forth in screen 712, including Model number 736, equipment type 738, the manufacturer's serial number 740, the FEU identification number 742, the S/W version 744, the hour meter reading 746, the odometer reading 748, the current status 750, the current error code 752, if any, the current speed of the unit 754, the current incline 756, and the current resistance level 758. Also, in screen 734, the user can select a particular time period for the usage history desired by entering dates in the start date box 770 and the end date box 772 and then selecting the "View History" box. If no dates are entered, the entire usage history is provided. Also, screen 734 includes a description box 774 wherein the user can enter a description about the FEU in question.

Completion of query screen 734 results in the generation of a report screen 780 which provides a usage history of the FEU for the time period selected. Identification information for the FEU is set forth at the top of screen 780, including the manufacturer's Model designation 782, the manufacturer's serial number of the FEU 784, the S/W 786, and the communications address for the FEU 788. The historical information on the usage of the FEU includes the time 790 and the date 792 that each workout began as well as the course chosen for the workout 794, the number of calories expended during the workout 796, the workout distance in the number of strides or mileage covered 798, and the duration of the workout 800. As will be apparent, this information can be valuable in telling the user how a particular FEU is being utilized by customers.

Figure 35:
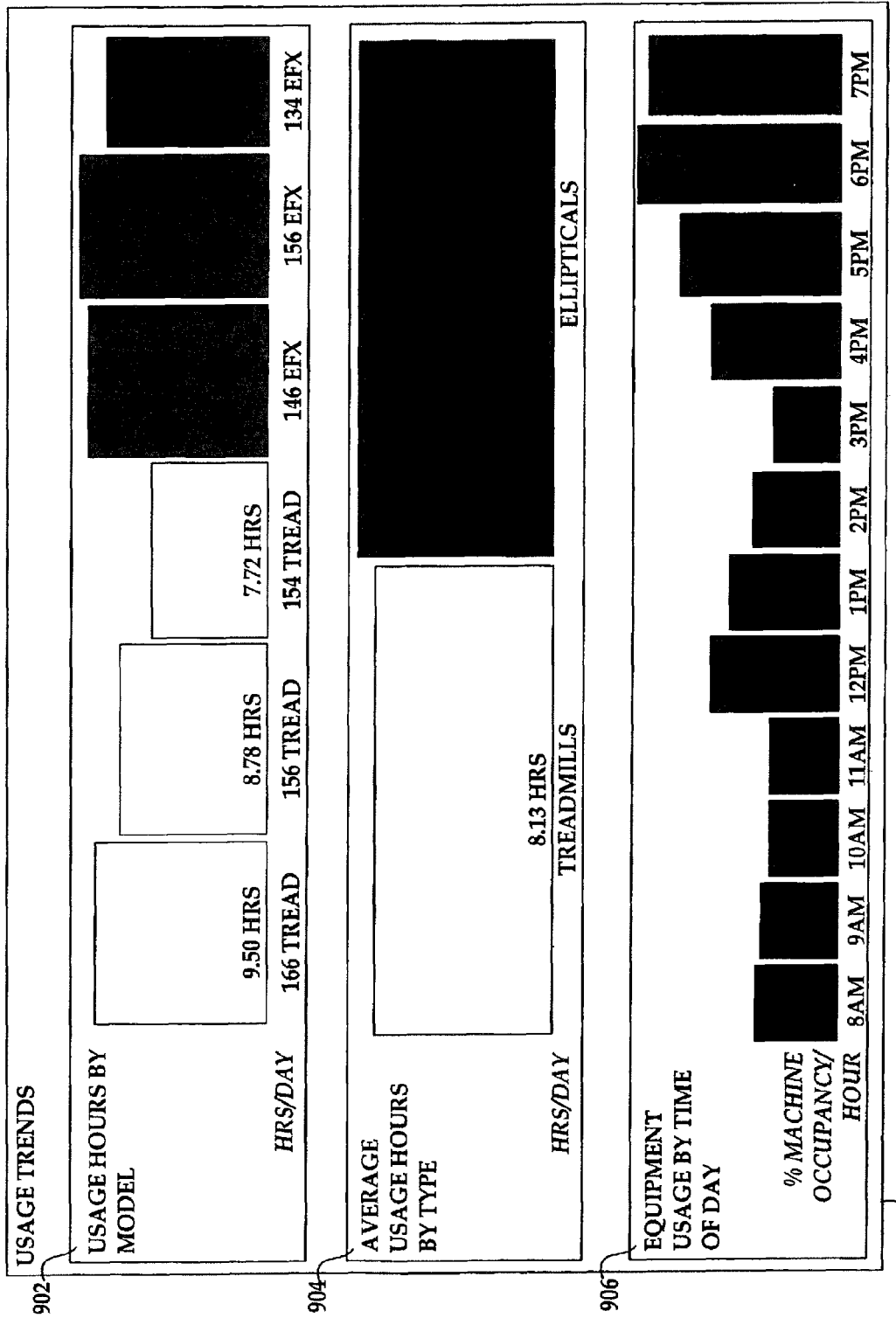
FIG. 35 is a report screen showing trends of usage of fitness equipment over time by selected criteria including equipment type, equipment at a particular location, etc.

If the Usage Trends option 704 is selected in menu 700, graphical representations of equipment usage for a desired time period is presented for a desired product group, for example as shown in screen 900, see FIG. 35. This screen shows three separate graphs, including a first graph 902 showing average usage hours per day by manufacturer's Model designation during the selected time period. The second graph 904 shows the average usage hours per day by type of FEU, for example treadmills and elliptical cross-trainers. Graph 906 shows selected equipment usage by time of day in terms of a percentage of the equipment being utilized in a club or gym during the selected date duration. This information can be very useful in assisting the user in making purchase decisions and other decisions pertaining to its FEUs.

Option 706 in menu 700 allows the user to obtain usage information for a particular FEU. This option can lead the user through menus similar to those described above to select a desired FEU, and then the information for that FEU is displayed in a manner identical or very similar to that shown in FIGS. 33 and 34, above.

As noted above, other interface systems, formats, and layouts can be utilized in the present invention in place of interface 190. FIGS. 36-43 illustrate portions of an alternative interface system utilizing an initial menu screen 1000 shown in FIG. 36. This menu screen has various report selections, including Usage Summary 1002, Usage Summary by Model 1004, Unit Workout History 1006, Unit Service History 1008, Installation and Warranty Tracking 1010. Also, in screen 1000 it is possible to request Unit Service Alerts 1012, Network Service Alerts 1014, and it is possible to request Service for a particular FEU by selection 1016. The foregoing selections available in screen 1000 are similar to corresponding screens illustrated and described above, perhaps with the exception of the installation and warranty tracking option 1010, which option will now be described in more detail.

Figure 36:
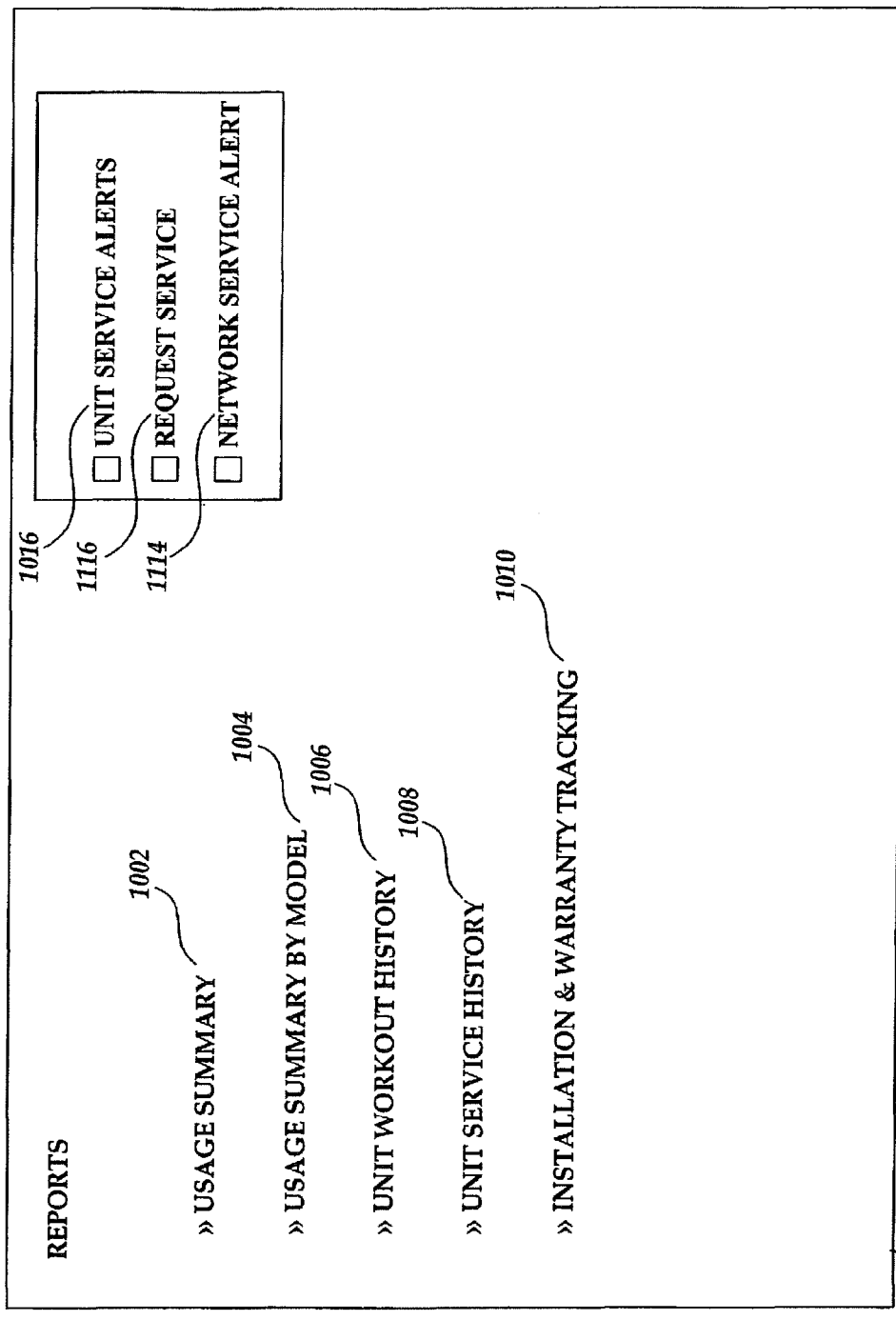
FIG. 36 is a menu screen of information and reports available to the present invention.

Selecting the Installation and Warranty Tracking option 1010 in FIG. 36 leads to a series of query screens shown in FIGS. 37-42 to provide the user with a step-by-step intuitive query process. FIG. 37 shows an initial screen 1020 which is used to select a location(s) to be queried. The location(s) could be all of the locations of a particular company or club those locations in a particular county, a region of a county, a state, a county of the state, a city, a section of a city, down to an individual location or even a floor, section, or area of a particular location. Access to specific locations will depend on authorization, for example, employees of Company A will not likely be given access to information pertaining to Company B, though information to all companies would be available to the enterprise administrator.

Figure 38:
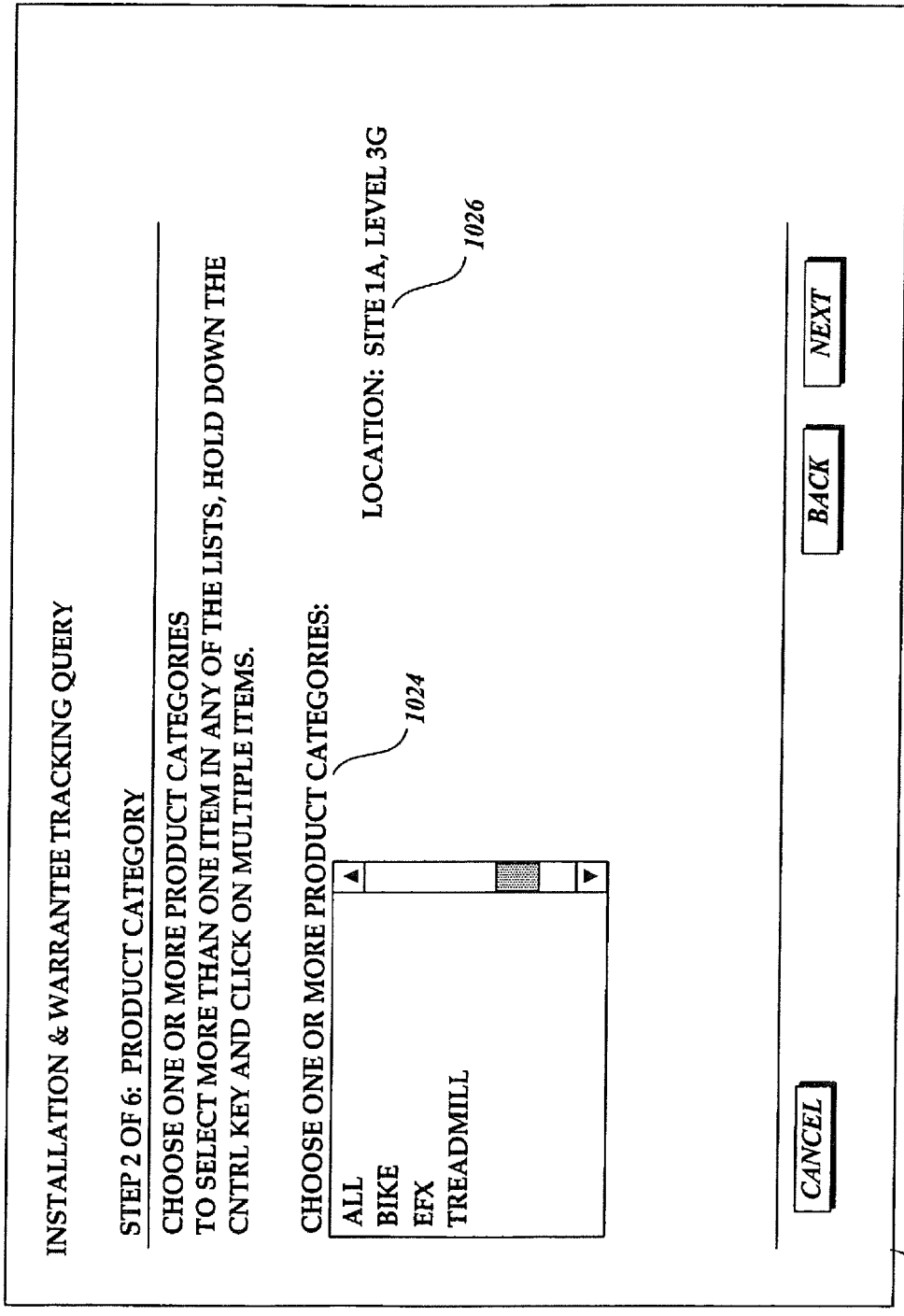
FIG. 38 is the second screen of the query.
Figure 39:
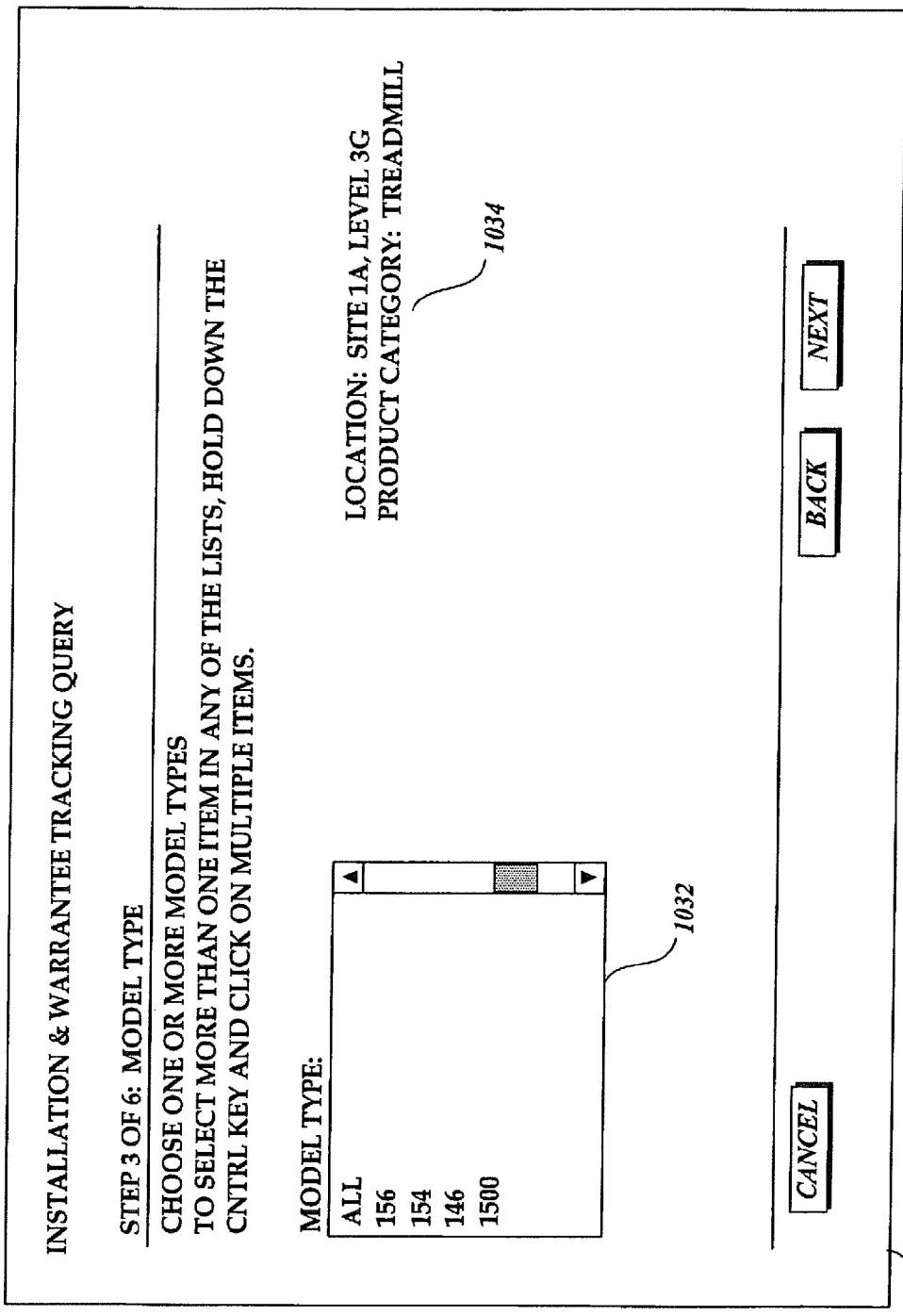
FIG. 39 is the third screen of the query.

Once a location is chosen, the user is led to the next screen, screen 1022, shown in FIG. 38. In this screen, the user selects the type or type(s) of equipment with respect to which the query is being made, as shown in menu 1024. With each progressive screen, the information selected from prior screens is also provided in the right hand portion of the screen. For example, in screen 1022, the location selected from screen 1020 is provided at 1026. After selecting the product category, the user is led to screen 1030, FIG. 39, wherein the user can select a particular model or models of the product type selected in screen 1022. The user can select all models if desired from menu 1032. Again, that criteria selected in prior screens is set forth in screen 1030, as shown in location 1034.

Next, the user is directed to screen 1040 shown in FIG. 40. In this screen, the user selects from menu 1042 the type or types of warranty being ascertained, for example a warranty on the frame, the unit display, the motor, controller, parts and/or labor. Again, the selections made in the prior screens are shown in the right hand side of screen 1040 at location 1044. Next, the user is led to screen 1052, shown in FIG. 41, which provides display options for the Installation and Warranty Tracking information. The information can be displayed based on the manufacturer's serial number 1054, or the Unit Identifier used by the FEU owner 1056. Also, an option 1058 is provided to limit the present inquiry to only warranties that have expired. Again, in the right hand portion of screen 1052 the prior selection criteria is set forth at location 1060.

Figure 42:
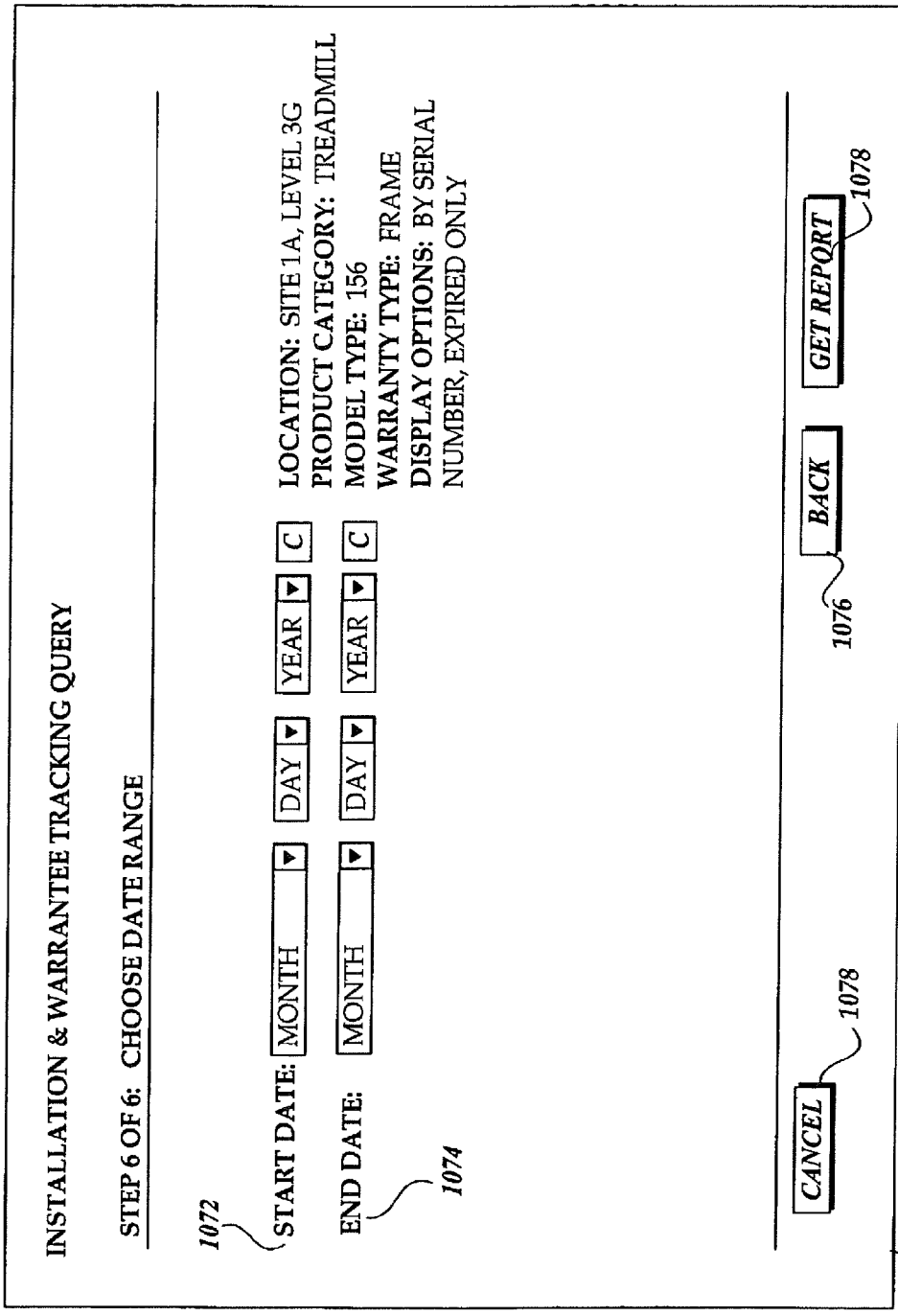
FIG. 42 is the sixth screen of the query.

The last query screen 1070 is shown in FIG. 42. In this screen, the user may select a date range for the Installation and Warranty Information being requested. This date range may be a start date 1072 as well as an ending date 1074. At any of the query screens, it is possible to go back to a prior screen by selecting the back button 1076 or to cancel the inquiry by selecting the cancel button 1078. Also, the prior selection screens (1020, 1022, 1030, 1040, 1042) have a "next" button to go to the subsequent query screen. Since screen 1070 is the last query screen, this screen has a "Get Report" button to display the information based on the selections made in the query screens.

Screen 1080 shown in FIG. 43 sets forth the resulting information based on the query criteria selected by the user. The information is provided in columnar format. Also, the criteria selected for the query is set forth in the upper portion of the screen. The columns of information include the Product Category 1082, the Product Model(s) 1084, the Location of the FEU 1086, the Unit Identifier or ID number 1088, the Installation Date of the unit 1090, the hour meter reading 1092, the odometer reading 1094, and a service history view column 1096, which if selected will provide the service history of the particular FEU. The displayed information also includes the warranty expiration dates 1098 for different components of the FEU which are covered by warranty, including the frame 1100, the display 1102, the motor 1104, and motor fan 1106. Also, for the various components covered by warranty, columns can be provided for separate warranty dates for replacement parts 1108 and labor 1110. It will be appreciated that the warranty expiration for parts and/or labor may differ for different components of the FEU.

Typically, the foregoing installation and warranty information is retained in a data silo 26 as opposed to an ICS for security reasons. In a data silo, it is possible to limit the ability to enter, delete and/or change installation and warranty expiration data.

As noted above, service for a FEU can be requested from FIG. 36. FIG. 44 illustrates an exemplary service request screen 1200 in which the user inserts particular information concerning the FEU, its location, and the requestor. This screen provides a space for typing in the symptom that the FEU is exhibiting. The service request is forwarded to a service provider, with the information concerning the service provider and the routing of the request to the service provider being enterable into screen 1200.

In accordance with other features of the reporting interface aspect, the reporting interface includes the ability to request additional maintenance or action from one or more other recipients. This request is treated similar to a service alert message as discussed above, except it originates with the user in the reporting interface. This feature is useful to clear a record or to simply give feedback information from the user to the ICS or other party.

As will be appreciated from a reading of the above, the present invention provides numerous advantages over the prior art methods of service tracking and alerting. The use of multiple ICSs 20 to electronically and wirelessly obtain and store real time service information in a centralized manner is efficient and provides tremendous access to actual service data. The connection to an accumulated data storage unit 26 enables viewers to analyze FEU service issues over an extended period of time. The service alert messaging aspect shortens the time needed to identify, diagnose, and repair or service a particular FEU.

Further, the reporting interface feature automatically formulates service information and makes the information instantaneously available to the user, thus giving the user valuable insight into the operation and maintenance of the FEUs. This ability to view aggregated data between clubs and between products simultaneously and on a real time basis is unique in the fitness industry. Such service information may be used to level the usage of the FEUs, determine when an FEU should be replaced, make better future FEU purchases, help the facility managers to better know their customers, enable facility managers to provide better motivation or training to their customers, etc.

While a preferred embodiment of the invention has been illustrated and described, it will be appreciated that various changes can be made therein without departing from the spirit and scope of the invention. For example, if only one data silo is used, it can be essentially integrated into the enterprise platform. Also, rather than retaining any significant amount of data or records in the ICS, the data received by the ICS from the FEUs can be sent immediately to the data silo 26 or to enterprise platform 32, or can be sent periodically and then the data purged from the ICS. In this regard, the ICS does not have to be configured to manipulate or store data other than the data being accumulated from the ICSs.

The invention claimed is:

1. A system comprising:
a first fitness equipment unit at a fitness facility;
a first processor in the first fitness equipment unit;
a first non-transitory computer-readable medium within the first fitness equipment unit, the first non-transitory computer-readable medium containing program logic to direct the first processor to:
gather first usage information regarding usage of first fitness equipment unit; and
transmit the gathered first usage information to a remote control server associated with the fitness facility;
a second fitness equipment unit at the fitness facility;
a second processor in the second fitness equipment unit; and
a second non-transitory computer-readable medium within the second fitness equipment unit, the second non-transitory computer-readable medium containing program logic to direct the second processor to:
gather second usage information regarding usage of second fitness community; and
transmit the gathered usage information to the remote control server associated with the fitness facility, the first usage information and the second usage information being useable for preparation of a usage report for transmission to a requester.

2. The system according to claim 1, wherein the first usage information comprises mileage of the first fitness equipment unit.

3. The system according to claim 1, wherein the first usage information comprises hours of use of the first fitness equipment unit.

4. The system according to claim 1, wherein the first usage information comprises a report indicating a daily number of hours of use of the first fitness equipment unit.

5. The system according to claim 1, wherein the first usage information comprises an indication of warranty term for the first fitness equipment unit.

6. The system of claim 1, wherein the first usage information comprises a suggested preventive maintenance timing.

7. A system comprising:
a first non-transitory computer-readable medium containing program logic to direct a processor to:
gather first usage information regarding usage of a first fitness equipment unit at a fitness facility; and
transmit the first gathered usage information to a remote control server associated with the fitness facility; and
a second non-transitory computer-readable medium containing program logic to direct a processor to:
gather second usage information regarding usage of a second fitness equipment unit at the fitness facility; and
transmit the second gathered usage information to the remote control server associated with the fitness facility, the first gathered usage information and the second gathered usage information being useable for preparation of a usage report for transmission to a requester.

8. The system according to claim 7, wherein the first usage information comprises mileage of the first fitness equipment unit.

9. The system according to claim 7, wherein the first usage information comprises hours of use of the first fitness equipment unit.

10. The system according to claim 7, wherein the first usage information comprises a report indicating a daily number of hours of use of the first fitness equipment unit.

11. The system according to claim 7, wherein the first usage information comprises an indication of warranty term for the first fitness equipment unit.

12. The system of claim 7, wherein the first usage information comprises a suggested preventive maintenance timing.

13. An apparatus comprising:
a control server associated with a fitness facility, the control server comprising a non-transitory computer-readable medium containing program logic to directly processor to:
gather first usage information regarding usage of a first fitness equipment unit at the fitness facility; and
transmit the first gathered usage information to a simulated data storage unit; and
gather second usage information regarding usage of a second fitness equipment unit at the fitness facility; and
transmit the second gathered usage information to the accumulated data storage unit, the first gathered usage information and the second gathered usage information being useable for preparation of a usage report for transmission to a requester.

14. The apparatus of claim 13, wherein the first usage information comprises mileage of the first fitness equipment unit.

15. The apparatus of claim 13, wherein the first usage information comprises hours of use of the first fitness equipment unit.

16. The apparatus of claim 13, wherein the first usage information comprises a report indicating a daily number of hours of use of the first fitness equipment unit.

17. The apparatus of claim 13, wherein the first usage information comprises an indication of warranty term for the first fitness equipment unit.

18. The apparatus of claim 13, wherein the first usage information comprises a suggested preventive maintenance timing.

* * * * *